US007739722B2

(12) United States Patent
Okajo et al.

(10) Patent No.: US 7,739,722 B2
(45) Date of Patent: Jun. 15, 2010

(54) SYSTEM FOR SUPPORTING SECURITY ADMINISTRATION AND METHOD OF DOING THE SAME

(75) Inventors: Sumitaka Okajo, Tokyo (JP); Katsushi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 1386 days.

(21) Appl. No.: 10/831,883

(22) Filed: Apr. 26, 2004

(65) Prior Publication Data

US 2004/0215978 A1 Oct. 28, 2004

(30) Foreign Application Priority Data

Apr. 24, 2003 (JP) ............................ 2003-120625
Oct. 30, 2003 (JP) ............................ 2003-371215

(51) Int. Cl.
*H04L 9/32* (2006.01)

(52) U.S. Cl. .............................. 726/2; 726/1; 709/223; 709/225

(58) Field of Classification Search ..................... 713/1, 713/2, 188, 194; 380/200, 201, 255, 277; 726/2; 709/223, 225
See application file for complete search history.

(56) References Cited

U.S. PATENT DOCUMENTS

| | | | | |
|---|---|---|---|---|
| 5,835,726 | A * | 11/1998 | Shwed et al. | 709/229 |
| 5,991,713 | A * | 11/1999 | Unger et al. | 704/9 |
| 6,324,590 | B1 * | 11/2001 | Jeffords et al. | 719/316 |
| 6,484,261 | B1 * | 11/2002 | Wiegel | 726/11 |
| 6,816,903 | B1 * | 11/2004 | Rakoshitz et al. | 709/226 |
| 7,082,102 | B1 * | 7/2006 | Wright | 370/229 |
| 7,127,597 | B2 * | 10/2006 | Backman et al. | 713/1 |
| 7,185,073 | B1 * | 2/2007 | Gai et al. | 709/221 |
| 7,213,068 | B1 * | 5/2007 | Kohli et a | 709/225 |
| 7,315,801 | B1 * | 1/2008 | Dowd et al. | 703/13 |
| 2002/0143914 | A1 * | 10/2002 | Cihula | 709/223 |
| 2003/0110192 | A1 * | 6/2003 | Valente et al. | 707/513 |
| 2003/0191911 | A1 * | 10/2003 | Kleinschnitz et al. | 711/154 |

FOREIGN PATENT DOCUMENTS

JP 07-141296 A 6/1995

(Continued)

OTHER PUBLICATIONS

R, Sato & F. Tanemo, "A Study on a Dynamic Reconfiguration System to Keep a Network in a Secure Condition", IPSJ S/G Notes vol. 2002, No. 12, Feb. 14 and 15, 2002 pp. 169-174.

(Continued)

*Primary Examiner*—Kimyen Vu
*Assistant Examiner*—Joseph Pan
(74) *Attorney, Agent, or Firm*—Scully, Scott, Murphy & Presser, P.C.

(57) ABSTRACT

A system for supporting security administration in a network system, includes a node-information memory storing node information indicative of security functions provided by hardwares and softwares of the network system, for each of the hardwares and each of the softwares, an input device which receives a set of rules as guidance relating to security of the network system, and topology information indicative of hardwares of the network system and softwares installed in each of the hardwares, and a correspondence maker which, based on the node information, makes correspondence between each of the rules and each of the hardwares or softwares indicated by the topology information.

37 Claims, 48 Drawing Sheets

FOREIGN PATENT DOCUMENTS

| | | | |
|---|---|---|---|
| JP | 2000-324104 | | 11/2000 |
| JP | 2002-94509 | | 3/2002 |
| JP | 2002-094568 | A | 3/2002 |
| JP | 2002-157221 | | 5/2002 |
| JP | 2002-204254 | A | 7/2002 |
| JP | 2002-245200 | A | 8/2002 |
| JP | 2002-247033 | | 8/2002 |
| JP | 2002-261839 | | 9/2002 |
| JP | 2002-279011 | A | 9/2002 |
| JP | 2003-216577 | A | 7/2003 |
| WO | WO 01/98936 | A2 | 12/2001 |

OTHER PUBLICATIONS

F. Tanemo et al. "Managed Security System: A Mechanism that Diagnoses and Reconfigures Hosts Based on Vulnerability Alert", NTT & RD vol. 51, No. 9, 2002, pp. 737-747.

* cited by examiner

FIG.3

| | |
|---|---|
| network-type-class: | |
| network.segment. [ dmz \| int \| intra \| wan...] | ( KIND OF SEGMENT ) |
| network.segment. boundary. [ int-dmz \| dmz-intra \| intra-wan...] | ( KIND OF SEGMENT BOUNDARY ) |
| hardware-type-class: | |
| hardware.generic.server | ( SERVER ) |
| hardware.specific. [ router \| firewall \| switch...] | ( SPECIFIC DEVICES ) |
| software-type-class: | |
| software.filtering.packet. [ ipchains \| iptables \| firewall-1...] | ( PACKET FILTERING SOFTWARE ) |
| function-class: | |
| function.router | ( ROUTING FUNCTION ) |
| function.filtering.packet | ( PACKET FILTERING FUNCTION ) |
| function address.ipmasquerade | ( IP MASQUERADE FUNCTION ) |
| function service. [ integrity \| job \| log \| network...] | ( VARIOUS SERVICES ) |
| account-class: | |
| account.generic. [ user \| root...] | ( ACCOUNT ) |
| file-class: | |
| file.acl. [ readonly \| readwrite \| execute...] | ( RIGHT OF MAKING ACCESS TO FILE ) |
| packet-class: | |
| packet.forward | ( PACKET – TRANSFER ) |
| packet.ip.tcp. [ httpd \| ftpd \| named...] | ( VARIOUS TCP PACKETS ) |
| information-class: | |
| information. [ fingerprint \| message...] | ( INFORMATION ABOUT RESPONSE RECEIVED FROM SYSTEM ) |

FIG.5

```
<policies>             73          74
...
<policy level="1"name="A004-2">
 <comment> Router accomplishes packet-filtering </comment> ~ 75
 <subject>function.router->function.filtering.packet</subject> ~ 76
 <action>add</action> ~ 77
 <segment>network.segment-boundary.int-dmz</segment> ~ 78
</policy>              73          74
...
<policy level="2"name="A004-2-1">
 <comment> All packets are prohibited to pass </comment> ~ 75
 <parent>A004-2</parent> ~ 79
 <subject>packet.forward</subject> ~ 76
 <action>disauthorize</action> ~ 77
 </policy>             73          74
...
<policy level="2"name="A004-2-2">
 <comment> httpd packet is allowed to pass </comment> ~ 75
 <parent>A004-2</parent> ~ 79
 <subject>packet.forward.*.httpd</subject> ~ 76
 <action>authorize</action> ~ 77
 <priority>A004-2-1</priority> ~ 80
</policy>
...
</policies>
```

71 (bracket spanning the entire listing); 72 (bracket for each <policy> block)

* UNDERLINED INDICATES FUNCTION CLASS

FIG.8

<topology>
<network>
<segment name="int"type="network.segment.int">
<address>0/0</address>
</segment>
<segment name="dmz"type="network.segment.dmz">
<address>200.10.10.1/28</address>
</segment>
...
</network>
<hardware>
<node name="fw1"type="hardware.generic.server">
<canonical>NEC Express5800</canonical>
<version>SURFNAVI</version>
<os>software.os.linux.redhat.6_2</os>
<nic name="eth0"in="int">64.100.200.34</nic>
<nic name="eth1"in="dmz">200.10.10.2</nic>
</node>
...
</hardware>
<software>
<node name="pf1"type="software.filtering.packet.ipchains"on="fw1">
<canonical>ipchains</canonical>
<version>1.3.10</version>
</node>
...
</software>
</topology>

FIG.13

<node_knowledge>
...
<software name="ipchains"version="1.3.10">
<function>function.router</function>
153a <function>function.filtering.packet</function>
<function>function.address.ipmasquerade</function>
</software>
...
<software name="iptables"version="1.2.7">
<inherit name="ipchains"version=1.3.10"/>
153a <function>function.address.snat</function>
<function>function.address.dnat</function>
</software>
...
</node_knowledge>

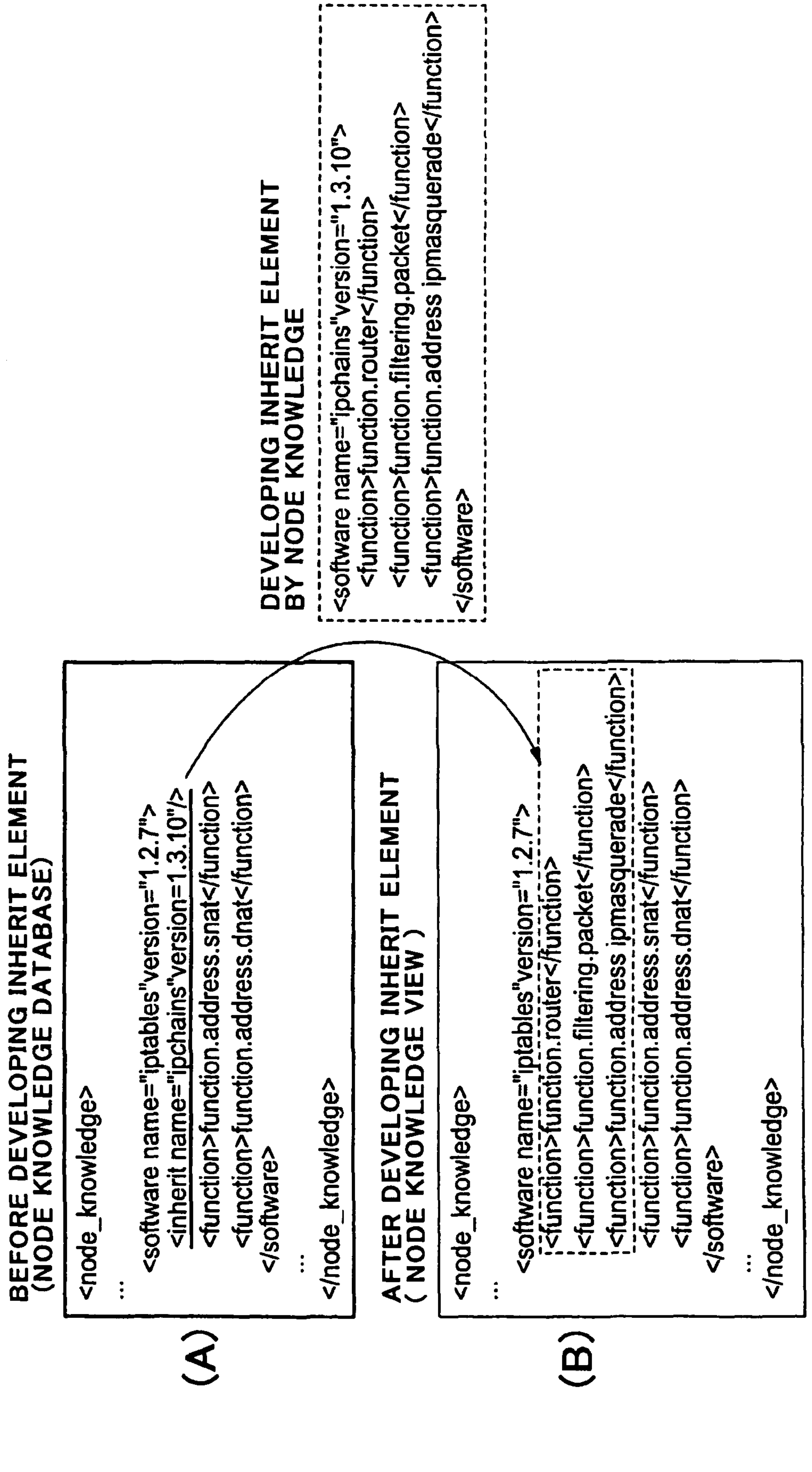

FIG.15

DEVELOPING INHERIT ELEMENT BY NODE KNOWLEDGE

```
<software name="ipchains"version="1.3.10">
  <function>function.router</function>
  <function>function.filtering.packet</function>
  <function>function.address ipmasquerade</function>
</software>
```

BEFORE DEVELOPING INHERIT ELEMENT (NODE KNOWLEDGE DATABASE)

```
<node_knowledge>
  <software name="iptables"version="1.2.7">
    <inherit name="ipchains"version=1.3.10"/>
    <function>function.address.snat</function>
    <function>function.address.dnat</function>
  </software>
  ...
</node_knowledge>
```

(A)

AFTER DEVELOPING INHERIT ELEMENT (NODE KNOWLEDGE VIEW)

```
<node_knowledge>
  <software name="iptables"version="1.2.7">
    <function>function.router</function>
    <function>function.filtering.packet</function>
    <function>function.address ipmasquerade</function>
    <function>function.address.snat</function>
    <function>function.address.dnat</function>
  </software>
  ...
</node_knowledge>
```

| RULE | SECURITY FUNCTION | NODE |
|---|---|---|
| ⋮ | ⋮ | ⋮ |
| A004-2-2 | function.filtering.packet.tcp.httpd | name="pf1"<br>type="software.filtering.packet.ipchains" |
| ⋮ | ⋮ | ⋮ |

FIG.33A

POLICY DESCRIPTION

```
<policy level="2"name="A004-2-2">
   <comment> httpd packets are allowed to pass </comment>
   <parent>A004-2</parent>
   <subject>function.filetring.packet.tcp.httpd</subject>
   <action>authorize</action>
   <priority>A004-2-1</priority>
</policy>
```

FIG.33B

PARAMETTER-EXTRACTING TEMPLATE

```
<param>
   <function>function.filtering.packet.tcp.httpd</function>
   <data>
   in-interface::hardware.node.nic@name[hardware.node.nic@in=
     network.segment@name[network.segment@type='network.segment.int']];
   out-interface::hardware.node.nic@name[hardware.node.nic@in=
     network.segment@name[network.segment@type='network.segment.dmz']];
   protocol::tcp;
   src-address::network.segment.address[network.segment@type='network.segmet.int'];
   src-port::1024:65535;
   dst-address::hardware.node.nic[hardware.node.name=
     software.node@on[type='software.service.www']];
   dst-port::80;
   <data/>
</param>
```

```
<topology>
   <network>                                                    A
     <segmet name="int"type="network.segment.int">
       <address>0/0</addrsss>
     </segment>
     <segment name"dmz"typ=network.segment.dmz">
       <address>200.10.10.1/28</address>
     </segment>
     ...
   </network>
   <hardware>
     <node name="fw1"type="hardware.generic.server">
       <canonical>NEC Express5800</canonical>
       <version>SURFNAVI</version>
       <os>software.os.linux.redhat.6_2</os>                    B
       <nic name="eth0"in="int">64.100.200.34</nic>
       <nic name="eth1"in="dmz">200.10.10.2</nic>
     </node>
     ...
   </hardware>
   <software>
     <node name="pf1"type="software.filtering.packet.ipchains"on=fw1">
       <canonical>ipchains</canonical>
       <version>1.3.10</version>
     </node>
     ...
   </software>
</topology>
```

FIG.35

PARAMETER-EXTRACTING TEMPLATE (OBTAINED)

```
<param>
    <function>function.filtering.packet.tcp.httpd</function>
    <data>
     in-interface::eth0;
     out-interface::eth1;
     protocol::tcp;
     src-address::0.0.0.0/0;
     src-port::1024:65535;
     dst-address::200.10.10.6;
     dat-port::80;
    </data>
</param>
```

FIG.36

SCRIPT TEMPLATE

```
<template function="function.filtering.packet.tcp.httpd>
  <format name="ipchains"version="1.3.10">
   ipchains-A input-i $in-interface -p tcp ¥
          -s $src-address $src-port¥
          -d $dst-address $dst-port-j ACCEPT
   ipchains-A output-i $out-interface -p tcp ¥
          -s $src-address $src-port¥
          -d $dst-address $dst-port -j ACCEPT
   ipchains-A input-i $out-interface -p tcp ! -y ¥
          -s $dst-address $dst-port¥
          -d $src-address $src-port -j ACCEPT
   ipchains-A output-i $in-interface-p tcp ! -y ¥
          -s $dst-address $dst-port¥
          -d $src-address $src-port -j ACCEPT
  </format >
</template>
```

FIG.37

PARAMETER-EXTRACTING TEMPLATE (OBTAINED)

```
<param>
  <function>function.filtering.packet.tcp.httpd</function>
  <data>
    <in-interface>eth0 </in-interface>
    <out-interface>eth1 </out-interface>
    <protocol>tcp </protocol>
    <src-address>0.0.0.0/0 </src-address>
    <src-port>1024:65535 </src-port>
    <dst-address>200.10.10.6 </dst-address>
    <dst-port>80 </dat-port>
  </data>
</param>
```

SCRIPT TEMPLATE (ipchains)

```
<template function="function.filtering.packet.tcp.httpd">
  <format name="ipchains"version="1.3.10">
    ipchains-A input-i $in-interface -p tcp ¥
          -s $src-address $src-port¥
          -d $dst-address $dst-port-j ACCEPT
    ipchains-A output-i $out-interface -p tcp ¥
          -s $src-address $src-port¥
          -d $dst-address $dst-port -j ACCEPT
    ipchains-A input-i $out-interface -p tcp ! -y ¥
          -s $dst-address $dst-port¥
          -d $src-address $src-port -j ACCEPT
    ipchains-A output-i $in-interface-p tcp ! -y ¥
          -s $dst-address $dst-port¥
          -d $src-address $src-port -j ACCEPT
  </format >
</template>
```

SCRIPT

```
ipchains-A input-i -i eth0 -p tcp¥
        -s 0.0.0.0/0 1024:65535¥
        -d 200.10.10.6 80 -j ACCEPT
ipchains-A output -i eth1-p tcp¥
        -s 0.0.0.0/0 1024:65535¥
        -d 200.10.10.6 80 -j ACCEPT
ipchains-A input-i -i eth1 -p tcp ! -y¥
        -s 200.10.10.6 80¥
        -d 0.0.0.0/0 1024:65535 -j ACCEPT
ipchains-A output -i eth0 -p tcp ! -y¥
        -s 200.10.10.6 80¥
        -d 0.0.0.0/0 1024:65535 -j ACCEPT
```

FIG.42

| ID (241) | NAME (242) | SPECIFICATION (243) | TARGET NODE/VERSION (244) | CAUSES OF VULNERABILITY (245) | SOLUTION (246) |
|---|---|---|---|---|---|
| ⋮ | ⋮ | ⋮ | ⋮ | ⋮ | ⋮ |
| CERT/CC_ Vulnerability Note_ VU#328867 | Multiple vendars' firewalls do not adequately keep state of FTP traffic | Some firewalls have vulnerability in FTP session administration. As a result, a third party may be able to make remote TCP-access to a FTP server or a FTP client arranged inside the firewalls. | hardware.specific. firewall, software.filtering. packet | function.ftp | A patch provided by a vendor and a distributor is applied to this problem. As an alternative, the problem can be solved by updating a software (firmware) to an amended version. If these solutions are impossible or difficult to carry out, the following solutions are recommended as temporary solutions. —A function of checking in a FTP application layer in a firewall is made invalid (FTP data connection from an external device is made invalid). However, it should be noted that it would be impossible to make access to a FTP server arranged inside the firewall, from an external device in a passive mode, and further impossible to apply active mode to an external FTP server by a FTP client. —Only a passive mode is used in a FTP client arranged inside the firewall. It is reported that products provided by XXX among domestic manufacturers do not have the vulnerability. |
| ⋮ | ⋮ | ⋮ | ⋮ | ⋮ | ⋮ |

FIG.44

[Solution to vulnerability is strongly recommended]
ID: CERT/CC_Vulnerability_Note_VU#328867
Title: Multiple vendors' firewalls do not adequately keep state of FTP traffic
Specification:
Some firewalls have vulnerability in FTP session administration. As a result, a third party may be able to make remote TCP-access to a FTP server or a FTP client arranged inside the firewalls.
Target Node/Version: hardware.specific.firewall, software.filtering.packet
Function causing vulnerability: function.ftp
Solution:
A patch provided by a vendor and a distributor is applied to this problem. As an alternative, the problem can be solved by updating a software (firmware) to an amended version. If these solutions are impossible or difficult to carry out, the following solutions are recommended as temporary solutions. —A function of checking in a FTP application layer in a firewall is made invalid (FTP data connection from an external device is made invalid). However, it should be noted that it would be impossible to make access to a FTP server arranged inside the firewall, from an external device in a passive mode, and further impossible to apply active mode to an external FTP server by a FTP client.
—Only a passive mode is used in a FTP client arranged inside the firewall.
It is reported that products provided by XXX among domestic manufacturers do not have the vulnerability.
ID: CAN-2002-1357

|
|

---

[Solution to vulnerability is recommended]
ID: CAN-2002-038

|
|

FIG.46

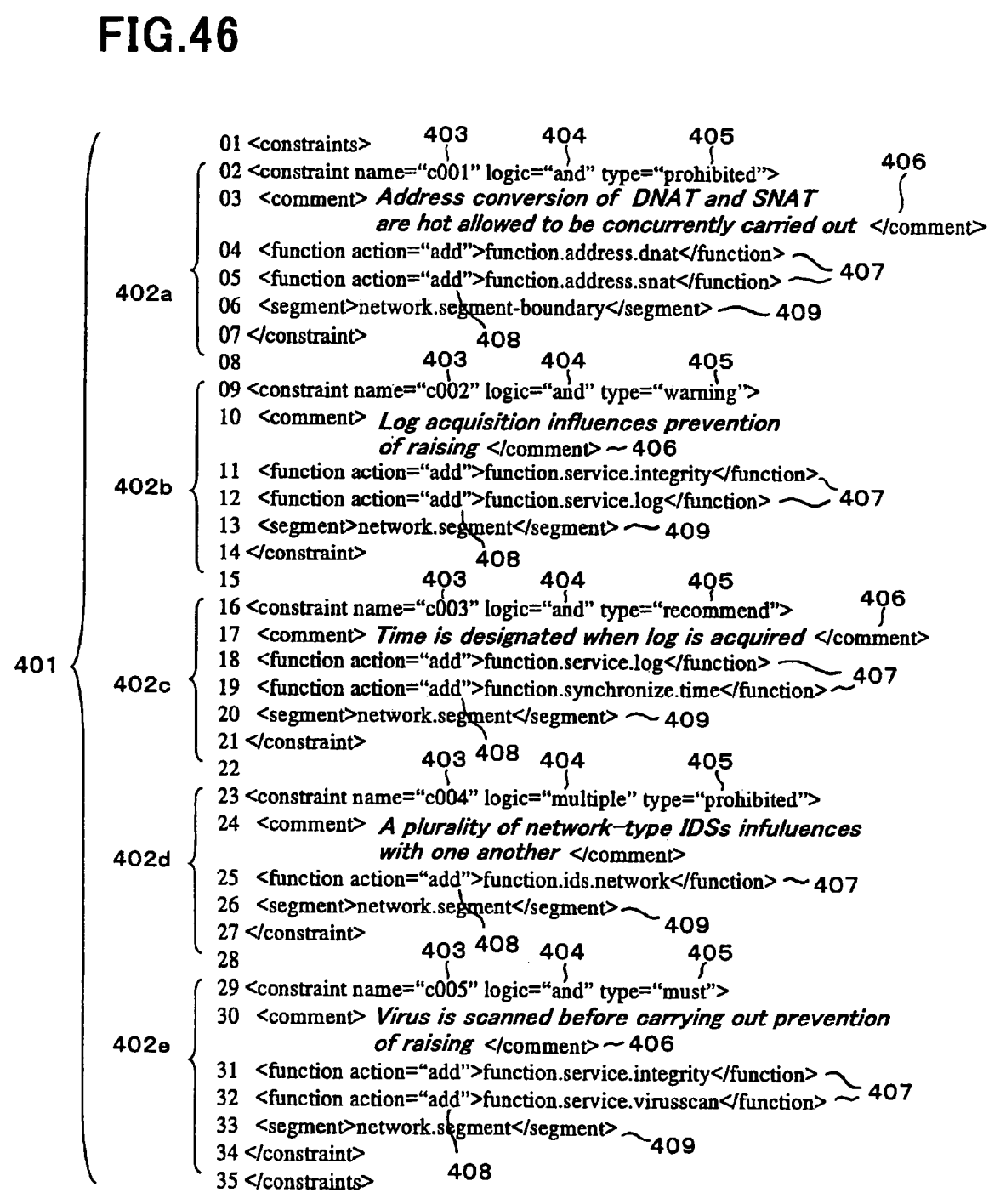

```
<constraints>
<constraint name="c001" logic="and" type="prohibited">
 <comment> Address conversion of DNAT and SNAT
          are hot allowed to be concurrently carried out </comment>
 <function action="add">function.address.dnat</function>
 <function action="add">function.address.snat</function>
 <segment>network.segment-boundary</segment>
</constraint>

<constraint name="c002" logic="and" type="warning">
 <comment> Log acquisition influences prevention
          of raising </comment>
 <function action="add">function.service.integrity</function>
 <function action="add">function.service.log</function>
 <segment>network.segment</segment>
</constraint>

<constraint name="c003" logic="and" type="recommend">
 <comment> Time is designated when log is acquired </comment>
 <function action="add">function.service.log</function>
 <function action="add">function.synchronize.time</function>
 <segment>network.segment</segment>
</constraint>

<constraint name="c004" logic="multiple" type="prohibited">
 <comment> A plurality of network-type IDSs infuluences
          with one another </comment>
 <function action="add">function.ids.network</function>
 <segment>network.segment</segment>
</constraint>

<constraint name="c005" logic="and" type="must">
 <comment> Virus is scanned before carrying out prevention
          of raising </comment>
 <function action="add">function.service.integrity</function>
 <function action="add">function.service.virusscan</function>
 <segment>network.segment</segment>
</constraint>
</constraints>
```

<policies><br>
<policy level="1" name="a001"><br>
<comment> *Converting address of DNAT* </comment><br>
<subject>function.address.dnat</subject> 421a<br>
<action>add</action><br>
<segment>network.segment-boundary.int-dmz</segment><br>
</policy>

<policy level="1" name="a002"><br>
<comment> *Converting address of SNAT* </comment><br>
<subject>function.address.snat</subject> 421b<br>
<action>add</action><br>
<segment>network.segment-boundary.int-dmz</segment><br>
</policy>

<policy level="1" name="b001"><br>
<comment> *Detecting file-raising* </comment><br>
<subject>function.service.integrity</subject> 421c<br>
<action>add</action><br>
<segment>network.segment.dmz</segment><br>
</policy>

<policy level="1" name="b002"><br>
<comment> *Acquiring log* </comment><br>
<subject>function.service.log</subject> 421d<br>
<action>add</action><br>
<segment>network.segment.dmz</segment><br>
</policy>

<policy level="1" name="b003"><br>
<comment> *Designating time* </comment><br>
<subject>function.synchronize.time</subject> 421e<br>
<action>add</action><br>
<segment>network.segment.dmz</segment><br>
</policy>

</policies>

FIG.48

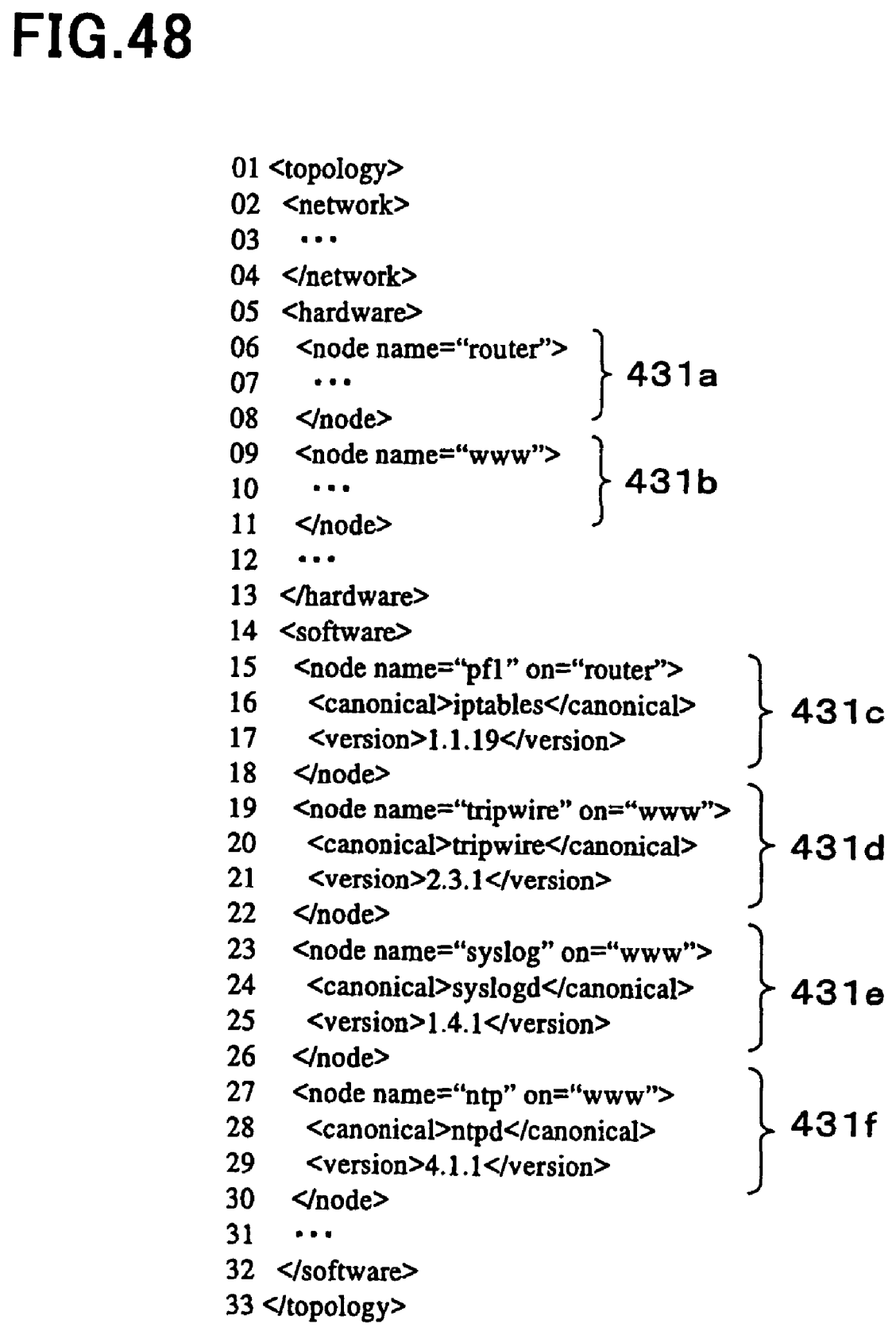

```
<topology>
 <network>
  ...
 </network>
 <hardware>
  <node name="router">
   ...                                          431a
  </node>
  <node name="www">
   ...                                          431b
  </node>
  ...
 </hardware>
 <software>
  <node name="pf1" on="router">
   <canonical>iptables</canonical>              431c
   <version>1.1.19</version>
  </node>
  <node name="tripwire" on="www">
   <canonical>tripwire</canonical>              431d
   <version>2.3.1</version>
  </node>
  <node name="syslog" on="www">
   <canonical>syslogd</canonical>               431e
   <version>1.4.1</version>
  </node>
  <node name="ntp" on="www">
   <canonical>ntpd</canonical>                  431f
   <version>4.1.1</version>
  </node>
  ...
 </software>
</topology>
```

SYSTEM FOR SUPPORTING SECURITY ADMINISTRATION AND METHOD OF DOING THE SAME

BACKGROUND OF THE INVENTION

1. Field of the Invention

The invention relates to a system for supporting security administration, a method of supporting security administration, a program for supporting security administration, a system for displaying information, and a method of displaying information, and more particularly to such a system, method and program for supporting establishment and operation of security in a network system.

2. Description of the Related Art

Recently, an information system making use of Internet is broadly used as infrastructure in company's commercial activity. With such broad use of an information system, a security system becomes important for avoiding illegal access to such an information system and menace to information asset by virus. In addition, various devices have been suggested as devices to be used for such an information system.

Companies making use of Internet tend to establish its own security policy. Herein, security policy indicates a set of guidance relating to securities in an organization, in other word, a set of guidance for avoiding various menaces. Hereinbelow, each of guidance about security is referred to as a rule. Thus, security policy is expressed as a set of rules.

Security policy includes rules determining policies for man's action, such as rules for allowing a person to enter a server room or rules for handling a recording medium. Security policy also includes rules for establishing securities in a system to be administrated. That is, rules indicating how contents of various items relating to security are determined are also included in security policy. It is necessary for a system administrator to establish security policy in accordance with rules as guidance for establishment of security.

A system administrator has to have expertise knowledge in order to establish appropriate security for a network system and safely and effectively run the network system. Even if a system administrator had such expertise knowledge, he has to receive remarkably much work load.

Thus, some attempts have been made to lighten work load of a system administrator.

For instance, Japanese Patent Application Publication No. 2002-94509 has suggested a system in which diagnosis policy and supervision policy are made, based on network structure definitions indicative of a structure of a computer network, and diagnosis and supervision results are analyzed to thereby output an analysis report. In accordance with the report, a system administrator analyzes a network structure again.

Japanese Patent Application Publication No. 2002-247033 has suggested a system which establishes security in accordance with security policy for a network to be administrated. In the Publication, a "rule" is expressed as a "policy".

The suggested system includes an information security policy database, a security administration and supervision program database, a policy and security-set information mapping table, a security-set information database, and other databases. The information security policy database stores action programs of a policy, devices to which a policy is applied and a software to which a policy is applied all in association with each of policies. In the policy and security-set information mapping table are written items to be included in a program to be administrated, and set values recommended in the items. The security-set information database stores set contents of each of softwares.

In the suggested system, an image is displayed in a screen for a user to select elemental parts (devices, softwares and programs) constituting an information system which a user (system administrator) established or is going to establish, to thereby urge a user to select elemental parts. Once elemental parts have been selected, a set of policies applicable to the thus selected elemental parts is extracted out of the information security policy database. The system displays thus extracted set of policies, and requests a user to select a policy among them. Once a policy has been selected, the system stores security-set information associated with the selected policy in the security-set information database in light of the security-set information mapping table. If a plurality of entries matches to a set item, the system shows set values stored in the security-set information database to urge a user to select a set value.

A security operational system has been suggested for following latest security-hole information and security-patch information, and appropriately operating a network system in R. Sato & F. Tanemo, "A study on a Dynamic Reconfiguration System to Keep a Network in a Secure Condition", IPSJ S/G Notes Vol. 2002, No. 12, Feb. 14 and 15, 2002, pp. 169-174. In the suggested system, when new information about either a security hole or a solution to a security hole is input into the system, a server host which will be influenced by a new security hole is detected, based on information about devices constituting each of server hosts. The system transmits information indicative of a solution to a new security hole, to the thus detected server host.

A system having the same functions as those of the above-mentioned system is suggested in F. Tanemo et al., "Managed Security System: A Mechanism that Diagnoses and Reconfigures Hosts Based on Vulnerability Alert", NTT & RD Vol. 51, No. 9, 2002, pp. 737-747.

Japanese Patent Application Publication No. 2000-324104 has suggested a method of setting security policy including the steps of identifying a policy-setting area by selecting a plurality of communication terminals constituting a virtual network to be constructed, on a screen in which a network map is displayed, selecting communication conditions out of a security-policy information storing table storing communication conditions including cipher algorithm, retrieving communication paths on a network, based on the identified setting area and the selected conditions, retrieving network devices constituting each of the retrieved communication paths, and applying the selected communication conditions to each of the network devices.

Japanese Patent Application Publication No. 2000-157221 has suggested a system for finding a solution to security vulnerability points. In the suggested system, a host computer attacks a computer to be tested through a network to thereby detect security vulnerability points of the computer to be tested, and makes a file including a solution to the thus detected security vulnerability points. Then, the host computer applies the solution to the computer to be tested.

Japanese Patent Application Publication No. 2000-261839 has suggested a system for administrating communication security. In the suggested system, inconsistency between security policies is detected without rendering secret information about different structures of security policies open, thereby preventing communication failure caused by a difference in security policy.

Each of rules included in security policy does not always indicate a content that a title of a hardware or software included in a system to be administrated is designated, and a certain setting is applied to the hardware or software. Hence, it is difficult to know correspondence between each of rules included in security policy and a hardware and software to which the each of rules is applied. As a result, a system administrator may set security policy which is short of or excessive over a system to be administrated. For instance, a system administrator may group a rule irrelevant to a hardware or software included in a system to be administrated, into security policy. As an alternative, a system administrator may forget setting a rule to be applied to a hardware or software. As an alternative, a system administrator may group rules which are contradictory to each other with respect to a common hardware or software, into security policy.

In particular, if a system administrator forgets setting a rule to be applied to a hardware or software, the hardware or software might become a security hole. That is, even though a certain hardware or software could have functions about security, if properly set, the certain hardware or software would operate in default setting, if a system administrator properly sets a rule for accomplishing such security functions. As a result, such a hardware or software cannot have security functions, resulting that the hardware or software is turned to a security hole.

As mentioned above, through a system administrator intends to properly accomplish functions of a hardware or software, if he/she forgot setting a rule, there would be caused a security hole.

The system suggested in the above-mentioned Japanese Patent Application Publication No. 2002-94509 makes diagnosis policy and supervision policy, and carries out security diagnosis and security supervision for supporting a system administrator. However, correspondence between each of rules included in the security policy and a hardware or software to which the each of rules is applied is not made.

The system suggested in the above-mentioned Japanese Patent Application Publication No. 2002-247033 displays a set of policies (rules) applicable to devices selected by a system administrator, and urges a system administrator to select security policy. However, the system is accompanied with a problem that a system administrator may set security policy short of or excessive over a system to be administrated. That is, when a plurality of values is set to a single item, the system displays the values, and urges a system administrator to select one of them. However, the system may fails to set a necessary value. In addition, the system does not consider topology of a system to be administrated.

As mentioned earlier, each of rules included in security policy does not always indicate a content of a hardware or software. Accordingly, a system administrator had to identify a content of each of set items in accordance with security policy, and properly set each of hardwares or softwares. In addition, commands for properly setting each of hardwares and each of softwares are different from one another, which exerts a burden on a system administrator when he/she sets each of hardwares and softwares.

If a system administrator receives information relating to a new security hole while he/she operates a network system, the system administrator has to remove such a security hole. In the systems suggested in the above-mentioned studies, a solution to a new security hole is applied to a host server having device-setting information coincident with information relating to a new security hole. As a result, a solution to a new security hole is applied to all of host servers having the same device-setting information. However, host servers having the same device-setting information are not always accompanied with a problem of a security hole. If the same solution to a security hole is applied to all of host servers, a host or hosts to which a solution is not necessary to be applied may be accompanied with a new problem.

SUMMARY OF THE INVENTION

In view of the above-mentioned problems in the prior art, it is an object of the present invention to provide a system for supporting security administration which system is capable of enhancing security of a network system to which security policy is applied, and reducing a burden of a system administrator for ensuring security.

It is also an object of the present invention to provide a method of supporting security administration, a program for supporting security administration, a system for displaying information, to be applicable to the system for supporting security administration, and a method of displaying information, to be applicable to the system for supporting security administration, all of which are capable of doing the same as the above-mentioned system for supporting security administration.

In one aspect of the present invention, there is provided a system for supporting security administration in a network system, including a node-information memory storing node information indicative of security functions provided by hardwares and sorfwares of the network system, for each of the hardwares and each of the softwares, an input device which receives a set of rules as guidance relating to security of the network system, and topology information indicative of hardwares of the network system and softwares installed in each of the hardwares, and a correspondence maker which, based on the node information, makes correspondence between each of the rules and each of the hardwares or softwares indicated by the topology information.

In accordance with the above-mentioned present invention, a system administrator can readily know correspondence between a rule and a hardware or software, resulting in enhancement in security and reduction of burden of a system administrator.

For instance, the input device receives a set of rules including information about security functions which information corresponds to each of the rules, and the correspondence maker, based on the node information, identifies security function provided by each of the hardwares or softwares indicated by the topology information, and makes correspondence among a rule corresponding to the thus identified security function, the thus identified security function, and the each of the hardwares or softwares.

The system may further include an output device which outputs information about correspondence made by the correspondence maker between each of the rules and each of the hardwares or softwares.

It is preferable that the correspondence maker judges there is inconsistency in the correspondence, when rules to which a hardware or software commonly corresponds are contradictory to one another, and causes the output device to output detection of the inconsistency. This informs a system administrator of policy collision.

The system may further include a inconsistency-information memory which stores inconsistency in correspondence between a rule and a hardware or software, in which case, the correspondence maker judges there is inconsistency between a rule and a hardware or software, when correspondence between a rule and a hardware or software is coincident with the inconsistency, and causes the correspondence maker to output judgment result. This informs a system administrator of policy collision.

It is preferable that the correspondence maker judges whether there is a rule which does not have correspondence to any hardware or software, among the rules input through the input device, and if such a rule exists, the correspondence maker causes the input device to output information indicating that such a rule exists. This informs a system administrator of overpolicy.

It is preferable that the correspondence maker judges whether there is a hardware or software which does not have correspondence to any rule, among the hardwares or softwares indicated by the topology information, and if such a hardware or software exists, the correspondence maker causes the input device to output information indicating that such a hardware or software exists. This informs a system administrator of underpolicy.

The system may further include a parameter-information memory which stores parameter information including an instruction to extract a parameter to be applied to a hardware or software for causing the hardware or software to carry out its security functions, out of the topology information, a parameter-extracting device which extracts the parameter information out of the parameter-information memory for each of the security functions to which a rule and a hardware or software corresponds, and extracts a parameter out of the topology information in accordance with an instruction included in the thus extracted parameter information, an script-model memory which stores a model of a script including a command for determining a parameter on the assumption that a parameter is not determined, and a script maker which extracts the model out of the script-model memory, and makes the script, based on the thus extracted model and the parameter extracted by the parameter-extracting device. This structure allows a system administrator not to make a script for setting parameters, reducing a burden of a system administrator for setting a hardware or software.

It is preferable that the parameter-information memory stores the parameter information for each of security functions which parameter information does not include description dependent on a hardware or software. This structure ensures even if a security function is newly established, a system administrator could readily deal with the security function.

It is preferable that the script maker stores a model of a script dependent on a hardware or software, for each of security functions of each of the hardwares and each of the softwares, and extracts a model of a script identified by a combination of a security function and a hardware or software which combination corresponds to a rule, out of the script-model memory, to thereby make a script. This structure ensures that even if a system administrator is not conscious of a script inherent to each of hardwares or softwares, he/she can get a script associated with each of hardwares or softwares. Hence, a burden of a system administrator for setting a hardware or software is reduced. In addition, even if a hardware or software is newly added to the system, a system administrator could readily deal with addition of a hardware or software.

The system may further include a vulnerability alert input device which receives vulnerability alert including at least first information indicative of a reason why a security vulnerability point is caused, second information indicative of an object to which a solution to the security vulnerability point is applied, and third information indicative of the solution, and an recommendation-degree judge which determines a degree at which the solution is recommended to carry out, based on a combination of a rule, a security function, and a hardware or software which combination was made by the correspondence maker. The structure makes it possible to prevent a system administrator from unnecessarily dealing with security vulnerability point.

For instance, the recommendation-degree judge judges whether a hardware or software identified as the object has correspondence to a rule, and classifies the degree, based on the judgment result.

For instance, the recommendation-degree judge judges whether the reason is included in the combination, and classifies the degree, based on the judgment result.

For instance, the recommendation-degree judge judges whether a hardware or software identified as the object is includes in the topology information, and classifies the degree, based on the judgment result.

It is preferable that the input device receives a set of rules classified for classes of a communication network, and topology information indicative of the class of the communication network and hard-wares belonging to each of the classes, and the correspondence maker makes correspondence between a rule and a hardware or software for each of classes of the communication network. This structure allows to make correspondence for each of classes, ensuring that correspondence between a rule and a hardware or software can be readily made.

For instance, the input device receives a set of rules which do not include description dependent on a particular hardware or software, and the node-information memory stores the node information storing security functions described without dependence on a particular hardware or software.

There is further provided a system for supporting security administration in a network system, including an input device which receives topology information indicative of hardwares of the network system and softwares installed in each of the hardwares, a function-map input device which receives a function map including a set of information indicative of correspondence among a rule as a guidance relating to security of the network system, a hardware or software of the network system, and a security function provided by the hardware or software to accomplish the rule, a parameter-information memory which stores parameter information including an instruction to extract a parameter to be applied to a hardware or software for causing the hardware or software to carry out its security functions, out of the topology information, a parameter-extracting device which extracts the parameter information out of the parameter-information memory for each of the security functions to which a rule and a hardware or software corresponds, and extracts a parameter out of the topology information in accordance with an instruction included in the thus extracted parameter information, based on the function map, a script-model memory which stores a model of a script including a command for determining a parameter on the assumption that a parameter is not determined, and a script maker which extracts the model out of the script-model memory, and makes the script, based on the thus extracted model and the parameter extracted by the parameter-extracting device.

The above-mentioned system in accordance with the present invention allows a system administrator not to make a script for setting parameters, reducing a burden of a system administrator for setting a hardware or software.

There is still further provided a system for supporting security administration in a network system, including a function-map input device which receives a function map including a set of information indicative of correspondence among a rule as a guidance relating to security of the network system, a hardware or software of the network system, and a security function provided by the hardware or software to accomplish the rule, a vulnerability alert input device which receives vulnerability alert including at least first information indicative of a reason why a security vulnerability point is caused, second information indicative of an object to which a solution to the security vulnerability point is applied, and third information indicative of the solution, and a recommendation-degree judge which determines a degree at which the solution is recommended to carry out, based on the function map.

The above-mentioned system in accordance with the present invention makes it possible to prevent a system administrator from unnecessarily dealing with security vulnerability point.

There is yet further provided a system for supporting security administration in a network system, including a node-information memory storing node information indicative of security functions provided by hardwares and sorfwares of the network system, for each of the hardwares and each of the softwares, an input device which receives a set of rules as guidance relating to security of the network system, and topology information indicative of classes of the communication network, hardwares belonging to each of the classes, and softwares installed in each of the hardwares, the rules being associated with information of a security function and being classified for each of the classes of the communication network, a constraint-information memory which stores constraint information indicative of constraint to a security function in each of the classes of the communication network, and a correspondence maker which, based on the node information, identifies a security function provided by a hardware belonging to each of the classes of the communication network or by a software installed in the hardware for each of the classes of the communication network, and makes correspondence among a rule associated with the thus identified security function, the security function, and the hardware or software, the correspondence maker judges whether the security function associated with the rule and the hardware of software accords with the constraint information.

The system may further include an output device which outputs information indicative of the rule, the security function and the hardware or software, and wherein the correspondence maker causes the output device to output the correspondence, and, if a security function associated with the rule and the hardware or software in a class does not accord with the constraint information, the correspondence maker causes the output device to output no accordance of the security function with the constraint information.

It is preferable that the constraint-information memory stores combinations of a plurality of security functions which must not be included in a common class, as the constraint information, and the correspondence maker, if a combination coincident with the constraint information exists in the security functions associated with hardwares belonging to a common class or softwares installed in the hardwares, causes the output device to output that there is a combination of a plurality of security functions which must not be included in a common class.

It is preferable that the constraint information memory stores a combination of a plurality of security functions about which an attention is to be paid to a system administrator when the security functions are includes in a common class, as the constraint information, and the correspondence maker, if a combination coincident with the constraint information exists in the security functions associated with hardwares belonging to a common class or softwares installed in the hardwares, causes the output device to output warning.

It is preferable that the constraint information memory stores a combination of a plurality of security functions which are determined preferable to be included in a common class, and the correspondence maker, if only a part of the security functions indicated by the constraint information exists in the security functions associated with hardwares belonging to a common class or softwares installed in the hardwares, causes the output device to output that a combination of a plurality of security functions which are determined preferable to be included in a common class is not made.

It is preferable that the constraint information memory stores a combination of a plurality of security functions which have to be included in a common class, and the correspondence maker, if only a part of the security functions indicated by the constraint information exists in the security functions associated with hardwares belonging to a common class or softwares installed in the hardwares, causes the output device to output that a combination of a plurality of security functions which have to be included in a common class is not made.

In another aspect of the present invention, there is provided a method of supporting security administration in a network system, including storing node information indicative of security functions provided by hardwares and sorfwares of the network system, for each of the hardwares and each of the softwares, receiving a set of rules as guidance relating to security of the network system, and topology information indicative of hardwares of the network system and softwares installed in each of the hardwares, and based on the node information, making correspondence between each of the rules and each of the hardwares or softwares indicated by the topology information.

There is further provided a method of supporting security administration in a network system, including receiving topology information indicative of hardwares of the network system and softwares installed in each of the hardwares, receiving a function map including a set of information indicative of correspondence among a rule as a guidance relating to security of the network system, a hardware or software of the network system, and a security function provided by the hardware or software to accomplish the rule, storing parameter information including an instruction to extract a parameter to be applied to a hardware or software for causing the hardware or software to carry out its security functions, out of the topology information, extracting the parameter information for each of the security functions to which a rule and a hardware or software corresponds, and extracting a parameter out of the topology information in accordance with an instruction included in the thus extracted parameter information, based on the function map, storing a model of a script including a command for determining a parameter on the assumption that a parameter is not determined, and extracting the model out of the script-model memory, and making the script, based on the thus extracted model and the parameter.

There is still further provided a method of supporting security administration in a network system, including receiving a function map including a set of information indicative of correspondence among a rule as a guidance relating to security of the network system, a hardware or software of the network system, and a security function provided by the hardware or software to accomplish the rule, receiving vulnerability alert including at least first information indicative of a reason why a security vulnerability point is caused, second information indicative of an object to which a solution to the security vulnerability point is applied, and third information indicative of the solution, and determining a degree at which the solution is recommended to carry out, based on the function map.

There is yet further provided a method of supporting security administration in a network system, including storing node information indicative of security functions provided by hardwares and sorfwares of the network system, for each of the hardwares and each of the softwares, receiving a set of rules as guidance relating to security of the network system, and topology information indicative of classes of the communication network, hardwares belonging to each of the classes, and softwares installed in each of the hardwares, the rules being associated with information of a security function and being classified for each of the classes of the communication network, storing constraint information indicative of constraint to a security function in each of the classes of the communication network, based on the node information, identifying a security function provided by a hardware belonging to each of the classes of the communication network or by a software installed in the hardware for each of the classes of the communication network, and making correspondence among a rule associated with the thus identified security function, the security function, and the hardware or software, and judging whether the security function associated with the rule and the hardware of software accords with the constraint information.

In still another aspect of the present invention, there is provided a program for causing a computer to carry out steps, the computer including a node-information memory storing node information indicative of security functions provided by hardwares and sorfwares of a network system, for each of the hardwares and each of the softwares, the steps including receiving a set of rules as guidance relating to security of the network system, and topology information indicative of hardwares of the network system and softwares installed in each of the hardwares, and based on the node information, making correspondence between each of the rules and each of the hardwares or softwares indicated by the topology information.

There is further provided a program for causing a computer to carry out steps, the computer including a parameter-information memory which stores parameter information including an instruction to extract a parameter to be applied to a hardware or software for causing the hardware or software to carry out its security functions, out of the topology information, and a script-model memory which stores a model of a script including a command for determining a parameter on the assumption that a parameter is not determined, the steps including receiving topology information indicative of hardwares of a network system to be administrated and softwares installed in each of the hardwares, receiving a function map including a set of information indicative of correspondence among a rule as a guidance relating to security of the network system, a hardware or software of the network system, and a security function provided by the hardware or software to accomplish the rule, extracting the parameter information for each of the security functions to which a rule and a hardware or software corresponds, and extracting a parameter out of the topology information in accordance with an instruction included in the thus extracted parameter information, based on the function map, and extracting the model out of the script-model memory, and making the script, based on the thus extracted model and the parameter.

There is still further provided a program for causing a computer to carry out steps of receiving a function map including a set of information indicative of correspondence among a rule as a guidance relating to security of a network system to be administrated, a hardware or software of the network system, and a security function provided by the hardware or software to accomplish the rule, receiving vulnerability alert including at least first information indicative of a reason why a security vulnerability point is caused, second information indicative of an object to which a solution to the security vulnerability point is applied, and third information indicative of the solution, and determining a degree at which the solution is recommended to carry out, based on the function map.

There is yet further provided a program for causing a computer to carry out steps, the computer including a node-information memory storing node information indicative of security functions provided by hardwares and sorfwares of a network system, for each of the hardwares and each of the softwares, and a constraint-information memory which stores constraint information indicative of constraint to a security function in each of the classes of the communication network, the steps including receiving a set of rules as guidance relating to security of the network system, and topology information indicative of classes of the communication network, hardwares belonging to each of the classes, and softwares installed in each of the hardwares, the rules being associated with information of a security function and being classified for each of the classes of the communication network, based on the node information, identifying a security function provided by a hardware belonging to each of the classes of the communication network or by a software installed in the hardware for each of the classes of the communication network, and making correspondence among a rule associated with the thus identified security function, the security function, and the hardware or software, and judging whether the security function associated with the rule and the hardware of software accords with the constraint information.

In yet another aspect of the present invention, there is provided an information-display system to be applied to a system for supporting security administration which system makes correspondence between each of rules as guidance relating to security in a network system, and each of hardwares of the network system and each of softwares installed in each of the hardwares, the information-display system including a screen-information memory which stores information about a screen having a rule-display section for displaying each of rules, a node-display section for displaying each of hardwares and each of softwares, and a correspondence-display section located between the rule-display section and the node-display section, a screen-information maker which, based on the screen information stored in the screen-information memory, makes output information in accordance with which each of rules is displayed in the rule-display section, each of hardwares and each of softwares are displayed in the node-display section, and a line connecting a rule to a hardware or software associated with the rule is displayed in the correspondence-display section, and an output device which displays the each of rules, the each of hardwares and each of softwares, and the line in a screen in accordance with the output information.

The above-mentioned information-display system in accordance with the present invention allows a system administrator to readily know a correspondence between a rule and a hardware or software.

It is preferable that the screen-information maker makes screen information in accordance with which each of rules is displayed such that each of rules and the correspondence-display section are spaced away from each other by a distance determined in accordance with a hierarchy associated with the each of rules, and further in accordance with which a first rule located at a lower hierarchy relative to a second rule is displayed below the second rule. This structure allows a system administrator to understand rule hierarchy and which rule is a lower hierarchy of which rule.

It is preferable that the screen-information maker makes screen information in accordance with which the each of hardwares and each of softwares are displayed such that a distance between the each of hardwares and each of softwares and the correspondence-display section is dependent on whether what is displayed is a hardware or software, and further in accordance with which a software installed in a hardware is displayed below the hardware. This structure makes it possible for a system administrator to know whether it is a hardware or software, and further, which hardware a software is installed in.

There is further provided an information-display system to be applied to a system for supporting security administration which system makes correspondence between each of rules as guidance relating to security in a network system, and each of hardwares of the network system and each of softwares installed in each of the hardwares, the information-display system including a screen-information memory which stores information about a screen having a section in which each of rules, each of hardwares and each of softwares are displayed, a screen-information maker which, based on the screen information stored in the screen-information memory, makes output information in accordance with which the hardwares and the softwares are displayed in the section, the each of rules is displayed around an area in which the hardwares and the softwares are displayed, and a line connecting a rule to a hardware or software associated with the rule, and an output device which displays the each of rules, the each of hardwares and each of softwares, and the line in a screen in accordance with the output information.

The above-mentioned information-display system in accordance with the present invention allows a system administrator to readily know a correspondence between a rule and a hardware or software.

In addition, the above-mentioned information-display system in accordance with the present invention indicates a system administrator policy collision and/or underpolicy both of which do not follow standards determined between security functions in a common segment. Since the above-mentioned information-display system indicates inconsistency and/or shortage in setting security functions, it would be possible to enhance security in a system to be administrated, and reduce burden of a system administrator.

It is preferable that the screen-information maker makes screen information in accordance with which a first rule located at a lower hierarchy relative to a second rule is displayed adjacent to the second rule. This structure allows a system administrator to understand which rule is a lower hierarchy of which rule.

It is preferable that the screen-information maker makes screen information in accordance with which a line connecting a software to a hardware in which the software is installed is displayed. This structure makes it possible for a system administrator to know which hardware a software is installed in.

In further aspect of the present invention, there is provided a method of displaying information to be applied to a system for supporting security administration which system makes correspondence between each of rules as guidance relating to security in a network system, and each of hardwares of the network system and each of softwares installed in each of the hardwares, the method including storing information about a screen having a rule-display section for displaying each of rules, a node-display section for displaying each of hardwares and each of softwares, and a correspondence-display section located between the rule-display section and the node-display section, based on the screen information, making output information in accordance with which each of rules is displayed in the rule-display section, each of hardwares and each of softwares are displayed in the node-display section, and a line connecting a rule to a hardware or software associated with the rule is displayed in the correspondence-display section, and displaying the each of rules, the each of hardwares and each of softwares, and the line in a screen in accordance with the output information.

There is further provided a method of displaying information to be applied to a system for supporting security administration which system makes correspondence between each of rules as guidance relating to security in a network system, and each of hardwares of the network system and each of softwares installed in each of the hardwares, the method including storing information about a screen having a section in which each of rules, each of hardwares and each of softwares are displayed, based on the screen information, making output information in accordance with which the hardwares and the softwares are displayed in the section, the each of rules is displayed around an area in which the hardwares and the softwares are displayed, and a line connecting a rule to a hardware or software associated with the rule, and displaying the each of rules, the each of hardwares and each of softwares, and the line in a screen in accordance with the output information.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 illustrates an example of each of classes included in the security class.

FIG. 5 illustrates an example of policy description.

FIG. 8 illustrates an example of topology description.

FIG. 13 illustrates an example of succession of a security function.

FIG. 15 illustrates an example of development of an inherit element.

FIG. 16 illustrates an example of a function map.

FIGS. 33A and 33B illustrate an example of a template used for acquiring a parameter.

FIG. 34 illustrates an example for extracting a parameter in accordance with a conditional expression of a nest structure.

FIG. 35 illustrates an example of a template which is used for acquiring a parameter and to which a parameter is described.

FIG. 36 illustrates an example of a template used for setting a script.

FIG. 37 illustrates an example of replacement in a template used for setting a script.

FIG. 42 illustrates an example of a format of vulnerability alert.

FIG. 44 illustrates an example of an output report.

FIG. 46 illustrates an example of description of constraint knowledge.

FIG. 47 illustrates an example of policy description.

FIG. 48 illustrates an example of topology description.

DESCRIPTION OF THE PREFERRED EMBODIMENTS

Preferred embodiments in accordance with the present invention will be explained hereinbelow with reference to drawings.

Security policy generally includes rules determining policies for man's action, such as rules for allowing a person to enter and leave a server room, and rules for handling a recording medium. However, the embodiments explained later handle rules as policies for setting security in a system to be administrated, among rules included in security policy.

In the embodiments explained later, a function relating to security, accomplished by each of hardwares or each of softwares, is referred to a security function.

First Embodiment

Figure 1:
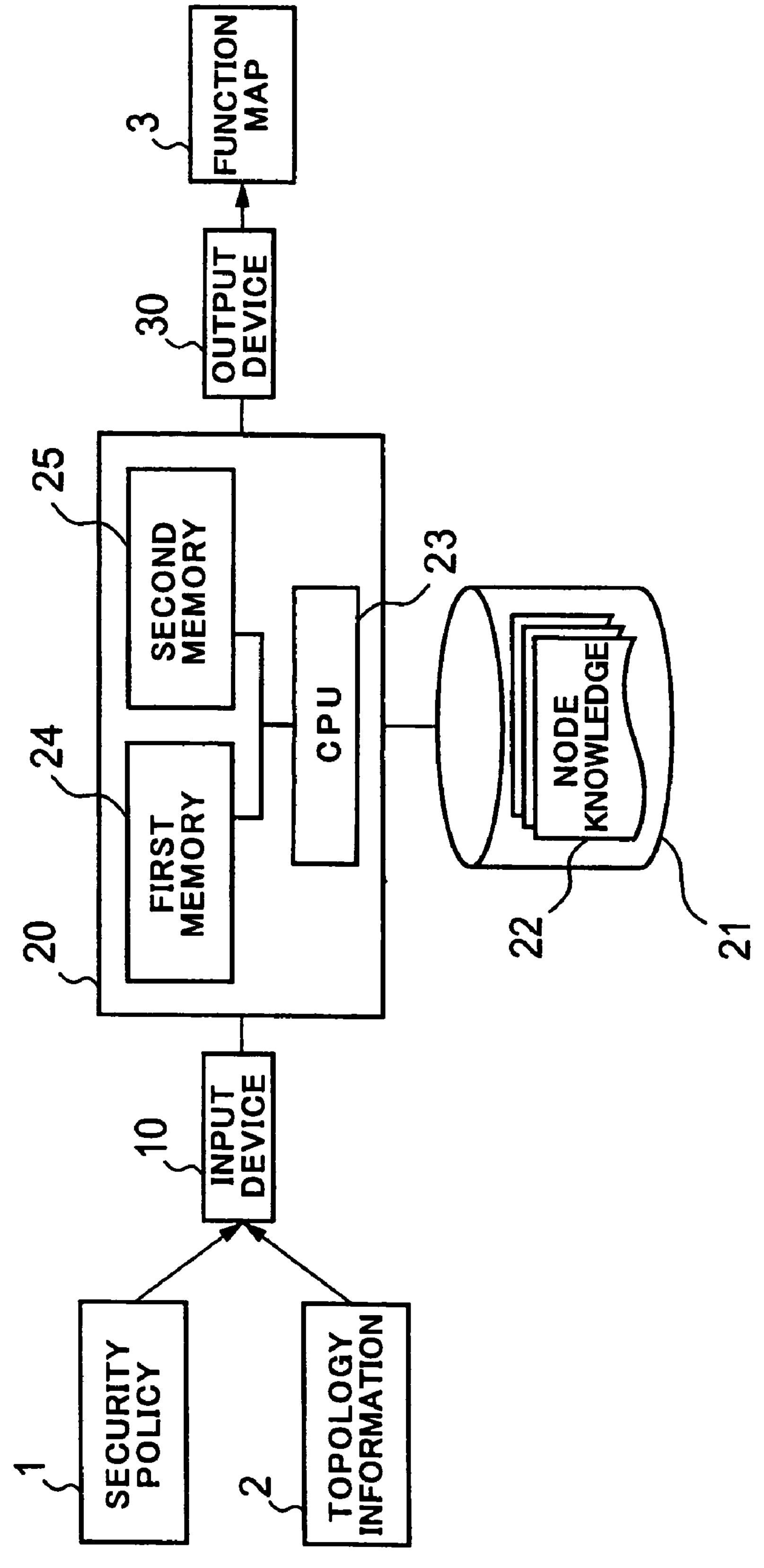
FIG. 1 is a block diagram of a system for supporting security administration, in accordance with the first embodiment of the present invention.

FIG. 1 is a block diagram of a system for supporting security administration, in accordance with the first embodiment of the present invention.

The system in accordance with the first embodiment is comprised of an input device 10, a correspondence maker or a function-mapping processor 20, a database 21 storing node knowledge therein (hereinafter, referred to as "node-knowledge database"), and an output device 30.

The input device 10 is comprised of a keyboard or a mouse, for instance. Security policy 1 and topology information 2 of a network system to which the security policy 1 is applied are input into the input device 10. The topology information 2 indicates each of hardwares of a network system to be administrated, and each of softwares installed in each of the hardwares, and further indicate correspondence between a software and a hardware in which the software is installed. In the first embodiment, the topology information 2 further indicates each of classes (segments mentioned later) of a communication network which the network system makes communication with, and further indicates correspondence between a class and a hardware belonging to the class.

The node-knowledge database 21, defined as a node-information memory in claims, stores node knowledge 22. Herein, node knowledge 22 means information indicative of which security function each of hardwares or softwares acting as nodes in the network system has. The node knowledge 22 is stored in advance in the node knowledge database 21. In the first embodiment and later mentioned embodiments, a node indicate both a hardware or hardwares constituting a network system, and a software or softwares installed in the hardware or each of the hardwares.

The correspondence maker 20 makes correspondence between each of rules included in the security policy 1 having been input into the input device 10, and a node described in the topology information 2, through a security function. Hereinbelow, a set of information indicating correspondence among a rule, a security function and a node is called a function map.

As illustrated in FIG. 1, the correspondence maker 20 is comprised of a central processing unit 23, a first memory 24, and a second memory 25.

Each of the first and second memories 23 and 24 is comprised of a semiconductor memory such as a read only memory (ROM), a random access memory (RAM) or an IC memory card, or a storage device such as a flexible disc, a hard disc or an optic magnetic disc.

The first memory 23 stores therein a program for supporting security administration. The second memory 25 stores therein various data and parameters. The central processing unit 23 reads the program out of the first memory 24, and executes the program. Thus, the central processing unit 23 operates in accordance with the program stored in the first memory 24.

The output device 30 is comprised of a display unit, for instance. The correspondence made by the correspondence maker 20 is output by the output device 30. For instance, the output device 30 may be comprised of a printer or another information-outputting device.

Hereinbelow is explained a security class.

A security class indicates each of items for accomplishing a rule, node knowledge and topology information. For instance, a security class includes a class indicative of a kind of a hardware, a class indicative of a kind of a software, and a class indicative of a security function. A security class expresses a rule, node knowledge and topology information such that a computer can recognize them.

Figure 2:
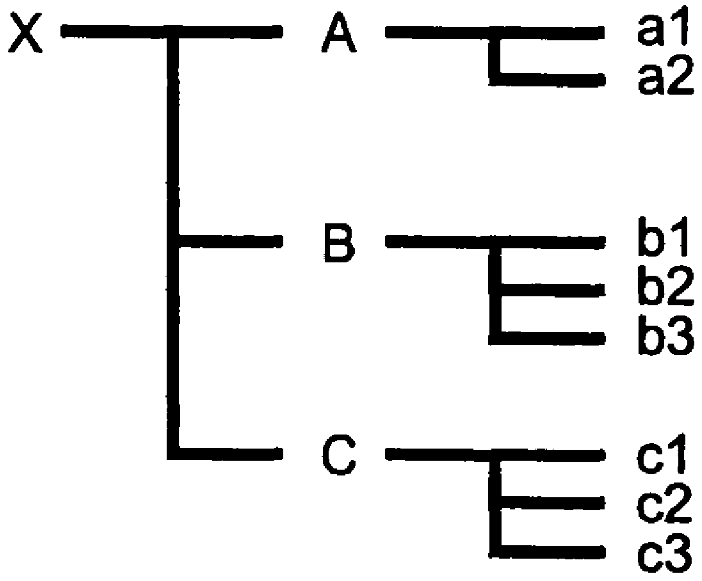
FIG. 2 illustrates a tree of security class.

FIG. 2 illustrates expression by security classes.

A concept expressed by security classes has a tree-structure. A root of the tree-structure indicates a highest-grade concept. A concept remoter from the root indicates a lower-grade concept.

For instance, FIG. 2 illustrates that the concepts A, B and C are lower-grade concepts relative to the concept X, and the concepts a1 and a2 are lower-grade concepts relative to the concept A.

In the security class, a certain concept is expressed as a path from the root to the certain concept. An arch connecting a parent concept and a child concept to each other is expressed as a dot ".", for instance. For instance, the concept b2 is expressed as "X. B. b2".

FIG. 3 illustrates an example of each of classes included in the security class.

In FIG. 3, "network-type-class" means a class indicative of a segment, which is explained later. For instance, DMZ (De-Militarized Zone) is expressed as "network.segment.dmz" in accordance with "network-type-class", and a boundary between Internet and DMZ is expressed as "network.segment-boundary.int-dmz".

In FIG. 3, "hardware-type-class" means a class indicative of a kind of a hardware. For instance, a generic server is expressed as "hardware.generic.server" in accordance with "hardware-type-class", and a router as a specific device is expressed as "hardware.specific.router" in accordance with "hardware-type-class".

In FIG. 3, "software-type-class" means a class indicative of a kind of a software. For instance a packet filtering software titled as "ipchains (trademark)" is expressed as "software.filtering.packet.ipchains" in accordance with "software-type-class". Redhat (trademark) among the operating system (OS) "Linux" is expressed as "software.os.linux.redhat".

In FIG. 3, "os" which is a child element of the root "software" is omitted.

In FIG. 3, "function-class" means a class indicative of a security function. For instance, a routing function is expressed as "function.router" in accordance with "function-class". A packet-filtering function is expressed as "function. filtering.packet". A function of providing service of prevention of raising is expresses as "function.service.integrity".

In FIG. 3, "account-class" means a class indicative of a user account used in a hardware and a software. For instance, a root account is expressed as "account.generic.root" in accordance with "account-class". An apache account is expressed as "account.specific.apache".

In FIG. 3, "specific" which is a child element of the root "account" is omitted.

In FIG. 3, "file-class" means a class indicative of whether a right of making access to a file is presented or not. For instance, an authorization of reading a file is expressed as "file.acl.readonly" in accordance with "file-class". An authorization of execution under a right of an owner is expressed as "file.authorization.setid".

In FIG. 3, "packet-class" means a class indicative of a kind of packet-transfer or a packet. For instance, "packet-transfer" is expressed as "packet-forward" in accordance with "packet-class", and "httpd packet" is expressed as "packet.tcp.httpd".

In FIG. 3, "information-class" means a class indicative of information about a response received from a hardware or software. For instance, information about a response received from a system is expressed as "information.fingerprinting".

Expression by the security class is not dependent on a specifically identified hardware or software. For instance, expression by the security class is not dependent on specific tradenames or version of a hardware or software. It should be noted that when a specific software is to be indicated, expression by the security class may be dependent on a tradename of the software. Though "hardware-type-class" shown in FIG. 3 does not express a specific tradename of version thereof, "hardware-type-class" may have a tree-structure to express a specific tradename or version. Except expression indicating a specific hardware or software, expression is not dependent on a hardware or software.

Figure 4:
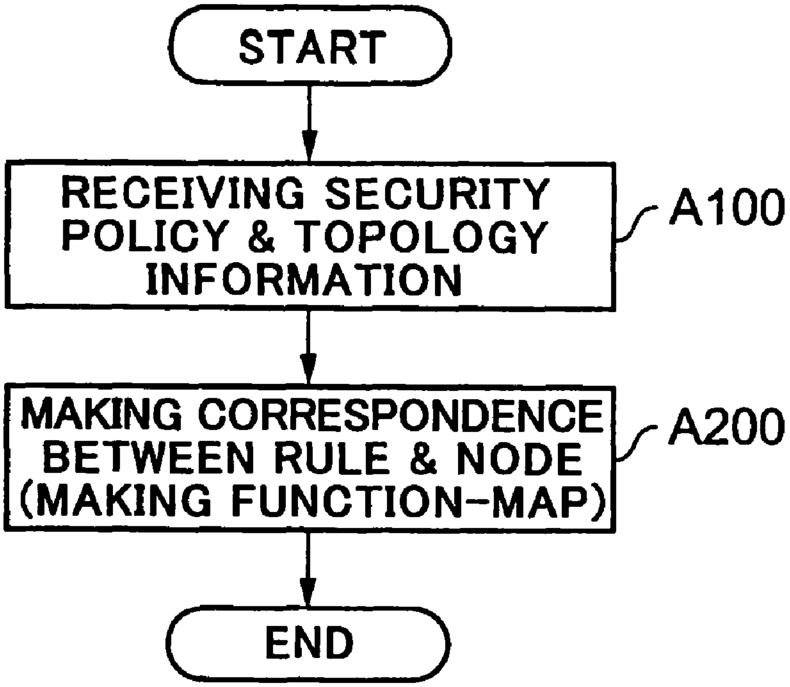
FIG. 4 is a flow-chart showing steps to be carried out by the system in accordance with the first embodiment of the present invention.

FIG. 4 is a flow-chart showing steps to be carried out in the system for supporting security administration.

The input device 10 receives the security policy 1, and the topology information 2 about a network system to which the security policy 1 is applied, from a user. The input device 10 transmits the thus received information to the correspondence maker 20, in step A100.

Then, the correspondence maker 20, based on the node knowledge 22, makes correspondence between each of rules included in the security policy 1 and each of nodes described in the topology information 2, to thereby make a function map 3, in step A200.

Hereinbelow is explained the security policy 1 input into the input device in step A100.

The security policy 1 is input into the input device 10 through GUI, for instance. Then, the security policy 1 is transformed into a format readable by a computer. Hereinbelow, information describing therein a security policy in a format readable by a computer is referred to as policy description, and a portion indicative of each of rules in policy description is referred to as a policy element. A policy element is associated with a rule, and a policy element indicates an associated rule in a format readable by a computer.

FIG. 5 illustrates an example of policy description which describes the security policy in a format similar to XML (extensible Markup Language).

In the policy description illustrated in FIG. 5, an area 71 sandwiched between <policies> describes entirety of the security policy. Each of areas 72 sandwiched between <policy> indicates each of the policy elements.

A rule may have a hierarchy structure in accordance with meaning levels. Level attribute 73 shown in FIG. 5 indicates a level of a rule. FIG. 5 illustrates an example in which a level of a rule is designed to have two steps. A rule of a first level expressed as "level="1"" indicates whether there is a security solution such as "a certain security function is accomplished at a certain node or not", for instance. A rule of a second level expressed as "level="2"" indicates a detailed security solution such as “the security function declared to be accomplished in the first level is defined like this”, for instance.

Name attribute 74 in each of the policy elements describes a name in accordance with which each of rules is singly selected. The policy element includes a comment element 75 describing explanation of each of rules in natural language. The comment element 75 is described together with a comment tag. The policy element includes a subject element 76 indicative of a security function of a node to which a rule associated with the policy element is applied. The subject element 76 is described in accordance with the security class.

The subject element 76 may include a wild card such as “*”. In “packet.forward.*.httpd” shown in FIG. 5, “*” indicates a wild card, and “packet.forward.*.httpd” means that any information can be selected, if it has “forward” as a parent, and “httpd” as a child in the security class.

The policy element includes an action element 77 indicative of whether a security function indicated by the subject element 76 can be accomplished or not. The action element 77 is described together with an action tag.

The action element 77 included in the policy element of the first level indicates “add”, “delete”, “change”, “keep”, and so on. The “add” means that a security function indicated by the subject element 76 of the first level is accomplished. The “delete” means that a security function indicated by the subject element 76 of the first level is not accomplished. The “change” means that when security policy is changed for reflecting settings in accordance with the changed security policy, to a network system, accomplishment of the security function is changed. That is, if a security function was set to be accomplished, the security function is changed not to be accomplished, and if a security function was set not to be accomplished, the security function is changed to be accomplished. The “keep” means that when settings in accordance with the changed security policy is reflected to a network system, accomplishment of the security function is kept unchanged.

The action element 77 included in the policy element of the second level indicates “authorize”, “disauthorize”, and so on. The “authorize” means that a security function indicated by the subject element 76 of the second level is accomplished. The “disauthorize” means that a security function indicated by the subject element 76 of the second level is not accomplished.

The policy element of the first level includes a segment element 78 designating a segment. In the first embodiment, it is assumed that a communication network as a part of the network system to be administrated is divided into segments, and correspondence is made for each of segments between a rule and a node. Thus, a segment means one of portions into which a communication network is divided.

Figure 6:
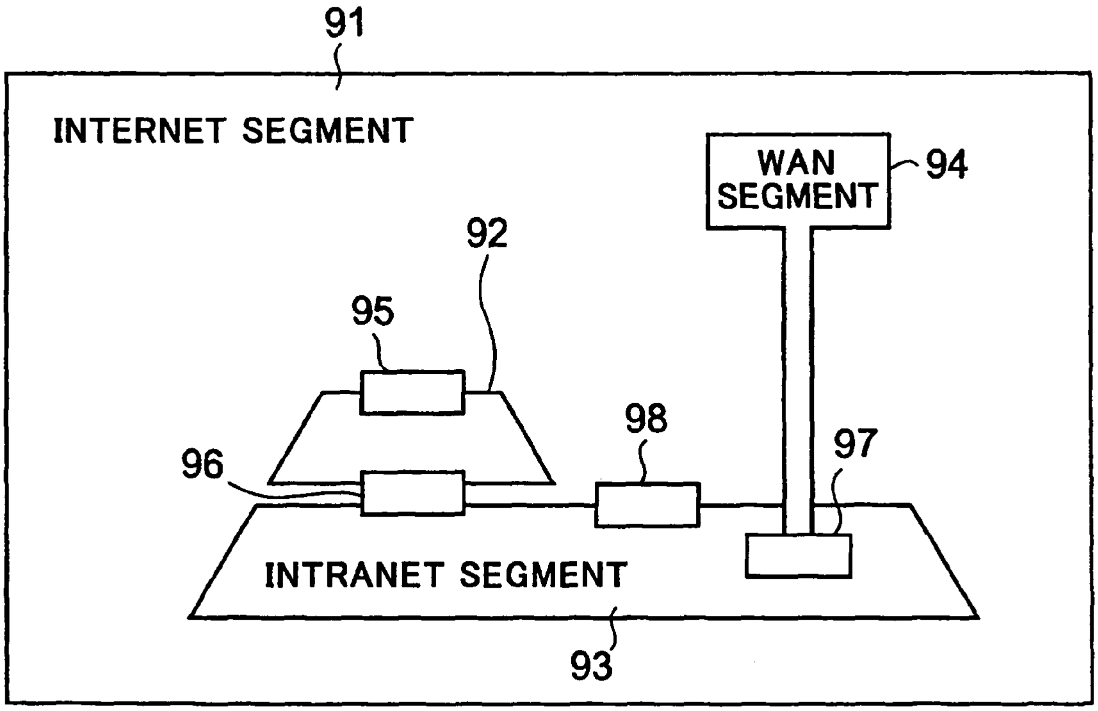
FIG. 6 illustrates an example of a segment.

FIG. 6 illustrates an example of a segment. A communication network as a part of the network system to be administrated is classified, for instance, into Internet 91, a demilitarized zone (DMZ) 92, an intranet 93, and WAN 94. Boundaries between the classified communication networks, such as a boundary 95 between Internet and DMZ, a boundary 96 between DMZ and the intranet, a boundary 97 between WAN and the intranet, and a boundary 98 between Internet and the intranet, may be classified as segments. Correspondence between a rule and a node can be readily made by classifying a communication network into segments, and making correspondence between a rule and a node for each of the segments.

The segment element 78 is described in accordance with the security class. For instance, a segment element indicating DMZ is expressed as “network.segment.dmz”, and a segment element indicating the boundary 95 between Internet and DMZ is expressed as “network.segment-boundary.int-dmz” (refer to “network-type-class” shown in FIG. 3).

The segment element 78 is described only in the policy element of the first level. To a policy element of the second level is applied a segment element described at the first level as a parent of the policy element. The segment element 78 is described together with a segment tag.

A policy element, when a parent policy element thereof exists, includes a parent element 79. Herein, the parent element 79 means information identifying a parent policy element. For instance, the parent element 79 identifies a parent policy element by designating a name attribute. The parent element 79 is described together with a parent tag.

A priority element 80 shown in FIG. 8 indicates precedence of a priority of each of rules. In the example shown in FIG. 5, the policy element “A004-2-2” includes the priority element 80 identifying “A004-2-1”. This means that a priority of a rule “A004-2-2” is higher than a priority of a rule “A004-2-1”.

Hereinbelow is explained precedence among priorities of rules.

By combining a plurality of rules to one another, and determining a priority in accordance with which a rule is applied, it is possible to define a standard relating to security. When a rule having a high priority is applied to an event, rules having lower priorities are ignored. When a rule having a high priority is not applied to an event, a rule having a lower priority is applied to the event.

For instance, it is assumed that as a rule relating to a packet filtering function, we have a first rule “all packets are prohibited to pass” (the rule “A004-2-1” in FIG. 5) and a second rule “httpd packet is allowed to pass” (the rule “A004-2-2” in FIG. 5), and that the second rule has a higher priority than that of the first rule. If there occurs an event “httpd packet has arrived”, the second rule is applied to the event, and the first rule is ignored. On the other hand, if there occurs an event “packets other than httpd packet have arrived”, the second rule (A004-2-2) is not applied to the event, but the first rule (A004-2-1) is applied to the event, because the packets other than httpd packet are not packets to which the second rule is applied. As a result, it is possible to accomplish a standard that packets other than httpd packet are not allowed to pass.

The security policy 1 does not include a rule which identifies a tradename of a software or hardware or version data to thereby directly designate settings in the software or hardware. Hence, the policy description as shown in FIG. 5 does not include description dependent on a specific software or hardware.

FIG. 5 illustrates just an example of policy description, and hence, a format for describing the policy description is not to be limited to the format shown in FIG. 5. What is necessary in the policy description is to describe security policy readable by a computer. For instance, FIG. 5 illustrates an example in which the elements are described together with tags, but it should be noted that if a computer can recognize the elements, it is not always necessary to describe the elements together with tags.

Hereinbelow is explained the topology information 2 to be input into the input device 10 in step A100.

Figure 7:
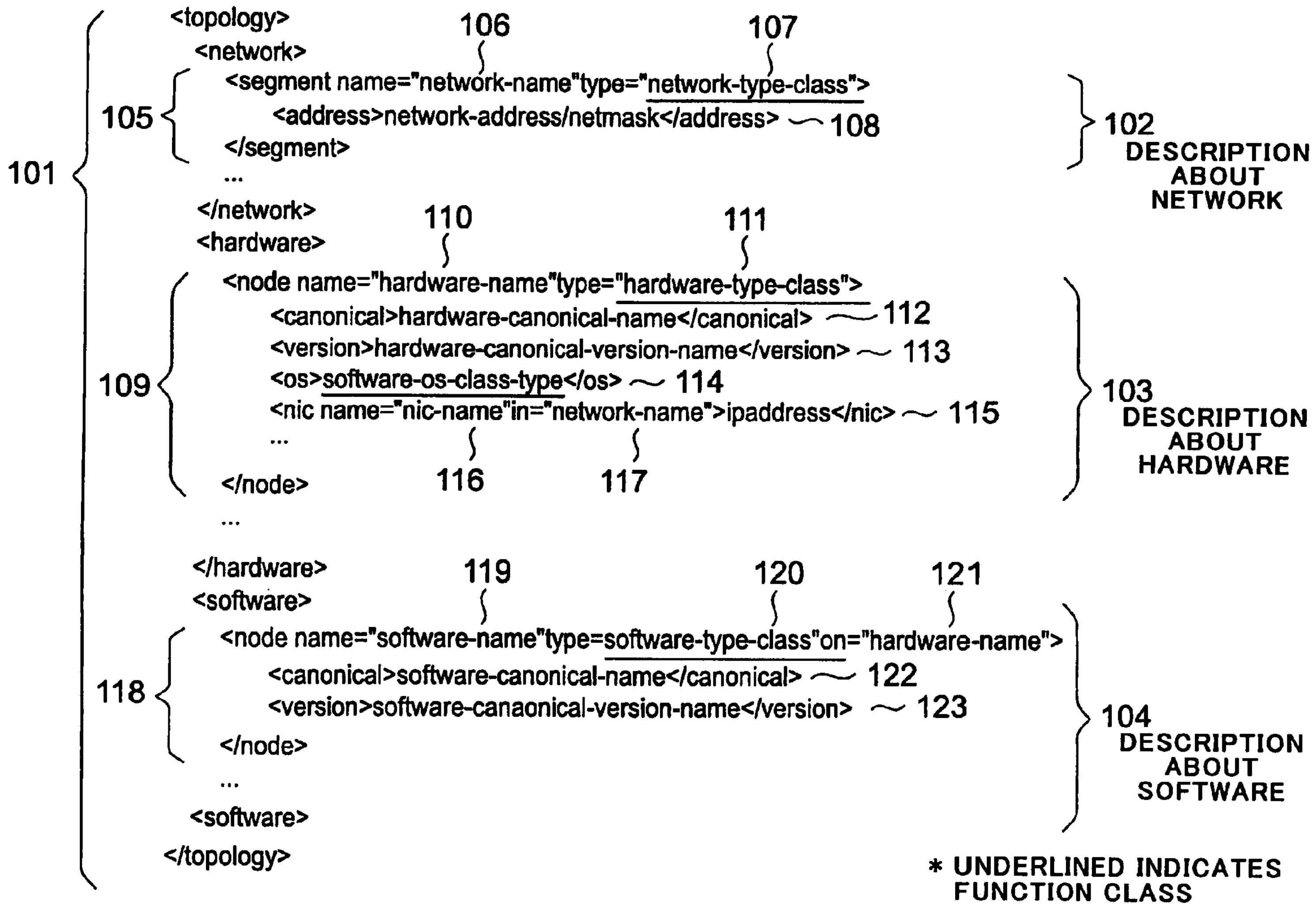
FIG. 7 illustrates an example of a description format of topology description.

The topology information 2 is input into the input device 10, for instance, through GUI. The topology information having been input into the input device 10 through GUI is transformed into a format readable by a computer. Hereinbelow, topology information described in a format readable by a computer is referred to as topology description. FIG. 7 illustrates an example of a description format of the topology description. In FIG. 7, the topology information 2 is described in a format similar to XML (eXtensible Markup Language).

In the topology description illustrated in FIG. 7 as an example, an area 101 sandwiched between <topology> indicates description of the topology information 2 at its entirety. The topology information 2 includes description relating to a network, a hardware and a software. In FIG. 7, an area 102 sandwiched between <network> tags indicates description relating to a network, an area 103 sandwiched between <hardware> tags indicates description relating to a hardware, and an area 104 sandwiched between <software> tags indicates description relating to a software.

The description relating to a network includes a segment element 105. The segment element 105 means information indicative of each of segments used by a network system to be administrated. If a network system to be administrated uses a plurality of segments, the description relating to a network includes a plurality of segment elements 105.

In name attribute 106 of the segment element 105, a name identifying a single segment is described. The name is designated by a system administrator.

In type attribute 107 of the segment element 105, a kind of a segment is described in accordance with "network-type-class" of the security class. For instance, when DMZ is expressed, "network.segment.dmz" is described in the type attribute 107, and when an intranet is expressed, "network-.segment.intra" is described in the type attribute 107. When the boundary 95 between Internet and DMZ is expressed, "network.segment-boundary.int-dmz" is described in the type attribute 107.

An address element 108 as a child element of the segment element 105 indicates an IP address (network address) of the segment. A plurality of address elements may be selected for a single segment element. For instance, an IP address is expressed as "xxx.xxx.xxx.xxx/yy", "0/0" which means "all", or "any/0".

The description relating to a hardware include a node element 109. The node element 109 means information indicative of each of hardwares included in a network system to be administrated. The node element 109 is described in each of hardwares.

In name attribute 110 of the node element 109, a name identifying a single hardware is described. The name is designated by a system administrator.

In type attribute 111 of the node element 109, a kind of a hardware is described in accordance with "network-type-class" of the security class. For instance, when a generic server is expressed, "hardware.generic.server" is described in the type attribute 110, and when a router or a firewall is expressed, "hardware.specific.router" or "hardware.specific-.firewall" is described in the type attribute 110.

A canonical element 112 indicates a tradename of a hardware. A version element 113 indicates a detailed tradename of a hardware such as a model name or a version name. A combination of the canonical element 112 and the version element 113 identifies a single hardware in a level of a tradename.

An OS element 114 indicates an OS (operating system) working on a hardware, through the use of "hardware-type-class" of the security class.

In FIG. 7, a nic element 115 indicates an IP address assigned to a network interface device of a hardware, such as a LAN card or a LAN board. The IP address is expresses in the form of xxx.xxx.xxx.xxx, for instance.

In a name attribute 116 of the nic element 115, a name identifying only one network interface device for each of hardwares is described. The name is designated by a system administrator.

In in attribute 117 of the nic element 115, a segment to which a network interface device is connected is described. The in attribute 117 identifies a segment, for instance, by designating the name attribute 116 of a segment. A single node element 109 may contain a plurality of nic elements 115.

The description relating to a software contains a node element 118. The node element 118 means information indicative of each of softwares installed in each of hardwares.

In name attribute 119 in the node element 118, a name identifying only one software is described. The name is designated by a system administrator.

In type attribute 120 of the node element 118, a kind of a software is described in accordance with "software-type-class" of the security class. For instance, when a packet filtering software titled "ipchains (trademark)" is expressed, "software.filtering.packet.ipchains" is described in the type attribute 120.

In on attribute 122 of the node element 118, a hardware in which the software is installed is described. The on attribute 120 identifies a hardware by designating the name attribute 110 of a hardware, for instance.

A canonical element 122 indicates a title of an application of a software. A version element 123 indicates a version of a software. A combination of the canonical element 122 and the version element 123 identifies only one software in a level of a tradename.

FIG. 8 shows an example of topology description described in accordance with the description format shown in FIG. 7.

Topology information indicative of correspondence between a segment and a hardware and correspondence between a hardware and a software can be accomplished through the use of the topology description shown in FIG. 7.

The topology information 2 includes information identifying a software and/or a hardware, such as a tradename or version data. Accordingly, the topology description includes description dependent on each of softwares and hardwares.

FIG. 7 illustrates just an example of a description format of the topology description, and hence, a format for describing the topology description is not to be limited to the format shown in FIG. 7. What is necessary in the topology description is to describe topology information readable by a computer.

Hereinbelow is explained an example of how the security policy 1 and the topology information 2 are input into the input device 10 in step A100.

Figure 9:
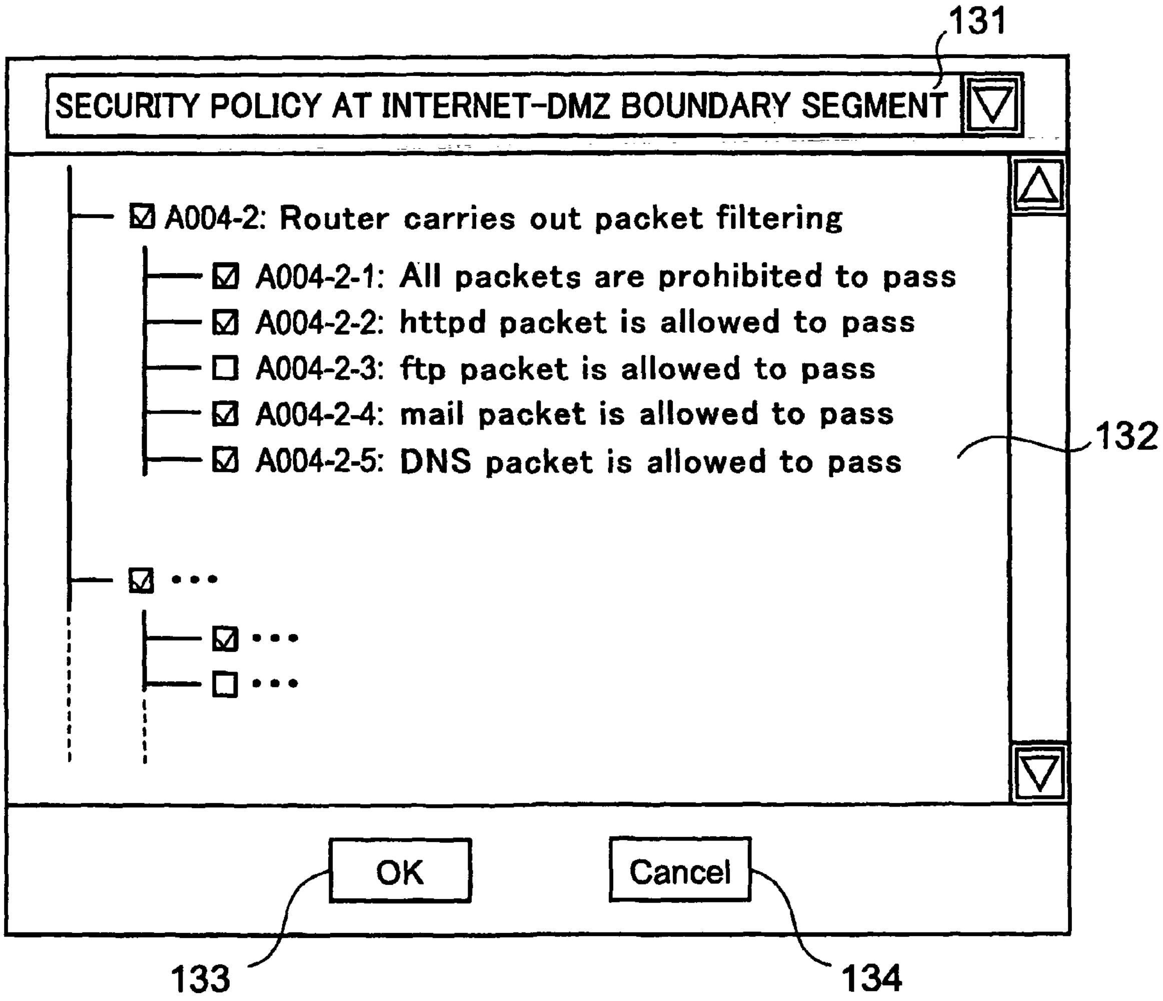
FIG. 9 illustrates an example of GUI for urging a user to input security policy.

FIG. 9 illustrates an example of GUI through which a user inputs the security policy 1.

The central processing unit 23 causes the output device 30 to display GUI in step A100. The display control of GUI is made by the central processing unit 23, and GUI data is stored in the second memory 25.

As illustrated in FIG. 9, GUI includes a segment-indicating column 131 for indicating a segment, and a rule-inputting column 132 for designating a rule.

A system administrator designates a segment through the segment-indicating column 131, and further, selects a rule or rules to be applied to the designated segment, through the rule-inputting column 132. A system administrator inputs the security policy by inputting a rule for each of segments.

When an OK button 133 is clicked by a mouse, the central processing unit 23 finalizes a rule or rules having been input for the designated segment. When a cancel button 134 is clicked by a mouse, the central processing unit 23 invalidates a rule or rules having been input for the designated segment.

Thus, a system administrator input entirety of the security policy 1 by inputting a rule or rules for each of segments through the input device 10. The central processing unit 23 makes the policy description in accordance with the input security policy, and stores the policy description in the second memory 25.

A system administrator may directly input the policy description without using GUI. Specifically, a system administrator may directly input text data based on which the policy description is made, into the input device 10 through an editor (not illustrated), for instance. As an alternative, a system administrator may input the security policy described in another format, in which case, the central processing unit 23 transforms the security policy into policy description, and stores the policy description in the second memory 25.

Figure 10:
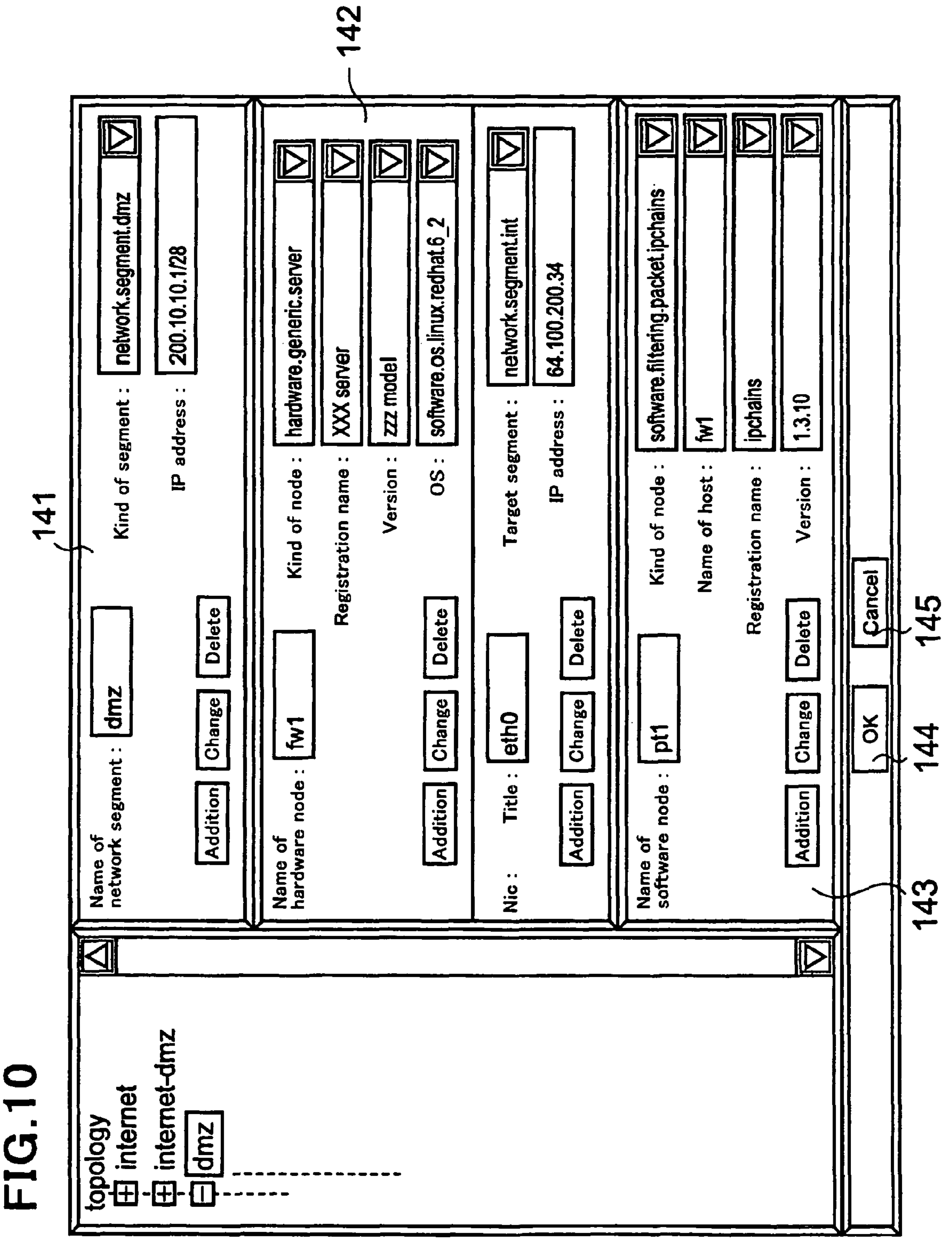
FIG. 10 illustrates an example of GUI for urging a user to input topology information.

FIG. 10 illustrates an example of GUI through which a user inputs the topology information 2.

The central processing unit 23 causes the output device 30 to display GUI illustrated in FIG. 10, in step A100. GUI data is stored in advance in the second memory 25. GUI includes a first column 141 through which network information is input, a second column 142 through which hardware information is input, and a third column 143 through which software information is input.

The first column 141 includes columns through which a title of a segment (the name attribute 106), a kind of a segment (the type attribute 107), and an IP address (the address element 108) are input.

The second column 142 includes columns through which a title of a node (the name attribute 110), a kind of a node (the type attribute 111), a registration name (the canonical element 112), a version (the version element 113), and OS (the os element 114) are input. The second column 142 further includes columns through which a name of a network interface device (the name attribute 116), a name of a target segment (the in attribute 117), and an IP address (the nic element 115) are input.

The third column 143 includes columns through which a name of a node (the name attribute 119), a kind of a node (the type attribute 120), a name of a host (the on attribute 121), a registration name (the canonical element 122), and a version (the version element 123) are input.

A system administrator inputs required information through the first to third columns 141 to 143.

When an OK button 133 is clicked by a mouse, the central processing unit 23 finalizes the input information. When a cancel button 145 is clicked by a mouse, the central processing unit 23 invalidates the information input through GUI.

The central processing unit 23 receives the topology information 2 through the input device 10. The central processing unit 23 makes the topology description in accordance with the input information, and stores the topology description in the second memory 25.

A system administrator may directly input the topology description without using GUI. Specifically, a system administrator may directly input text data based on which the topology description is made, into the input device 10 through an editor (not illustrated), for instance. As an alternative, a system administrator may input the topology information having been extracted through a conventional system for extracting topology information, in which case, the central processing unit 23 transforms the topology information into topology description, and stores the topology description in the second memory 25. As such a system for extracting topology information, there is a network administration system which collects IP addresses of hardwares in accordance with SNMP (Simple Network Management Protocol) or TCP/IP.

Hereinbelow is explained the step A200 in which correspondence between a rule and a node is made.

In the step (hereinbelow, referred to as "correspondence-making step" or "function-mapping step"), correspondence is made between each of rules included in the security policy 1, and a node which accomplishes setting of security associated with the each of rules. Since the security policy 1 does not include information dependent on a software or hardware, correspondence between a rule and a node is made through the use of a security function.

Figure 11:
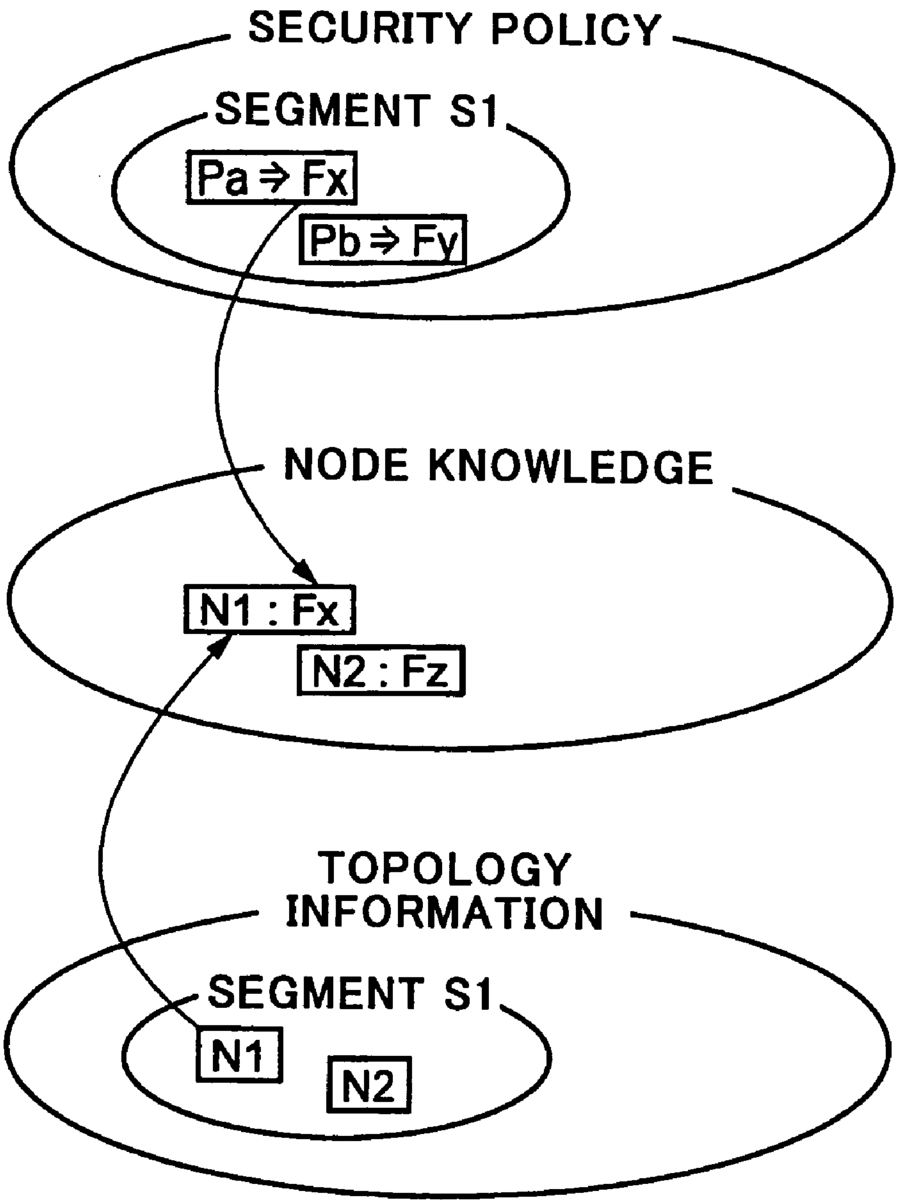
FIG. 11 illustrates a concept of function-mapping process.

FIG. 11 shows a concept of the function-mapping step.

As illustrated in FIG. 11, it is assumed that rules Pa and Pb exist in a certain segment S1 in the security policy, and the rules Pa and Pb are accomplished by security functions Fx and Fy, respectively, nodes N1 and N2 are included in the segment S1 in the topology information, and the nodes N1 and N2 are described to have the security functions Fx and Fy in the node knowledge 22 included in the node knowledge database 21.

As illustrated in FIG. 11, correspondence between the rule Pa and the node N1 is made through the security function Fx. A combination of the rule Pa, the security function Fx and the node N1 means that the rule Pa is accomplished by the security function Fx included in the node N1.

Specifically, the correspondence maker 20 carries out the correspondence-making or function-mapping step through the use of the policy description, the topology description and the node knowledge 22. Hereinbelow, an example of the node knowledge 22 stored in the node knowledge database 21 is explained, and then, the correspondence-making step is explained in detail.

Figure 12:
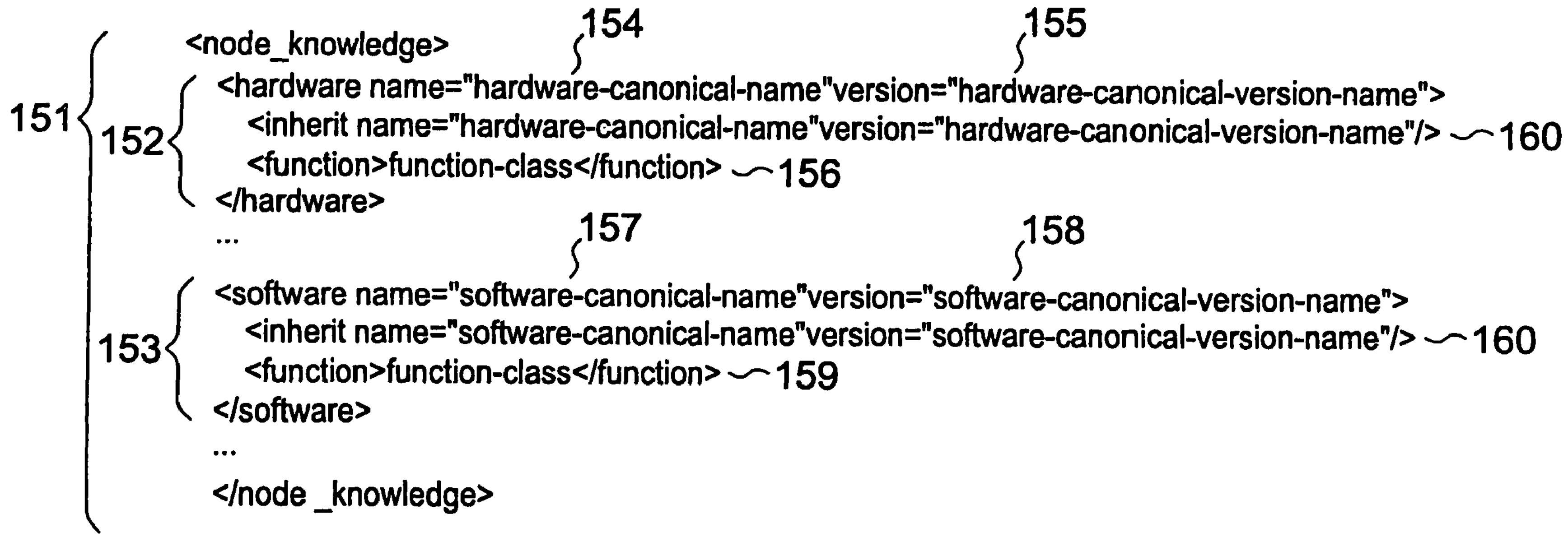
FIG. 12 illustrates an example of a description format of node knowledge.

FIG. 12 shows an example of a description format of the node knowledge 22.

In FIG. 12, an area sandwiched between <node_knowledge> tags is an area in which the node knowledge 22 is described in entirety. The node knowledge 22 includes a hardware element 152 and a software element 153. The hardware element 152 means information indicative of a hardware as a node, and a security function accomplished by the hardware. The software element 153 means information indicative of a software as a node, and a security function accomplished by the software. The node knowledge 22 includes a plurality of the hardware elements 152 and the software elements 153 in accordance with a kind of a hardware or software.

In name attribute 154 of the hardware element 152, a tradename of a hardware and other information are described. Hereinbelow, a content described in the name attribute 154 of the hardware element 152 is referred to as "hardware-canonical-name".

In version attribute 155 of the hardware element 152, detailed names such as a model name of a hardware and a version name are described. Hereinbelow, a content of the version attribute 155 of the hardware element 152 is referred to as "hardware-canonical-version-name".

A combination of the name attribute 154 and the version attribute 155 of the hardware element 152 identifies only one hardware in a tradename level. In the topology description illustrated in FIG. 7, the canonical element 112 and the version element 113 both identifying a hardware is designated among "hardware-canonical-name" and "hardware-canonical-version-name" both included in the node knowledge 22.

A function element 156 as a child element of the hardware element 152 indicates a security function accomplished by the hardware. The function element 156 is described through the use of "function-class" of the security class. For instance, if a hardware has a packet-filtering function, "function.filtering.packet" is described in the function element 156. If a hardware has a routing function, "function.router" is described in the function element 156.

In name attribute 157 of the software element 153, an application name of the software and other information are described. Hereinbelow, a content of the name attribute 157 of the software element 153 is referred to as "software-canonical-name".

In version attribute 158 of the software element 153, a version name is described. Hereinbelow, a content of the version attribute 158 of the software element 153 is referred to as "software-canonical-version-name".

A combination of the name attribute 157 and the version attribute 158 of the software element 153 identifies only one software in a tradename level. In the topology description illustrated in FIG. 7, the canonical element 122 and the version element 123 both identifying a software is designated among "software-canonical-name" and "software-canonical-version-name" both included in the node knowledge 22.

A function element 159 as a child element of the software element 153 indicates a security function of the software. The function element 159 is described through the use of "function-class" of the security class.

The number of the function element included in the hardware element 152 and the software element 153 is not to be limited to one.

Security functions of other hardware elements and software elements may be succeeded together with the hardware element 152 and the software element 153.

An inherit element 160 shown in FIG. 12 means information indicative of a hardware or software to which a security function is succeeded. The inherit element 160 designates either a combination of "hardware-canonical-name" and "hardware-canonical-version-name" or a combination of "software-canonical-name" and "software-canonical-version-name" to identify a node of a hardware or software from which a security function is succeeded.

FIG. 13 illustrates an example of succession of a security function.

A software element 153*b* shown in FIG. 13 designates a software element 153*a* in the inherit element. Accordingly, the software indicated by the software element 153*b* takes over three security functions from the software element 153*a*, and further, two security functions described directly in the software element 153*b*.

FIG. 12 illustrates just an example of a description format of the node knowledge 22, and hence, a format for describing the node knowledge 22 is not to be limited to the format shown in FIG. 12. What is necessary in the node knowledge 22 is to describe what security functions a hardware and/or a software have in a format readable by a computer.

Figure 14:
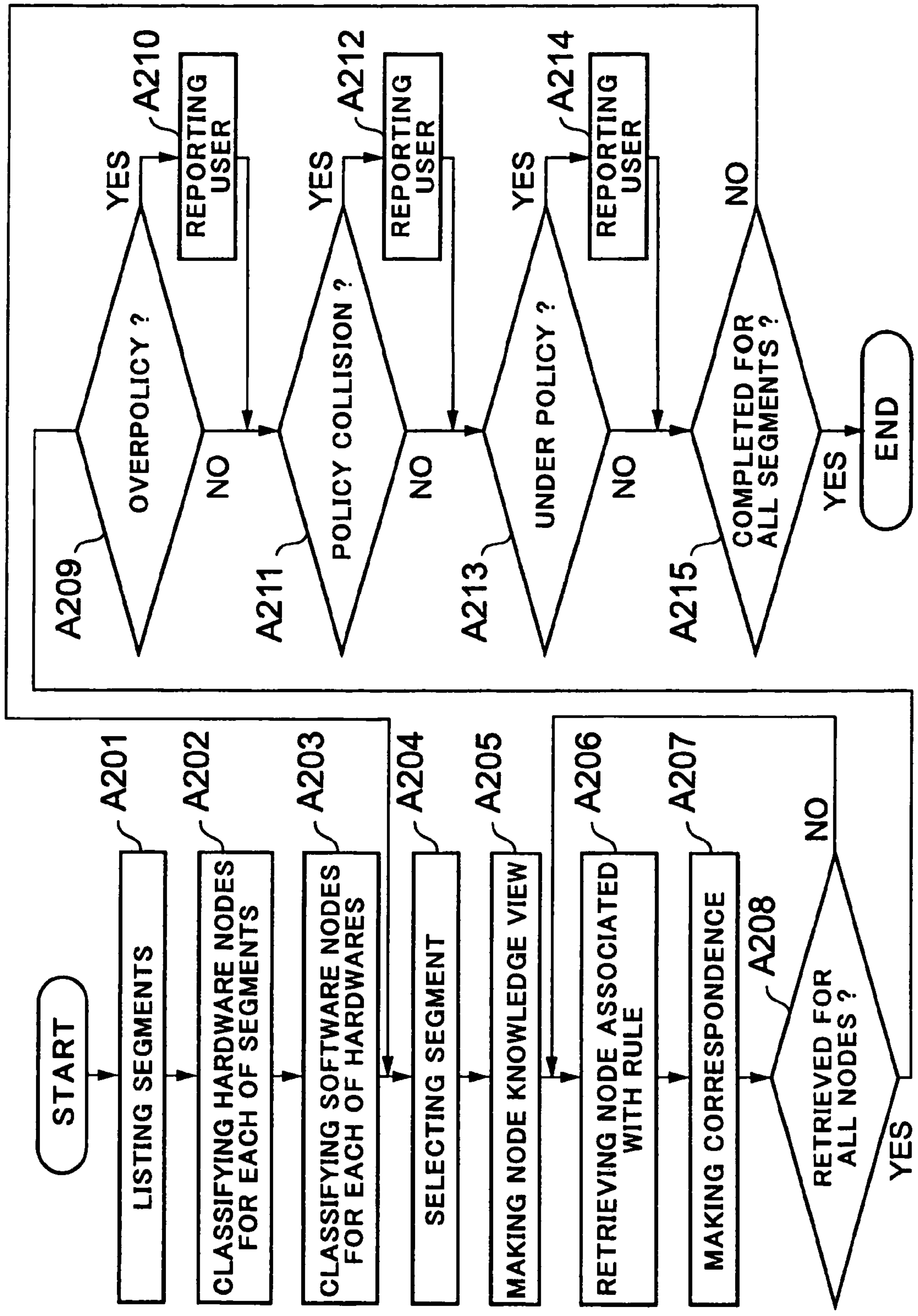
FIG. 14 is a flow-chart showing steps to be carried out in function-mapping process.

FIG. 14 is a flow-chart showing steps to be carried out in the correspondence-making step (step A200).

It is assumed that the policy description, the topology description and the node knowledge are described in the formats shown in FIGS. 5, 7 and 12, respectively, and that a rule is determined for each of segments, and each of policy elements is associated with each of the segments.

The correspondence maker 20 extracts information relating to each of segments used by a network system to be administrated, in step A201. Specifically, the correspondence maker 20 extracts information relating to each of segments by extracting each of the segment elements 105 (see FIG. 7) included in the topology description.

Then, the correspondence maker 20 identifies which segment each of hardwares which will make a node in the system to be administrate belongs to, in step A202.

Specifically, the correspondence maker 20 extracts a node (the node element 109) of a hardware included in the topology description, and checks the in attribute 117 of the nic element 115 in the extracted node. Then, the correspondence maker 20 identifies the segment element 105 having the name attribute 106 identical to the in attribute 117, to thereby identify a segment to which the hardware belongs. The correspondence maker 20 carries out this step for nodes of all of the hardwares included in the topology description.

Then, the correspondence maker 20 identifies which host or hardware each of softwares used by the system to be administrated operates in, in step A203.

Specifically, the correspondence maker 20 extracts a node (the node element 118) of a software included in the topology description, and checks the on attribute 121 of the extracted node. Then, the correspondence maker 20 identifies a node having the name attribute 110 identical to the on attribute 121, to thereby identify a hardware in which the software is installed. The correspondence maker 20 carries out this step for nodes of all of the softwares included in the topology description.

When the steps A201 to A203 are completed, the nodes are classified to each of the segments.

Then, the correspondence maker 20 selects a segment out of the segments used by the system to be administrated, in step A204. Specifically, the correspondence maker 20 selects one of the segment elements 105 included in the topology description.

Then, the correspondence maker 20 retrieves the node knowledge database 21 to extract node knowledge of all of the nodes (hardware and software) classified as nodes belonging to the selected segment, in step A205.

Hereinbelow, the node knowledge relating only to a node belonging to the segment selected in the step A204 is referred to as node knowledge view. The node knowledge view is a partial sum of the node knowledge 22 stored in the node knowledge database 21.

Specifically, the correspondence maker 20 checks the canonical element and the version element of the node having been judged to belong to the segment (the segment element 105) selected in the step A204. Then, the correspondence maker 20 extracts the hardware element 152 or the software element 153 having "hardware-canonical-name" and "hardware-canonical-version-name" or "software -canonical-name" and "software-canonical-version-name", identical to the canonical element and the version element, out of the node knowledge database 21. The correspondence maker 20 carries out this extraction step for all of the nodes having been judged to belong to the selected segment. A sum of the thus extracted hardware element 152 and the software element 153 makes the node knowledge view.

The correspondence maker 20, when extracting the hardware element 152 or the software element 153, if the inherit element is included in the hardware element 152 or the software element 153, develops the inherit element to the function element described in the node from which a security function is succeeded.

FIG. 15 illustrates an example of the developed inherit element.

It is assumed that a certain software element includes an inherit element therein, as illustrated in FIG. 15-(A), and that a software node (software element) indicated by the inherit element includes three function elements, as illustrated in FIG. 15-(B).

When correspondence maker 20 extracts the software element illustrated in FIG. 15-(A) as node knowledge view, the correspondence maker 20 develops the inherit element into the three function elements illustrated in FIG. 15-(B).

After making the node knowledge view, the correspondence maker 20 extracts a rule associated with the segment selected in the step A204, out of the rules included in the security policy. Then, the correspondence maker 20 finds a node having the security function which accomplished the extracted rule, out of the node knowledge view, in the step A206.

In step A206, the correspondence maker 20 can extract a rule (the policy element) associated with the selected segment by virtue of the segment element 78 (FIG. 5) included in the policy description. The segment element 78 is not included in the policy elements except the policy element of the first level. To the policy elements of lower levels is applied the segment element 78 of the first level. Accordingly, the correspondence maker 20 can judge which segment the policy element is associated with.

When the correspondence maker 20 retrieves a node having a security function which can accomplish a rule (the policy element) associated with the selected segment, the correspondence maker 20 may retrieve a node (the hardware element 152 and the software element 153) having a function element including a content of the subject element 76, by reviewing the subject element 76 (see FIG. 5).

The correspondence maker 20 concurrently retrieves a node having a function element having a lower concept o the subject element 76. For instance, assuming that a certain policy element has "function.filtering.packet" as the subject element 76, nodes having a function element having lower concept (for instance, "function.filtering.packet.tcp.httpd") are also retrieved.

The correspondence maker 20 makes correspondence between a rule (the policy element) in the selected segment and the retrieved node (the hardware element 152 and the software element 153), in step A207. The correspondence maker 20 further makes correspondence between a security function and rule/node. A security function is one which can accomplish the rule, and which is accomplished by the node.

If the associated node is not found in step A206, information indicative of no existence of the associated node is stored in the second memory 25.

Then, the correspondence maker 20 judges whether the steps A206 and 207 were carried out for each of the rules associated with the segment selected in the step A204, in step A208.

If there is a rule for which the steps A206 and A207 were not carried out (NO in step A208), the steps A206 and A207 are repeatedly carried out for the rule.

If it is judged that the correspondence maker 20 carried out the steps A206 and A207 for all of the rules associated with the segment selected in the step A204 (YES in step A208), the correspondence maker 20 judges whether overpolicy occurs or not, in step A209. Herein, "overpolicy" means that there does not exist a node having a security function which accomplishes the input rule.

If a node cannot be retrieved for a certain rule to which the node is associated in step A206, the correspondence maker 20 judges that there occurs overpolicy (YES in step A209). When the correspondence maker 20 judges that overpolicy occurs, the correspondence maker 20 causes the output device 30 to output a report indicating occurrence of overpolicy, in step A210.

When the correspondence maker 20 judges that overpolicy does not occur (NO in step A209), the correspondence maker 20 judges whether there occurs policy collision, in step A211. Herein, policy collision means that correspondence among a plurality rules having meanings contradictory to one another is made to a common node. For instance, it is assumed that a rule (the policy element) has a subject element having a content "function.filtering.packet.tcp.httpd (passing of httpd packets)", and an action element having a content "authorize". In the event, the rule has a content that httpd packets are allowed to pass. For instance, it is assumed that a rule (the policy element) has a subject element having a content "function.filtering.packet.tcp.httpd (passing of httpd packets)", and an action element having a content "disauthorize". In the event, the rule has a content that httpd packets are not allowed to pass. If such two rules are associated with a common node, there would exist two rules contradictory to each other, that is, there occurs policy collision.

The correspondence maker 20 judges whether there occurs policy collision among a plurality of rules, as follows.

For instance, the correspondence maker 20 judges that there occurs policy collision, if a plurality of rules associated with a common node has a common subject element, but has action elements different from one another.

As an alternative, data indicative of conditions observed when there occurs policy collision may be stored in advance into the second memory 25. If a sum of data (the function map 3) indicative of correspondence among a rule, a security function and a node matches with one of the conditions, the correspondence maker 20 judges that there occurs policy collision.

As an alternative, the correspondence maker 20 may be designed to have a database in which data indicative of conditions observed when there occurs policy collision is stored. The correspondence maker 20 may judge whether there occurs policy collision by retrieving the database, in step A211.

As an alternative, when the policy description is made based on the security policy, data indicative of conditions observed when there occurs policy collision may be added into the policy description. The correspondence maker 20 may judge whether there occurs policy collision by retrieving the data, in step A211.

As data indicative of conditions observed when there occurs policy collision, there is a combination of rules which would make policy collision, if the rules are associated with a common node. As an example of such data, there is data indicating "If a node N1 is associated with rules R1 and R2, there occurs policy collision".

Policy collision does not always occur when a plurality of ruled is associated with a common node. As data indicative of conditions observed when there occurs policy collision, there is a combination of rules associated with nodes different from one another. As an example of such data, there is data indicating "If a node N1 is associated with a rule R1 and a node N2 is associated with a rule R3, there occurs policy collision".

The correspondence maker 20 judges that there does not occur policy collision with respect to a plurality of rules graded in accordance with priority thereof by the priority elements 80.

If the correspondence maker 20 judges that there occurs policy collision (YES in step A211), the correspondence maker 20 causes the output device 30 to output a report indicating that there occurs policy collision, in step A212.

When the correspondence maker 20 judges that there does not occur policy collision (NO in step A211), the correspondence maker 20 judges whether there occurs underpolicy, in step A213. Herein, underpolicy means a condition in which there exist a node which is not associated with any rules. That is, underpolicy means a condition in which though the system to be administrated includes a hardware or software which can accomplish a security function, there is not set a rule which accomplishes the security function. The correspondence maker 20 judges that there occurs underpolicy, if there exists a node associated with no rules, among nodes included in the segment having been selected in step A204. When the correspondence maker 20 judges that there occurs underpolicy, the correspondence maker 20 causes the output device 30 to output a report indicating that there occurs underpolicy, in step A214.

If all of overpolicy, policy collision and underpolicy do not occur, correspondence among the selected segment, a rule and a node has no defects.

It should be noted that the step A209 for judging whether there occurs overpolicy, the step A211 for judging whether there occurs policy collision, and the step A213 for judging whether there occurs underpolicy may be carried out in any order.

By completing the steps A204 to A213, correspondence between a rule and a node is made for one segment. If the correspondence maker 20 judges that there does not occur underpolicy (NO in step A213), the correspondence maker 20 judges whether all of the segments included in the topology description are selected or not, in step A215.

If a certain segment is not selected yet (NO in step A215), the correspondence maker 20 selects the segment, and carries out the steps A204 to A213 for the selected segment. If all of the segments have been selected (YES in step A215), the corresponding-making or function-mapping step ends.

A sum of information indicative of correspondence among a rule, a security function and a node makes the function map 3. The correspondence maker 20 completes the steps A204 to 215 for all of the segments to thereby make the function map 3 in which each of the rules is all associated with each of the nodes.

FIG. 16 illustrates an example of the function map 3.

As illustrated in FIG. 16, a set of rules, security functions and nodes associated with one another makes one tupple. That is, the function map 3 is defined as a sum of tupples. The tupple illustrated in FIG. 16 indicates that the rule having a title of "A004-2-2" (a rule defining that a router allows httpd packets to pass) and the node having a packet-filtering software "ipchains (trademark)" named "pf1" are associated with each other through the security function "function.filtering. packet.tcp.httpd".

The correspondence maker 20 causes the output device 30 to output and/or display the function map 3.

Figure 17:
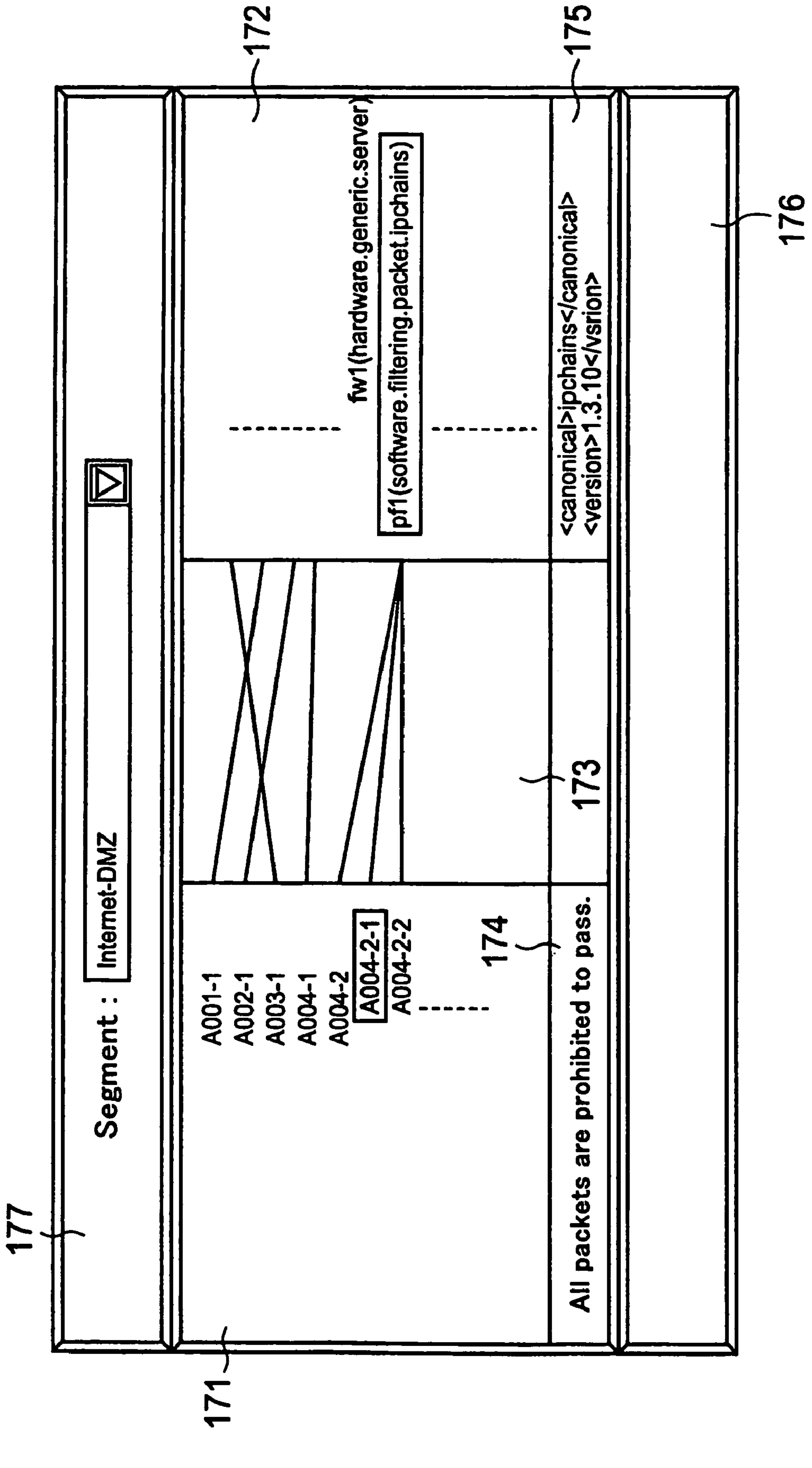
FIG. 17 illustrates an example of a screen in which a function map is output.

FIG. 17 illustrates an example of the function map 3 displayed in the output device 30. The correspondence maker 20 causes the output device 30 to display the function map 3 illustrated in FIG. 17 after carrying out the step A208, for instance, to thereby show a system administrator the correspondence between a rule and a node.

In FIG. 17, a rule display column 171 displays each of rules in a segment. It is preferable in the rule display column 171 that a second level rule is displayed below a first level rule as a parent rule, and closer to a center of a screen than the first level rule. This ensures a user to readily understand a parent-child relation of rules.

A node display column 72 displays nodes each belonging to a segment. It is preferable in the node display column 172 that a node of a software is displayed below a hardware in which the software is installed, and closer to a center of a screen than the hardware node. This ensures a user to readily understand which hardware a software is installed in.

A correspondence display column 173 displays lines connecting each of rules and each of nodes associated with each other.

A rule-explanation display column 174 displays explanation of a rule selected by a user. As explanation of a rule, the comment element 75 (see FIG. 5) is displayed, for instance.

A node-information display column 175 displays explanation of a node selected by a user.

A detection-result display column 176 displays overpolicy, policy collision or underpolicy when they are detected.

A segment-select column 177 is an area through which the system receives indication of a segment from a system administrator.

The correspondence maker 20 displays correspondence between a rule and a node in the designated segment, in a screen in such a manner as illustrated in FIG. 17.

The system for supporting security administration stores information indicative of an image plane in which the rule display column 171, the node display column 172, the correspondence display column 173, the rule-explanation display column 174, the node-information display column 175, the detection-result display column 176 and the segment-select column 177 are displayed, in the second memory 25 (see FIG. 1). In the image-plane information, the correspondence display column 173 is designed to be located between the rule display column 171 and the node display column 172.

The correspondence maker 20 makes information indicative of an output image-plane, based on the image-plane information and the function map 3, and causes the output device 30 to display an image plane in accordance with the output image-plane information.

The correspondence maker 20 makes output image-plane information as follows.

The correspondence maker 20 makes output image-plane information by which each of rules is displayed in the rule display column 171, each of nodes is displayed in the node display column 172, and lines connecting a rule to a node associated with the rule in the correspondence display column 173. The correspondence maker 20 designs the output image-plane information by which each of rules is displayed such that a distance between each of rules and the correspondence display column 173 is determined in accordance with a hierarchy or level of each of rules, and further designs the output image-plane information by which each of nodes is displayed such that a distance between each of nodes and the correspondence display column 173 is different from each other in accordance with whether it is a hardware or software.

Figure 18:
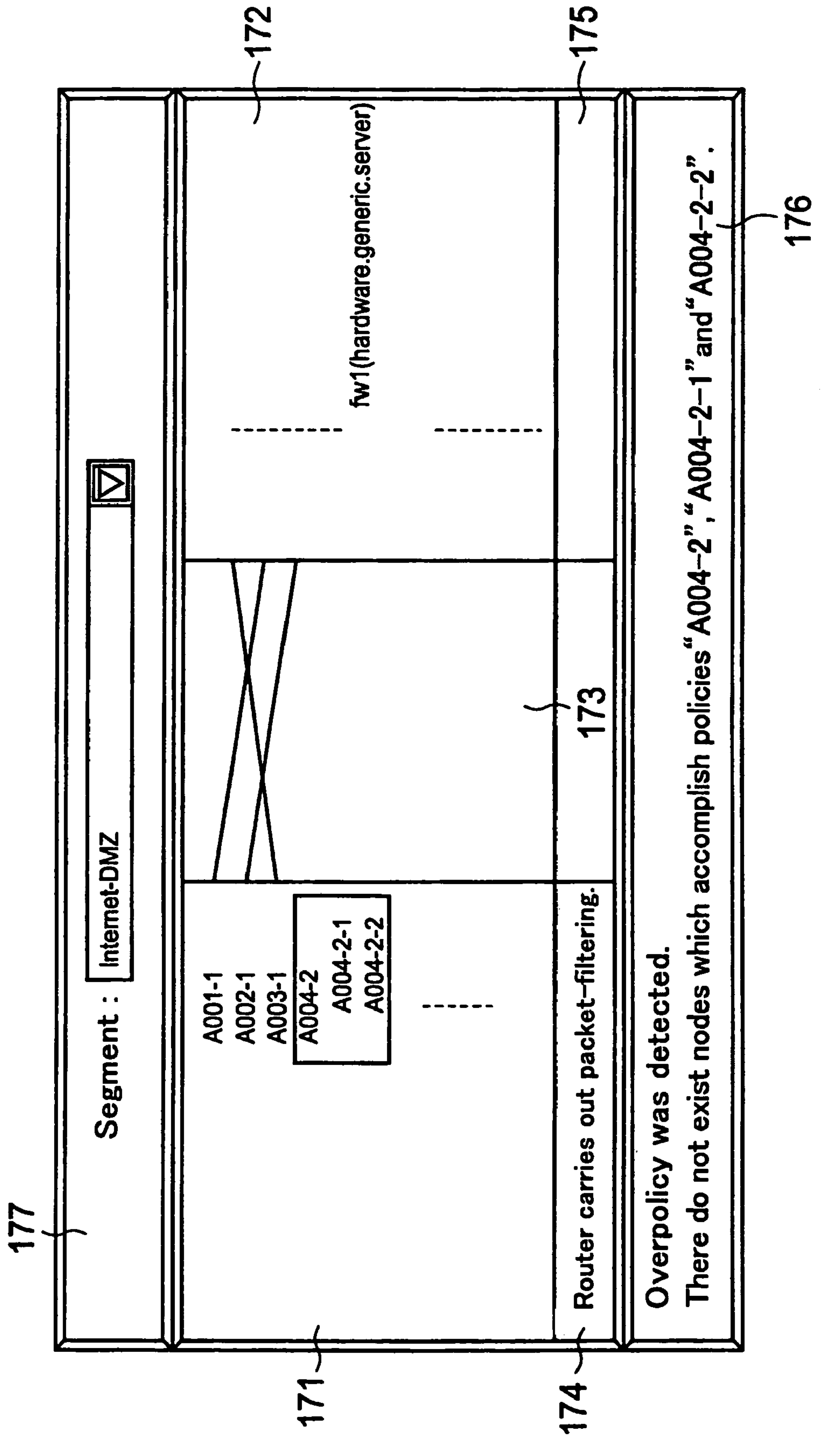
FIG. 18 illustrates an example of a screen in which overpolicy is output.

FIG. 18 illustrates an example of an image plane indicating that overpolicy is detected.

In the example illustrated in FIG. 18, there are no nodes associated with "A004-2", "A004-2-1" and "A004-2-2", and hence, there occurs overpolicy. The correspondence maker 20 displays the detection of overpolicy in the detection-result display column 176. Seeing the detection-result display column 176, a system administrator can delete excessive rules or add nodes which are in short.

Figure 19:
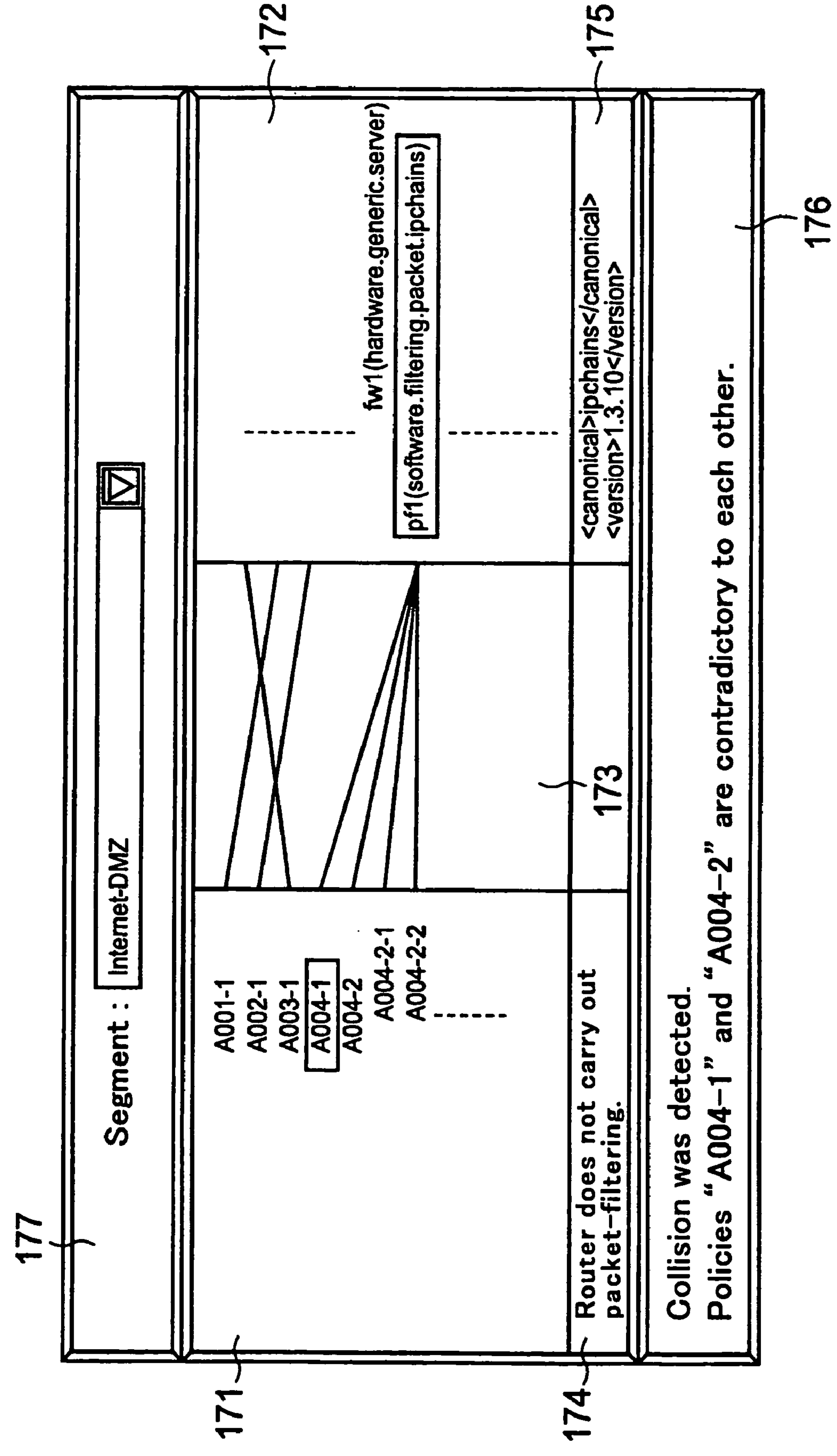
FIG. 19 illustrates an example of a screen in which policy collision is output.

FIG. 19 illustrates an example of an image plane indicating that policy collision is detected.

In the example illustrated in FIG. 19, the rules "A004-1" and "A004-2" both associated with a common node (software) are contradictory to each other. The correspondence maker 20 displays the detection of policy collision in the detection-result display column 176. Seeing the detection-result display column 176, a system administrator can redesign the security policy to delete the contradiction.

Figure 20:
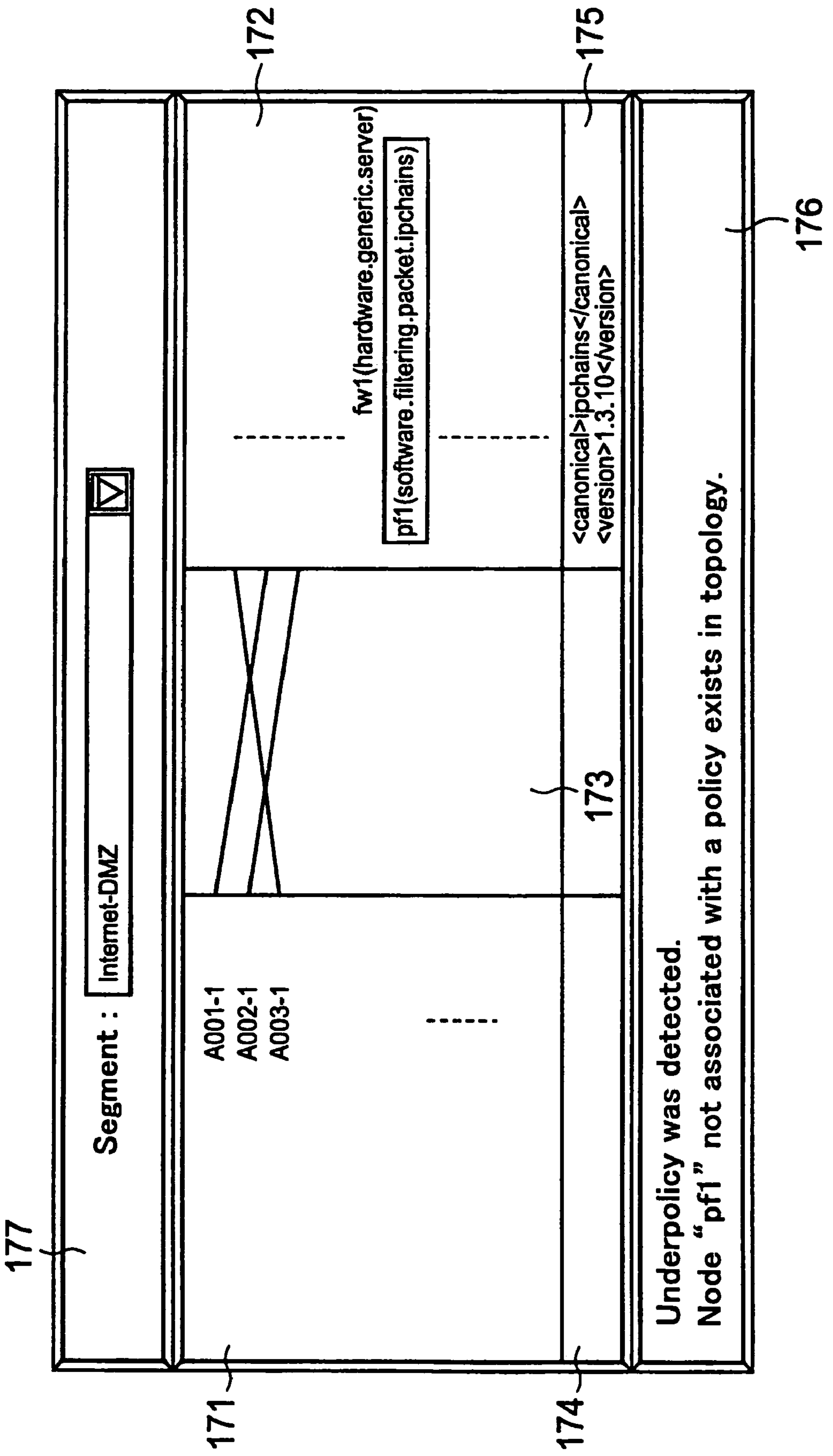
FIG. 20 illustrates an example of a screen in which under-policy is output.

FIG. 20 illustrates an example of an image plane indicating that underpolicy is detected.

In the example illustrated in FIG. 20, there is a node "pf1" not associated with any rule. The correspondence maker 20 displays the detection of underpolicy in the detection-result display column 176. Seeing the detection-result display column 176, a system administrator can delete excessive nodes or add rules which are in short.

The correspondence maker 20 may receive indication of a node not associated with a rule, from a system administrator, in which case, the correspondence maker 20 removes the indicated node out of nodes in which the correspondence maker 20 judges whether there occurs underpolicy, and makes correspondence between the indicated node and a vacant policy.

Output image planes are not to be limited to those illustrated in FIGS. 17 to 20. Hereinbelow are shown other examples of output image planes.

Figure 21:
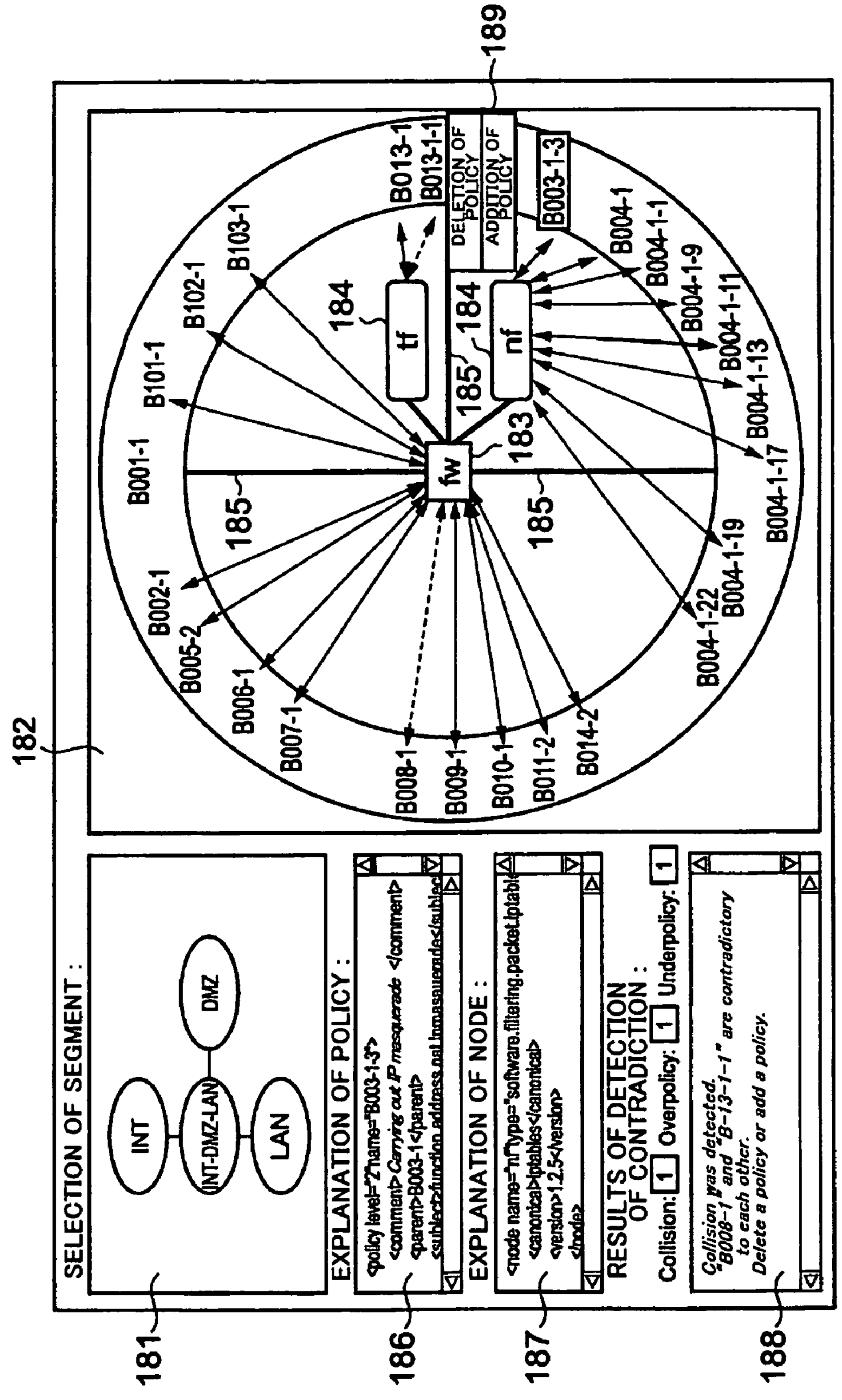
FIG. 21 illustrates an example of a screen in which policy collision is detected.

FIG. 21 shows another example of an output image plane of the function map 3.

For outputting the image plane illustrated in FIG. 21, the correspondence maker 20 stores information relating to an image plan including a segment-selecting column 181, a function-map display column 182, a rule explanation display column 186, a node-information display column 187, and a detection-result display column 188, into the second memory 25. The correspondence maker 20 makes output image-plane information, based on the image-plane information, through the use of the function map 3, and causes the output device 30 to display an image plane defined by the output image-plane information.

In FIG. 21, the segment-selecting column 181, the correspondence maker 20 receives indication of a segment from a system administrator.

In the function-map display column 182, correspondence between a rule and a node in the indicated segment is displayed.

In the function-map display column 182, nodes 183 and 184 indicating a hardware and a software, respectively, are further displayed. The node 183 indicates a hardware (a firewall in the first embodiment), and the node 184 indicates softwares "tf" and "nf". The correspondence maker 20 displays a node indicating a software, and a node indicating a hardware in which the software is installed together with a line connecting the nodes to each other.

When a hardware is connected to another segment, the correspondence maker 20 further displays a line 185 indicating the connection of the hardware to another segment. In the example illustrated in FIG. 21, since a firewall is connected to three segments, three lines 185 indicating the connection of the firewall to the segments are displayed.

The correspondence maker 20 displays rules around the nodes 183 and 184 in the indicated segment. That is, the correspondence maker 20 displays rules such that they surround the nodes 183 and 184 and that lower-level rules are arranged adjacent to an upper-level rule. In the example illustrated in FIG. 21, the lower-level rules such as "B004-1-1" and "B004-1-9" are arranged adjacent to the upper-level rule "B004-1".

The correspondence maker 20 further displays a rule and a node associated with the rule together with an arrow connecting them to each other. Thus, a system administrator can readily understand correspondence between a rule and a node. In addition, since the rules are displayed to surround the nodes, a system administrator could feel that security of nodes is protected by rules.

Rules causing policy collision are displayed with another arrow. Specifically, in the first embodiment, such rules are displayed with a broken-line arrow.

The rule "B001-1" displayed in the function-map display column 182 means that a boundary is formed among Internet, LAN and DMZ, for instance. The rule "B001-1" is a rule not associated with a rule. Accordingly, an arrow is not displayed with respect to the rule "B001-1". The function-map display column 182 may contain a rule which is not associated with a node.

In the rule explanation display column 186, explanation of a rule selected by a system administrator is displayed. For instance, the correspondence maker 20 displays a policy element of the selected rule, in the rule explanation display column 186.

In the node-information display column 187, explanation of a node selected by a system administrator is displayed. For instance, the correspondence maker 20 displays a node element of the selected node, in the node-information display column 187.

In the detection-result display column 188, results of detection of policy collision, overpolicy or underpolicy are displayed. By viewing the detection-result display column 188, a system administrator can re-check a security policy and topology information.

In accordance with an instruction from a system administrator, the correspondence maker 20 displays GUI 189 through which a system administrator inputs re-checking results. In accordance with an instruction input through GUI 189, the correspondence maker 20 displays an image plane as illustrated in FIG. 22, and receives re-checking results through the input device 10.

Figure 22:
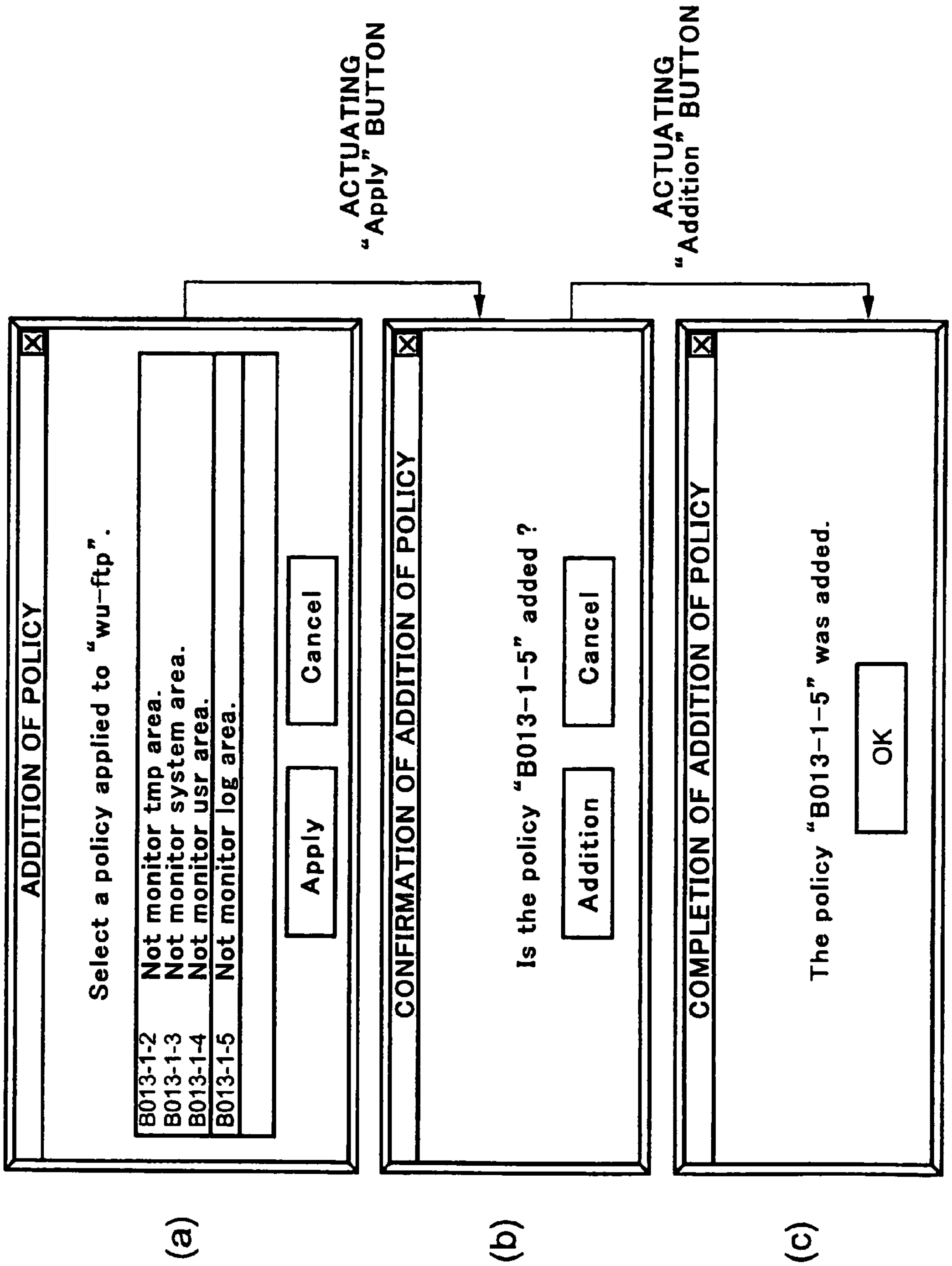
FIG. 22 illustrates an example of a screen through which results of re-analysis are input.

For instance, the correspondence maker 20 receives indication of additional rules through an image plane illustrated in FIG. 22-(*a*), and requests a system administrator to confirm addition of rules through an image plane illustrated in FIG. 22-(*b*). When a system administrator confirms addition of rules, the correspondence maker 20 reflects the rules to policy description, and displays such reflection in an image plane illustrated in FIG. 22-(*c*).

Figure 23:
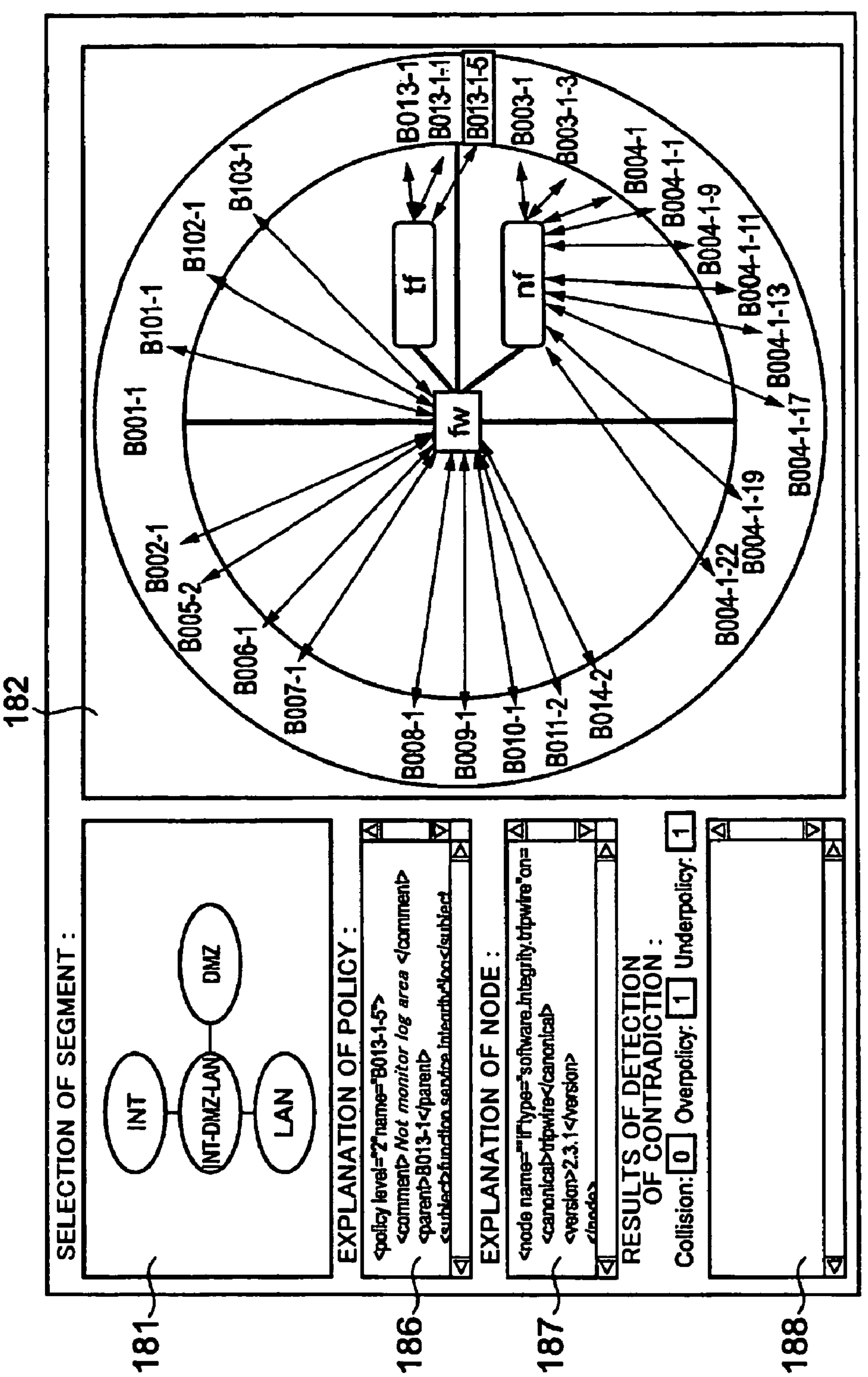
FIG. 23 illustrates an example of a screen in which policy collision is solved.

FIG. 23 illustrates an example of an image plane indicating the policy collision shown in FIG. 21 is solved by virtue of addition of the rule "B013-1-5".

Figure 24:
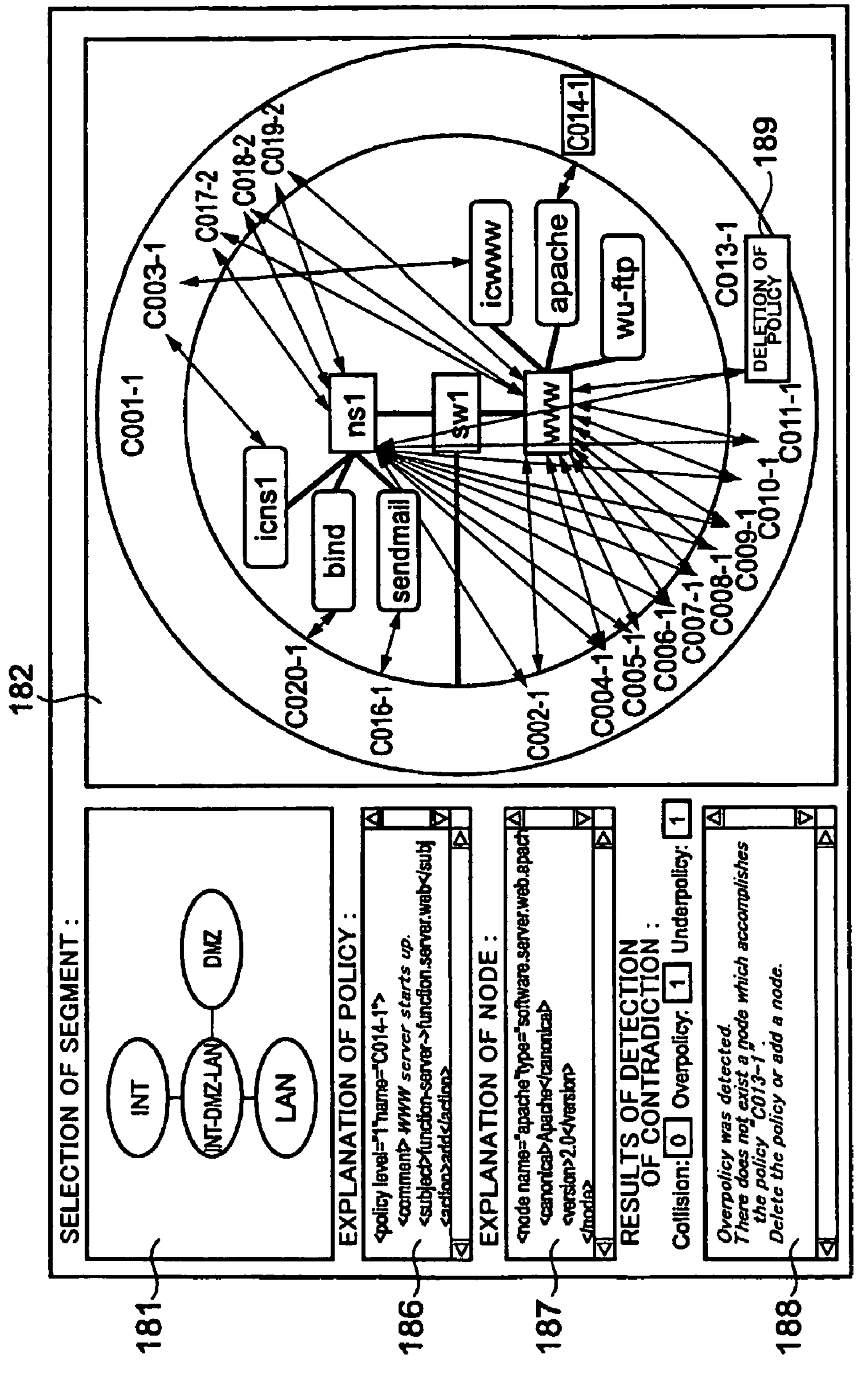
FIG. 24 illustrates an example of a screen in which under-policy is detected.

FIG. 24 illustrates an example of an image plane indicating that overpolicy was detected.

The correspondence maker 20 does not display an arrow with respect to a rule not associated with any node. In FIG. 24, an arrow is not displayed with respect to the rule "C013-1" displayed in the function-map display column 182. Accordingly, this means that the rule "C013-1" causes overpolicy. The correspondence maker 20 displays explanation of occurrence of overpolicy in the detection-result display column 188. Thus, a system administrator checks the image plane illustrated in FIG. 24, and can re-check the security policy and the topology information.

In accordance with an instruction from a system administrator, the correspondence maker 20 displays GUI 189 through which a system administrator inputs re-checking results. In accordance with an instruction input through GUI 189, the correspondence maker 20 displays an image plane as illustrated in FIG. 25, and receives re-checking results through the input device 10.

Figure 25:
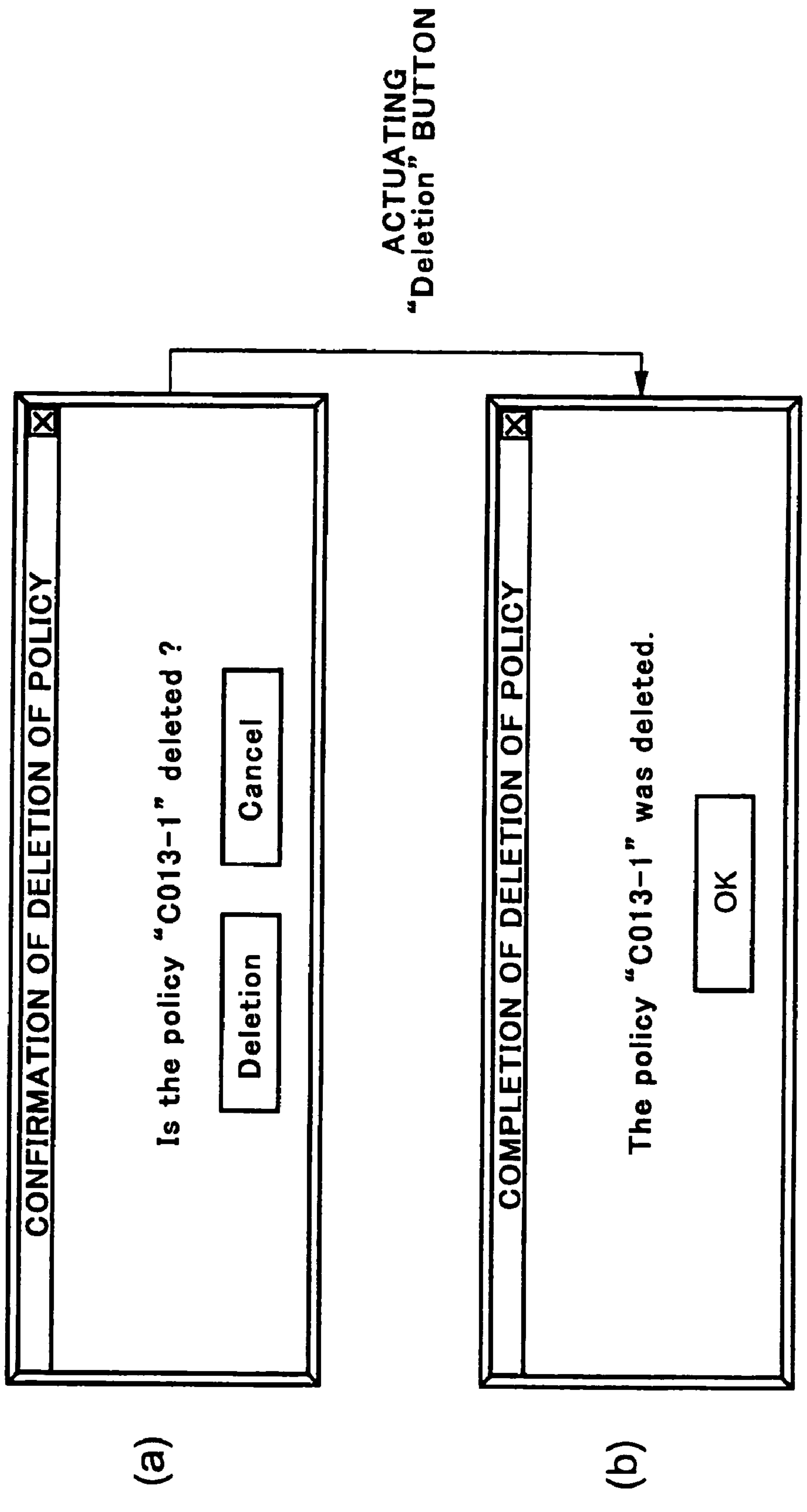
FIG. 25 illustrates an example of a screen through which results of re-analysis are input.

For instance, the correspondence maker 20 requests a system administrator to delete a rule causing overpolicy, in the image plane illustrated in FIG. 25-(*a*). On receipt of an instruction to delete the rule, the correspondence maker 20 changes the policy description such that the rule is deleted, and displays a message indicating that the rule was deleted in an image plane illustrated in FIG. 25-(*b*).

Figure 26:
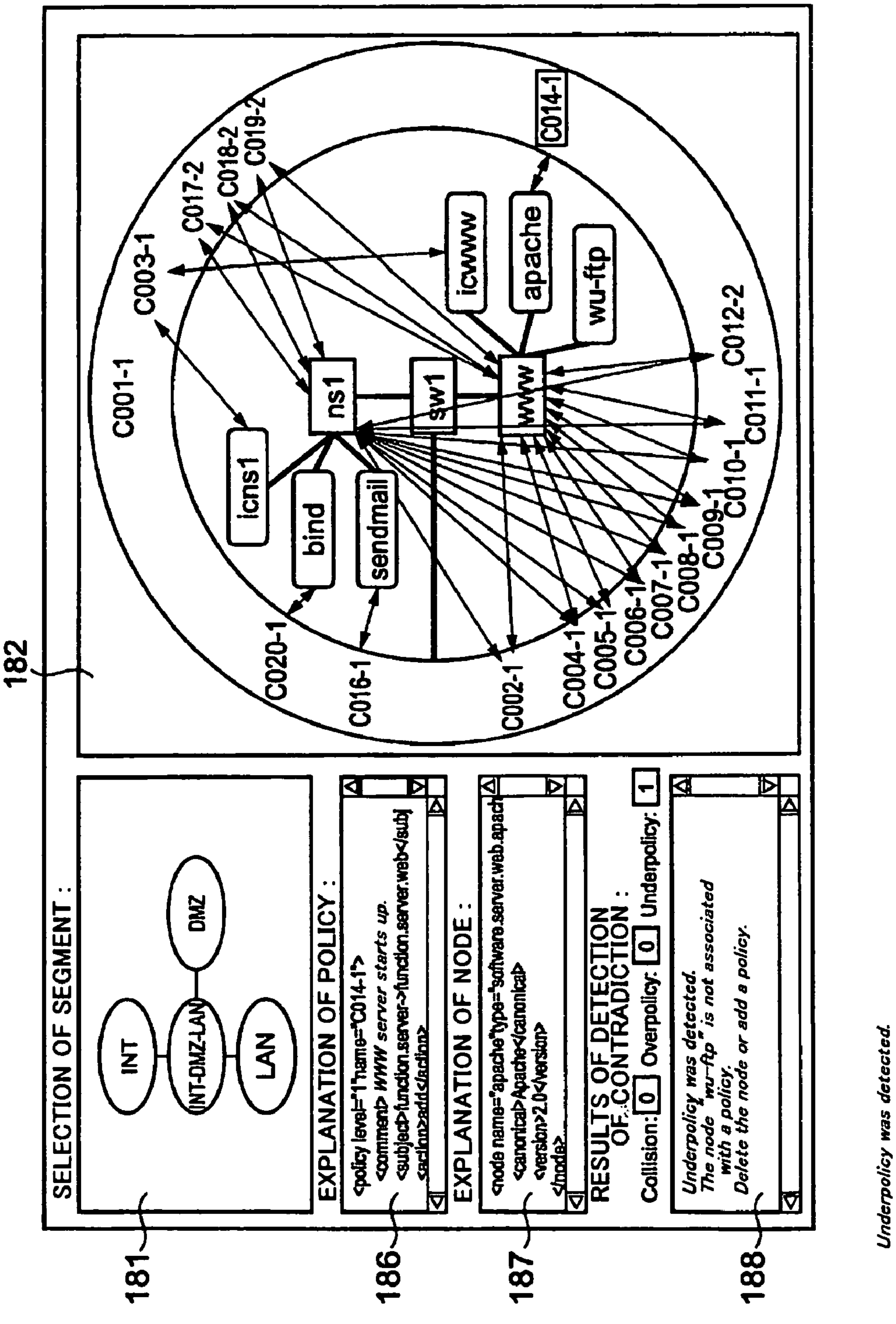
FIG. 26 illustrates an example of a screen in which over-policy is solved.

The correspondence maker 20 displays such an image plane as illustrated in FIG. 26 to show a system administrator that the overpolicy shown in FIG. 24 was solved.

Figure 27:
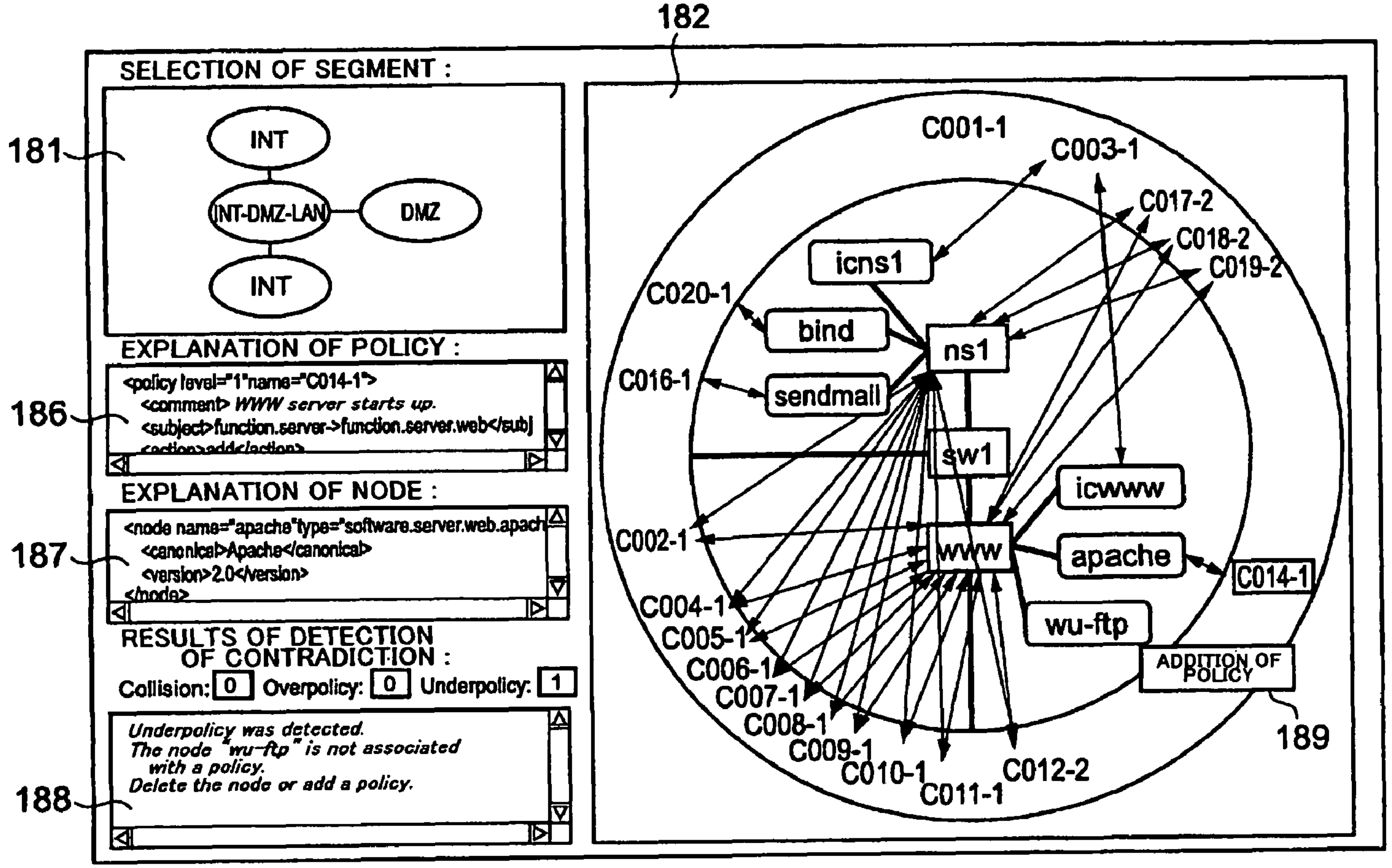
FIG. 27 illustrates an example of a screen in which under-policy is detected.

FIG. 27 illustrates an example of an image plane indicating that underpolicy was detected.

The correspondence maker 20 does not display an arrow with respect to a node not associated with any rule. In FIG. 27, an arrow is not displayed with respect to the node "wu-ftp" displayed in the function-map display column 182. Accordingly, this means that the node "wu-ftp" causes underpolicy. The correspondence maker 20 displays explanation of occurrence of underpolicy in the detection-result display column 188. Thus, a system administrator checks the image plane illustrated in FIG. 27, and can re-check the security policy and the topology information.

In accordance with an instruction from a system administrator, the correspondence maker 20 displays GUI 189 through which a system administrator inputs re-checking results. In accordance with an instruction input through GUI 189, the correspondence maker 20 displays an image plane as illustrated in FIG. 28, and receives re-checking results through the input device 10.

Figure 28:
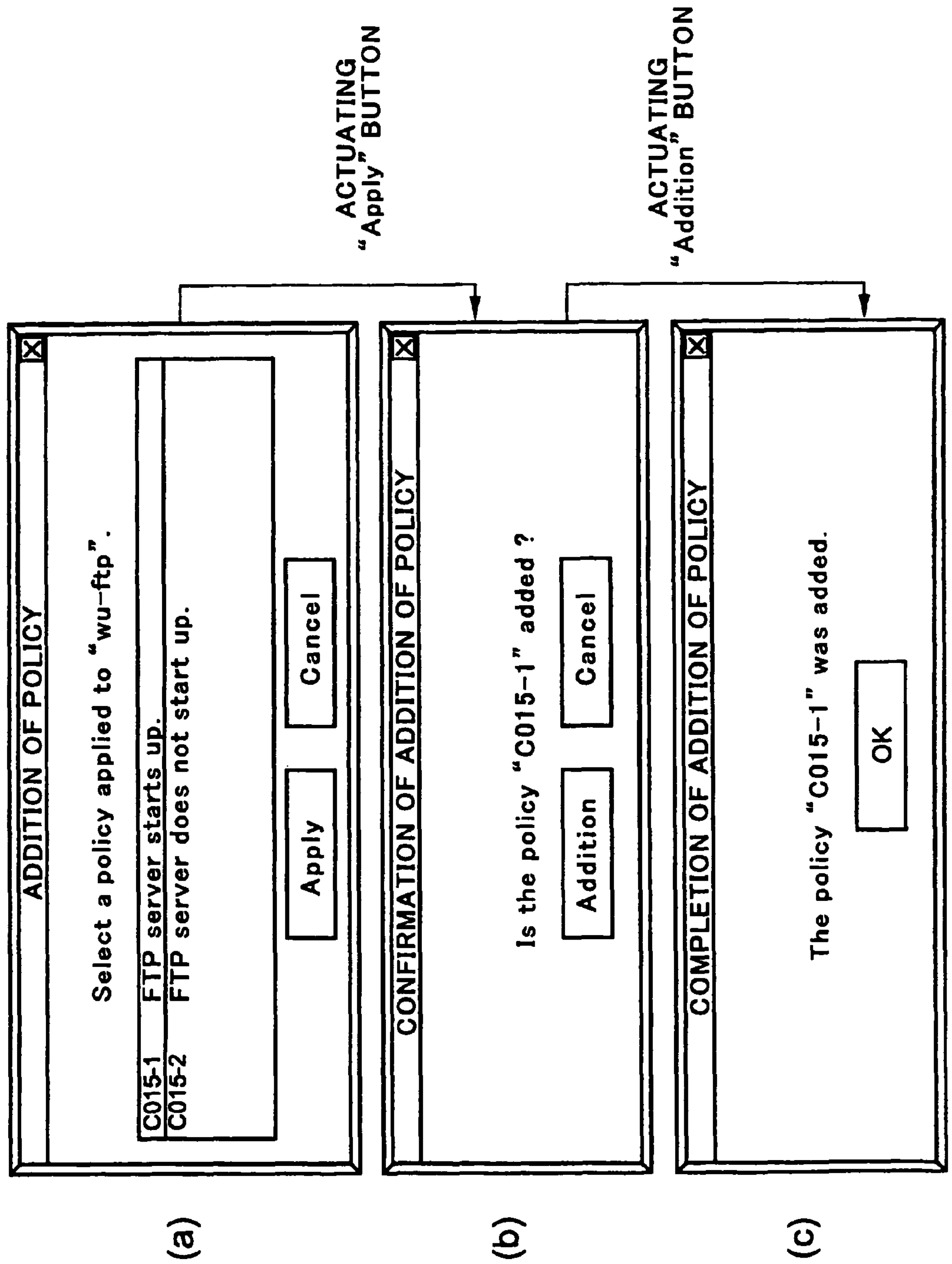
FIG. 28 illustrates an example of a screen through which results of re-analysis are input.

For instance, the correspondence maker 20 requests a system administrator to indicate a rule to be applied to a node, in the image plane illustrated in FIG. 28-(*a*), and confirms a system administrator as to whether a rule is added, in an image plane illustrated in FIG. 28-(*b*). On receipt of confirmation of addition of a rule, the correspondence maker 20 reflects the rule to the policy description, and displays a message that the rule was added, in an image plane illustrated in FIG. 28-(*c*).

Figure 29:
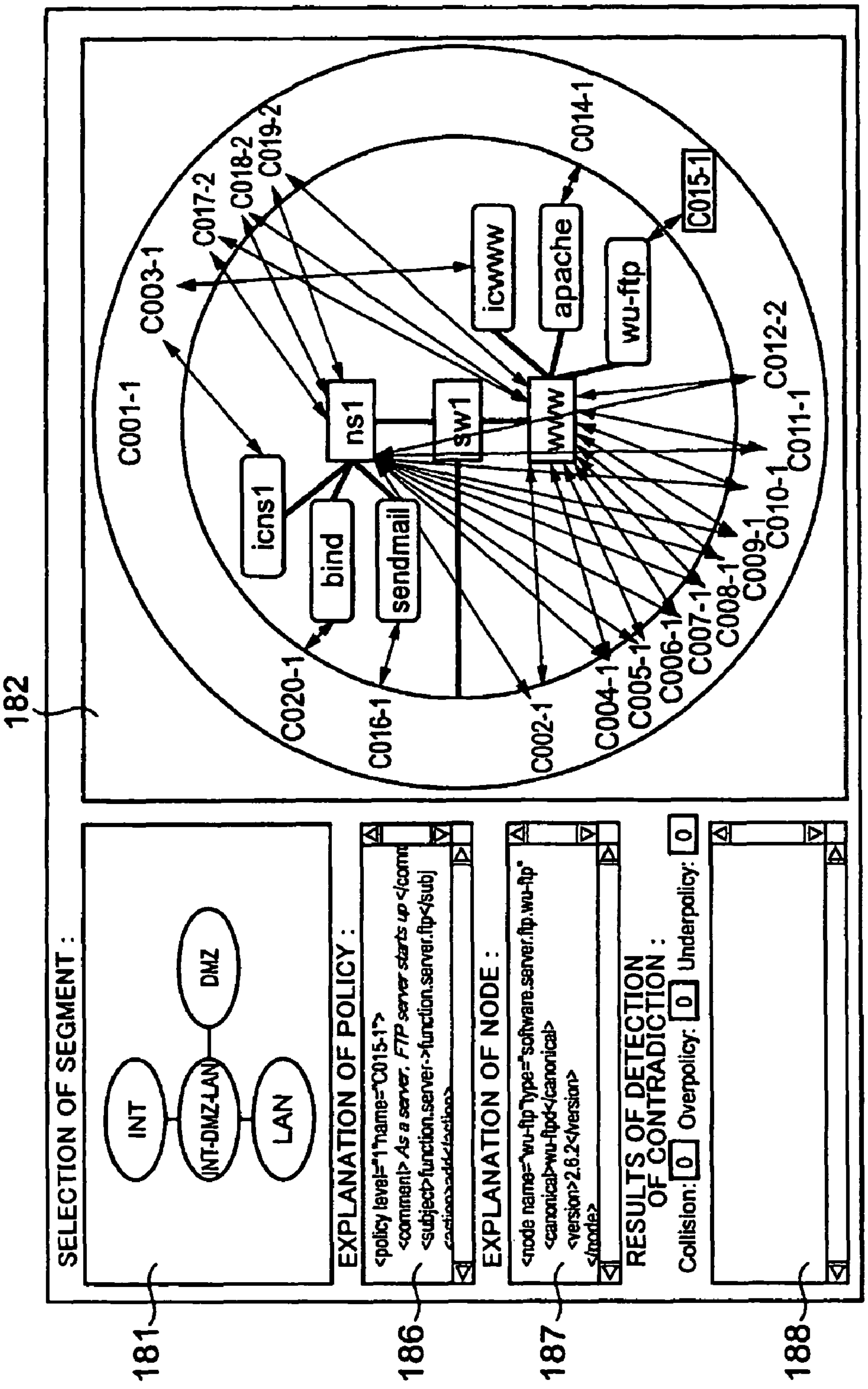
FIG. 29 illustrates an example of a screen in which under-policy is solved.

The correspondence maker 20 displays such an image plane as illustrated in FIG. 29 to show a system administrator that the underpolicy shown in FIG. 27 was solved by adding the rule "C015-1".

In accordance with the first embodiment, the correspondence maker 20 makes correspondence between a rule and a node which are associated with each other through a security function, and outputs the correspondence in the display device 30. Accordingly, a system administrator can readily understand the present security, that is, which node a policy relates to and which rule each of nodes accomplishes.

In addition, the correspondence maker 20 judges whether there occurs overpolicy, policy collision or underpolicy as well as makes the above-mentioned correspondence. Hence, a system administrator is advised that it is not possible to accomplish a security function in accordance with a rule determined by a system administrator in a network system identified by the topology information input by a system administrator. A system administrator is further advised that rules contradictory to each other are included in the security policy set by a system administrator. A system administrator is further advised that the security policy set by a system administrator does not sufficiently make use of a security function of a network system identified by the topology information.

As mentioned above, the first embodiment makes it possible for a system administrator to readily understand correspondence between a rule and a node, and know inconsistency between a rule and a node, and thus, ensures enhancement in security in a system to be administrated and reduction in burden of a system administrator.

Second Embodiment

Figure 30:
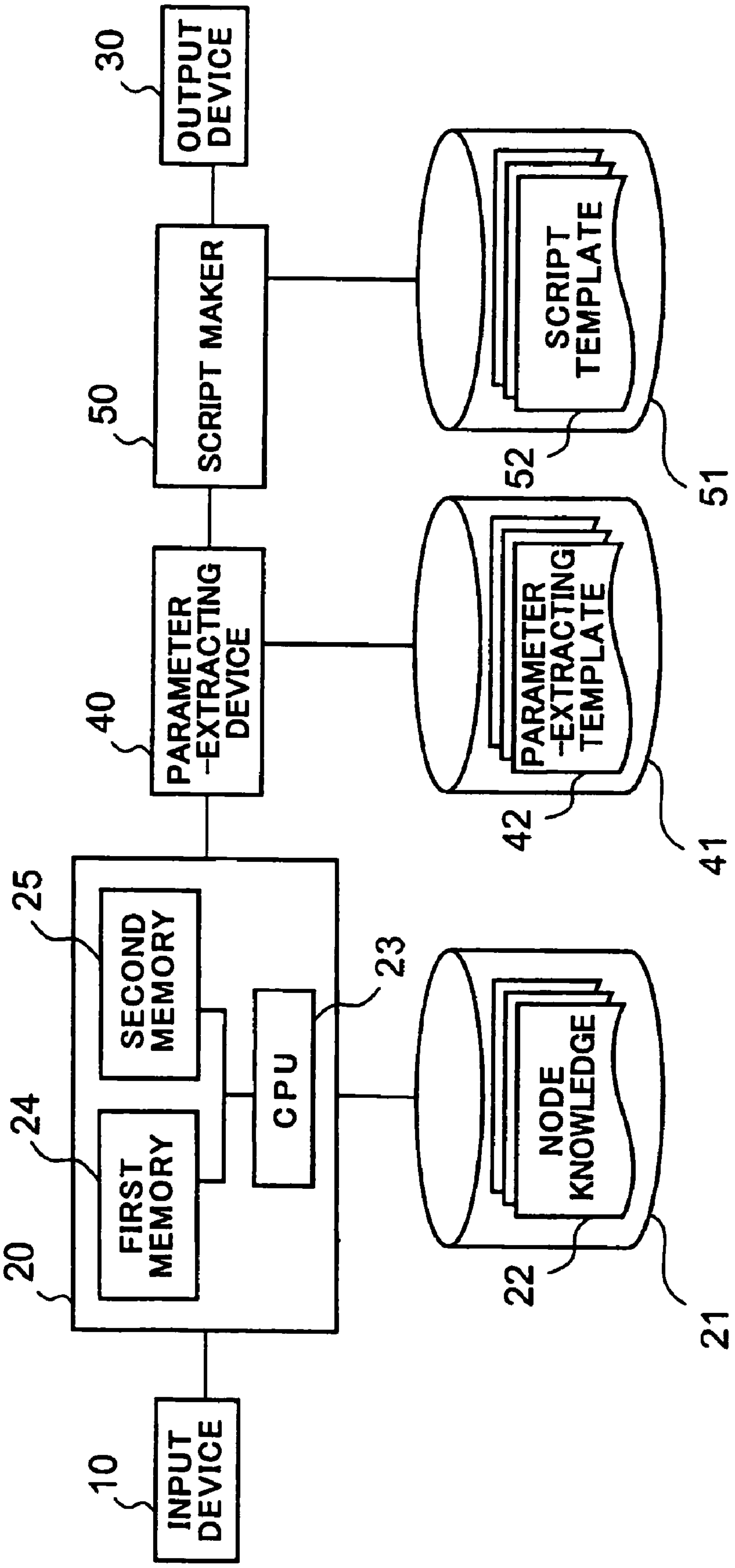
FIG. 30 is a block diagram of a system for supporting security administration, in accordance with the second embodiment of the present invention.

FIG. 30 is a block diagram of a system for supporting security administration, in accordance with the second embodiment of the present invention.

The system in accordance with the second embodiment is comprised of an input device 10, a correspondence maker or a function-mapping processor 20, a node-knowledge database 21 storing node knowledge therein, a parameter-extracting device 40 (defined as "parameter-information memory" in claims), a parameter-extracting template database 41, a script maker 50, a script template database 51 (defined as "script-model memory" in claims), and an output device 30.

Parts or elements that correspond to those of the system illustrated in FIG. 1 have been provided with the same reference numerals, and operate in the same manner as corresponding parts or elements in the first embodiment, unless explicitly explained.

As illustrated in FIG. 30, the correspondence maker 20 is comprised of a central processing unit 23, a first memory 24, and a second memory 25.

Each of the first and second memories 23 and 24 is comprised of a semiconductor memory such as a read only memory (ROM), a random access memory (RAM) or an IC memory card, or a storage device such as a flexible disc, a hard disc or an optic magnetic disc.

The first memory 23 stores therein a program for supporting security administration. The second memory 25 stores therein various data and parameters. The central processing unit 23 reads the program out of the first memory 24, and executes the program. Thus, the central processing unit 23 operates in accordance with the program stored in the first memory 24.

The parameter-extracting template database 41 stores parameter-extracting templates 42 (defined as "parameter information" in claims) therein. The parameter-extracting template 42 means information in which a parameter used for setting a security function into a hardware or software, and an instruction to extract a content of the parameter are described. In the second embodiment, a conditional expression is determined, and a parameter matching to the conditional expression is extracted. A content of a parameter is extracted out of topology description, for instance. Hardwares or softwares different from one another may accomplish a common security function, in which case, a common parameter is set for the hardwares or softwares for accomplishing the security function, even though the hardwares or softwares are different from one another. Accordingly, a parameter-extracting template for each of security functions does not have description dependent on a hardware or software. The parameter-extracting template database 41 stores a parameter-extracting template 42 for each of security functions, for instance, in the form of a text.

The parameter-extracting device 40 extracts parameters for accomplishing security functions of nodes included in the function map 3 made by the correspondence maker 20, out of the topology information. The parameter-extracting device 40 carries out the extraction through the use of the parameter-extracting template 42.

The script template database 51 stores script templates 52. Each of the script templates 52 means information in which a command for setting each of hardwares or softwares for accomplishing each of security functions thereof, and an instruction for extracting a parameter to be indicated in the command, out of the results of extraction carried out by the parameter-extracting device 40 are described. Even if hardwares or softwares different from one another accomplish a common security function, commands for setting the security function are different in each of the hardwares or softwares. Accordingly, even if a first software is different from a second software, but accomplishes the same security function as that of the second software, the script templates 52 for the first software has description different from the same of the script template 52 for the second software. The script template database 51 stores the script templates 52 for each of security functions of each of hardwares and softwares, for instance, in the form of a text.

The script maker 50 adds a content of a parameter to the script template 52 to thereby make a script in which a command for setting a parameter having the content is described.

The output device is comprised of an information-output device, for instance, similarly to the first embodiment, and displays or prints a script made by the script maker 50.

Each of the parameter-extracting device 40 and the script maker 50 can be accomplished by a central processing unit operating in accordance with a program for supporting security administration. The correspondence maker 20, the parameter-extracting device 40 and the script maker 50 may be accomplished by separate central processing units, or may be accomplished by a common central processing unit. In the latter case, for instance, the correspondence maker 20, the parameter-extracting device 40 and the script maker 50 may be accomplished commonly by the central processing unit 23, though the central processing unit 23 is illustrated as a part of the correspondence maker 20 in FIG. 30.

The output device 30 may be designed to output a script by recording scripts into a memory or a recording medium. As an alternative, the output device 30 may be designed to output a script to a network system to which a parameter is applied, through a communication network. In such a case, the output device 30 is accomplished also by the central processing unit 23.

Figure 31:
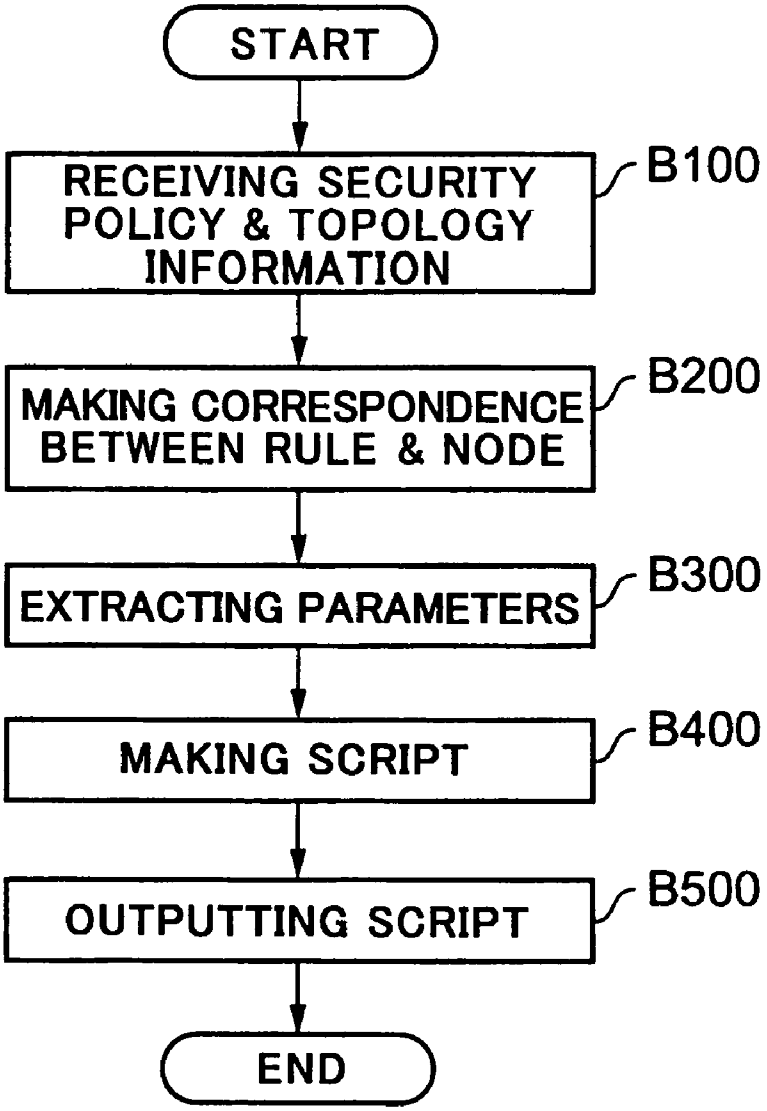
FIG. 31 is a flow-chart showing steps to be carried out by the system in accordance with the second embodiment of the present invention.

FIG. 31 is a flow-chart showing steps to be carried out by the system in accordance with the second embodiment. Hereinbelow is explained an operation of the system in accordance with the second embodiment, with reference to FIG. 31.

First, the input device 10 receives the security policy 1 and the topology information 2 in step B100, and then, the correspondence maker 20 makes the function map 3 including information indicative of correspondence between a rule and a security function, in step B200.

Figure 32:
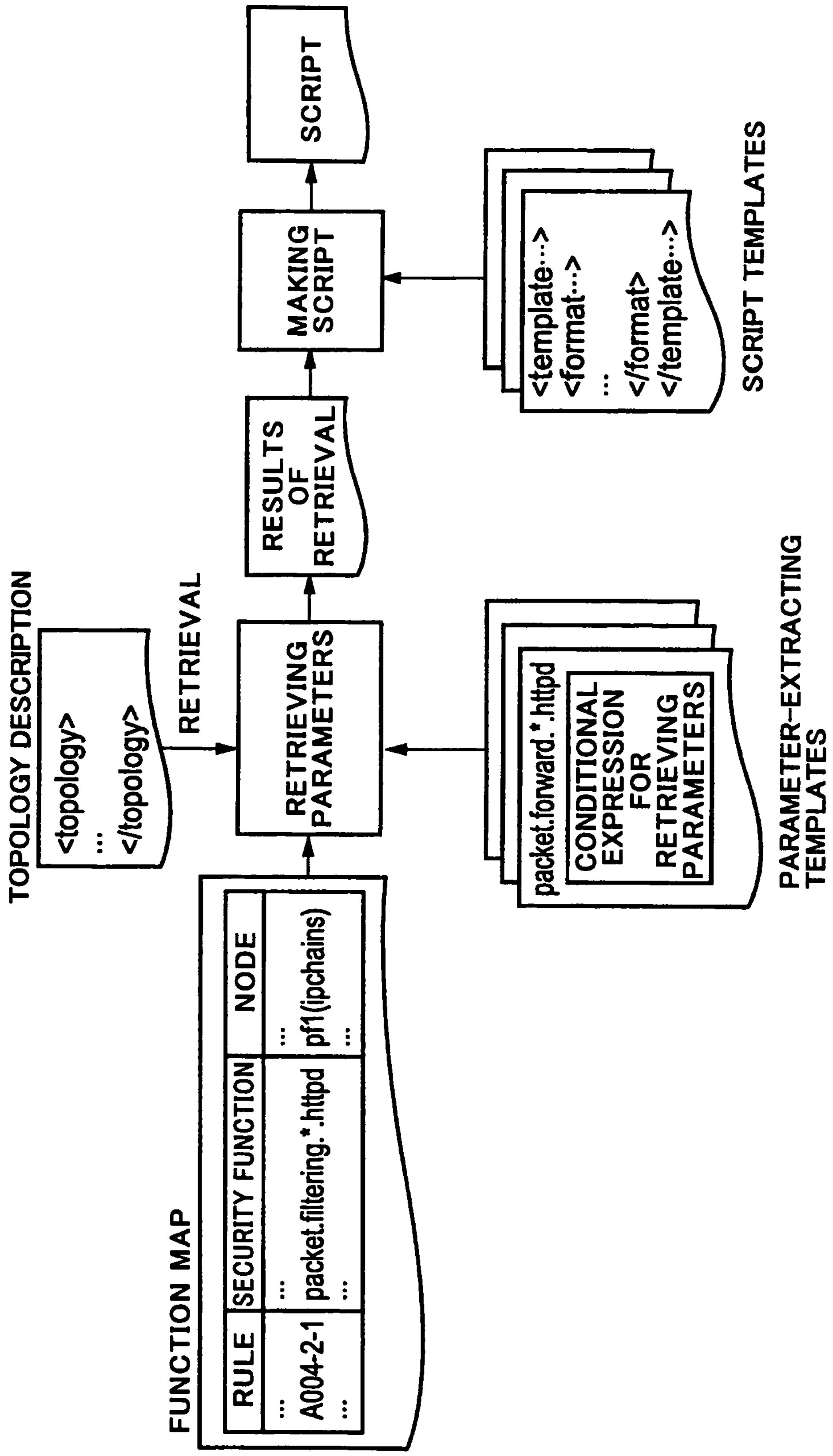
FIG. 32 illustrates a concept of particular steps among the steps illustrated in FIG. 31.

FIG. 32 illustrates a concept of the step B300 and subsequent steps.

The parameter-extracting device 40 finds a parameter-extracting template 42 associated with a security function for each of a set of a rule, the security function and a node which are associated with one another. In each of the parameter-extracting templates 42, there is described a conditional expression used for extracting a content of a parameter used for setting a security function, out of topology description.

After finding a parameter-extracting template 42 associated with the security function, the parameter-extracting device 40 extracts a content of a parameter out of the topology description through the use of the conditional expression described in the parameter-extracting template 42, in step B300.

Then, the script maker 50 retrieves a script template 52 out of the script template database 51 for each of security functions of the nodes included in the function map made in the step B200. In each of the script templates 52, a model of a command (script) for accomplishing a security function is described. The script maker 50 adds a parameter having been extracted in the step B300, to the found script template 52 to thereby make a script, in step B400.

Then, the script maker 50 causes the output device 30 to output the thus made script, in step B500.

Hereinbelow is explained the step B300 in detail.

The parameter-extracting device 40 finds a parameter-extracting template 42 for each of security functions included in the function map.

As mentioned earlier, in each of the parameter-extracting templates 42 are described a parameter to be set for accomplishing a security function, and a conditional expression used for extracting a content of the parameter. The description of the parameter-extracting template 42 is not dependent on a kind of a hardware or software. As an example of a parameter used for accomplishing a security function, there is an IP address or the name attribute 116 (see FIG. 7) of the nic element 115. A content of the parameter is included in the topology description.

FIGS. 33A and 33B illustrates an example of the parameter-extracting template 42.

FIG. 33A illustrates a policy element of a rule indicating that httpd packets are allowed to pass in a boundary segment between Internet and DMZ. This rule is accomplished by accomplishing a security function indicated by a subject element, "function.filtering.packet.tcp.httpd".

FIG. 33B illustrates an example of the parameter-extracting template 42 associated with the security function. A data element 211 sandwiched between <data> tags is a sum of parameters necessary to accomplish the security function, and conditional expressions to extract contents of the parameters.

A param element 212 sandwiched between <param> tags indicates a single parameter-extracting template. The param element 212 includes a data element 211 and a function element indicative of a security function.

In FIG. 33B, the data element 211 is described as a sum of formats "<name of a parameter>::<elements of topology description> [<conditional expression>];". A "name of a parameter" indicates a name which can be singly identified in a common template. When a child element in topology description is designated in "elements of topology description", a parent element and a child element are connected to each other through a dot "." such that a child element follows a parent element. When attribute of a certain element is designated, the element and the attribute are connected to each other through "@", for instance. A "conditional expression" is described in a format of "A=B", and indicates a condition that "A" is "B". The parameter-extracting device 40 extracts a content and attribute of an element which meets with conditions, out of the topology description in accordance with the conditional expression.

In FIG. 33, as a conditional expression for extracting a content of a parameter "src-address" is described [network.segment@type='network.segment.int']. This conditional expression indicates a condition that a segment element as a child element of a network element of topology description has type attribute "network.segment.int". The parameter-extracting device 40 extracts "src-address" as a content of the address element meeting with the condition.

A conditional expression may have a nest structure. Hereinbelow is explained an example in which a parameter is extracted in accordance with a conditional expression having a nest structure, with reference to FIG. 34 showing an example of topology description.

For instance, a conditional expression for extracting the parameter "in-interface" shown in FIG. 33B has a nest structure. The conditional expression includes a conditional expression that a segment element as a child element of a network element has type attribute “network.segment.int”. Hence, the conditional expression in its entirety indicates a condition that in attribute of a nic element of a hardware has a content of “name attribute of such a segment element that the segment element as a child element of a network element has type attribute “network.segment.int”, and further that a content of name attribute of nic element meeting with the condition is extracted as a content of “in-interface”.

The description A shown in FIG. 34 indicates a segment element having type attribute “network.segment.int”. The segment element has name attribute “int”. A nic element having in attribute “int” is shown in the description B shown in FIG. 34. The description B meets with the condition. As a result, the parameter-extracting device 40 extracts name attribute “eth0” indicated by the description B, as a content of “in-interface”.

When a content of a parameter is determined as a predetermined content, the predetermined content may be described without describing a conditional expression. For instance, a content of the parameter “protocol” shown in FIG. 33B is determined as a predetermined content “tcp” regardless of a content of topology description.

The parameter-extracting device 40 retrieves all parameters indicated by the parameter-extracting templates 42, and describes a content of a parameter extracted out of topology description, into the parameter-extracting template 42.

FIG. 35 illustrates an example of a parameter-extracting template to which a content of a parameter is described in the above-mentioned step. The parameter-extracting device 40 carries out the above-mentioned step to all of tupples obtained in the correspondence-making step (step B200), that is, all of security functions.

FIG. 33B illustrates an example of a description format of the parameter-extracting template 42. The parameter-extracting template 42 may be described in any format, if the parameter-extracting template 42 is described to be able to extract a content meeting with conditions.

The parameters extracted in the step B300 are used for accomplishing security functions. The parameters are not dependent on a kind of a hardware or software. In contrast, commands or scripts for setting the parameters are different from one another in accordance with a kind of a hardware or software.

In step B400, a script is made in accordance with a kind of a hardware or software. Hereinbelow is explained the step B400.

In the step B400, the script maker 50 retrieves a script template 52 out of the script template database 51 through the use of a combination of a security function and a node in the function map as a key. In the script template 52, a model of a script is described. However, a parameter to be set is not determined yet, but there is described an instruction to extract a parameter out of the parameter-extracting template 42 (see FIG. 35) in which parameters are described. The script maker 50 makes a script, based on the retrieved script template 52.

FIG. 36 illustrates an example of a script template.

The script template illustrated in FIG. 36 sets a security function “httpd packets are allowed to pass” in a packet-filtering software “ipchains (trademark)”. In the example illustrated in FIG. 36, “$” described before a parameter means that a content of the parameter is extracted out of the parameter-extracting templates 42, and “$” and description of a parameter are replaced with the content of the extracted parameter.

FIG. 37 illustrates an example of such replacement.

For instance, if the description “$in-interface” is included in a script template, the script maker 50 extracts a content (“eth0” in the example) of the parameter “in-interface” out of the parameter-extracting templates 42. Then, the script maker 50 replaces “$in-interface” with “eth0”. The script maker 50 repeats such replacement in accordance with the script templates 52 to thereby make a script. The script maker 50 carries out such repetition of the replacement for all of the tupples extracted in the function-mapping step (step B200).

FIG. 36 illustrates an example of a description format of the script template 52. The script template 52 may be described in any format, if the script template 52 describes a model of a script set in accordance with a hardware or software, and an indication to extract a content of a parameter.

Then, the script maker 50 causes the output device 30 to output the script, in step B500. A system administrator can set nodes, based on the thus output script. The script maker 50 may store the script into a memory or a recording medium. As an alternative, apart from displaying and printing, the script maker 50 may transmit the script to each of nodes in the network system to be administrated, through a communication network, in which case, each of the nodes may, on receipt of the script, automatically set parameters, based on the received script.

Figure 38:
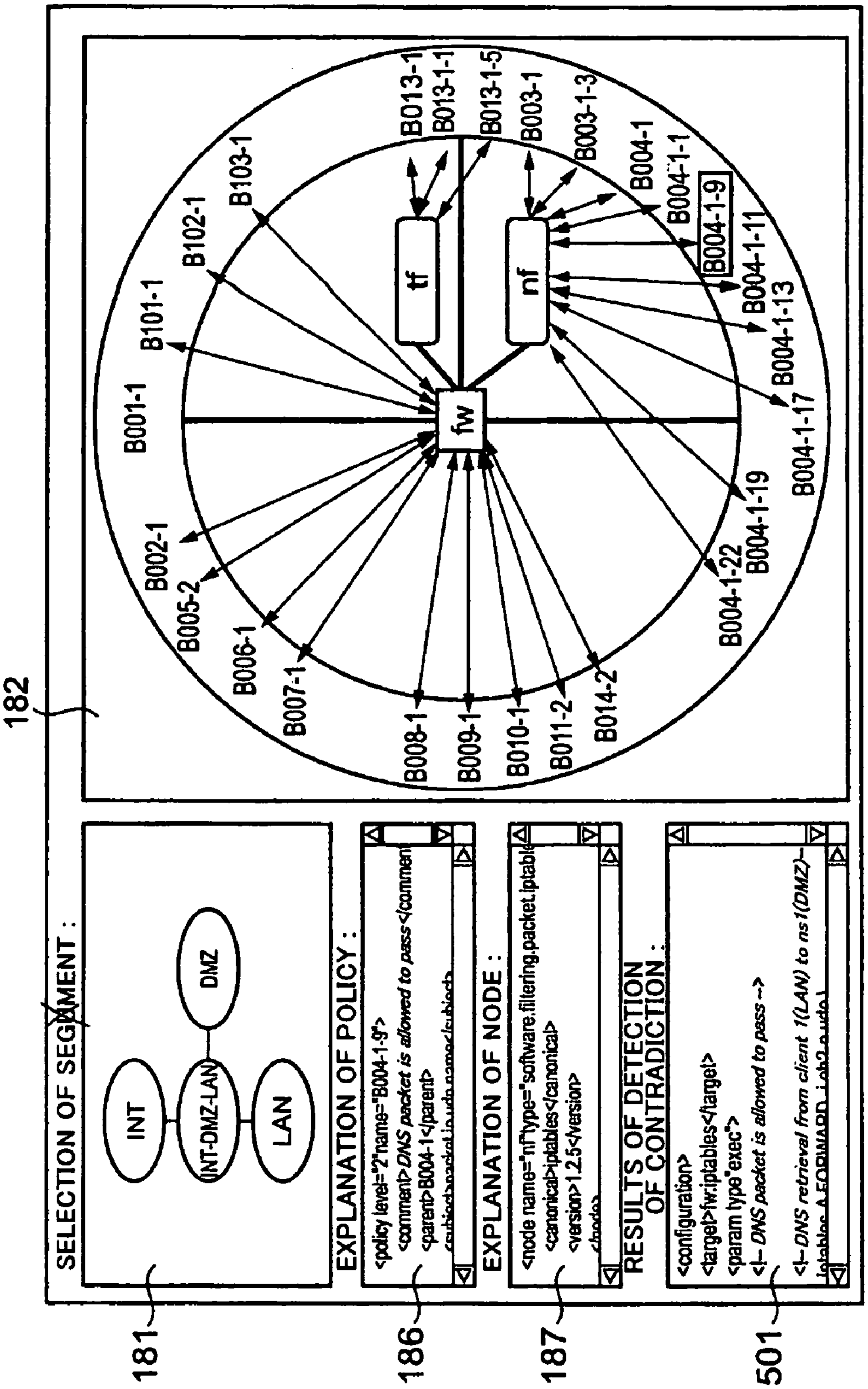
FIG. 38 illustrates an example of a screen in which a set script is displayed.

FIG. 38 illustrates an example of an image plane in which a script is displayed.

Figure 39:
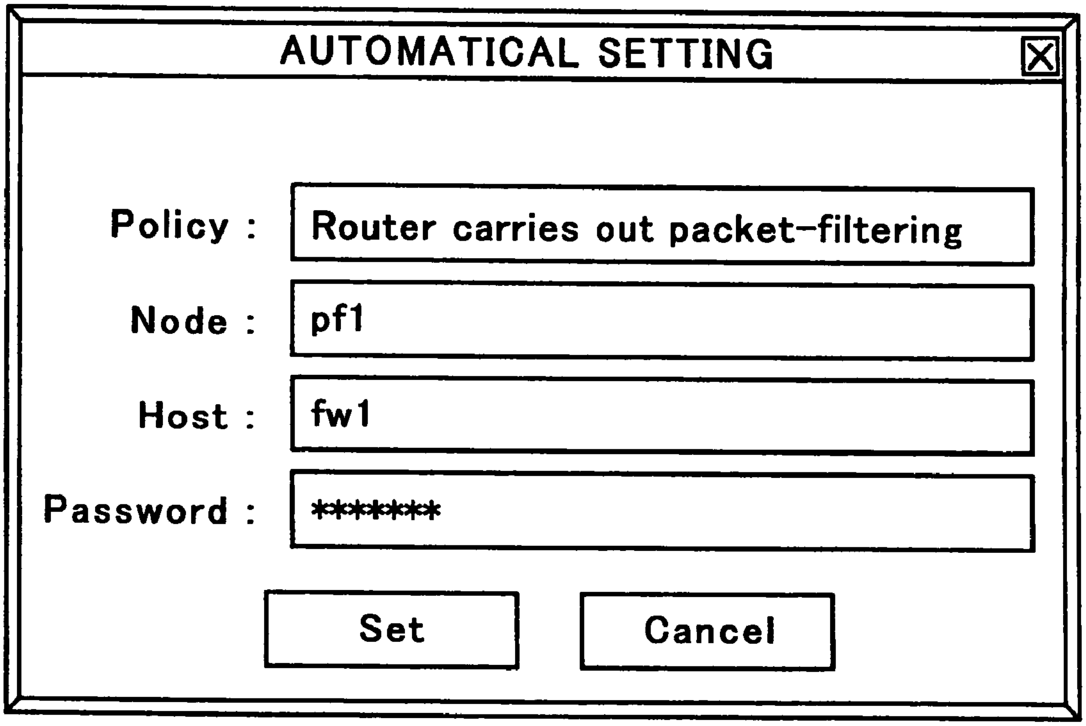
FIG. 39 illustrates an example of a screen in which a system administrator is inquired of whether a script is set or not.

The script maker 50 may display a segment selection column 181, a function-map display column 182, a rule-explanation display column 186 and a node-explanation display column 187 together with a script display column 501, as illustrated in FIG. 38, for instance. When a rule is selected by a system administrator through a mouse, the script maker 50 displays such an image plane as illustrated in FIG. 39, and inquires a system administrator of whether a script is to be made or not. When an instruction to make a script is input, the script maker 50 makes a script, and displays the script in the script display column 501.

In the second embodiment, the parameter-extracting device 40 extracts a parameter in accordance with a security function without dependence on a hardware or software. The script maker 50 applies the thus extracted parameter to a script model associated with a hardware or software, to thereby make a script. In accordance with the second embodiment, a script is automatically made, and hence, burden of a system administrator can be reduced.

In particular, it is not necessary for a system administrator to make a script for each of security functions of hardwares or softwares, ensuring much reduction in burden of a system administrator. That is, since a script is appropriately made in accordance with the set security policy without knowledge about a method of setting a hardware or software, a system administrator can reduce burden in setting a hardware or software.

When a new security function is made, a parameter-extracting template and a script template associated with the security function may be added. Since it is not necessary to amend existing parameter-extracting templates and script templates, increase in a security function can be readily dealt with.

When a new node having a conventional security function is made, a script template associated with the node may be added. Since it is not necessary to amend existing parameter-extracting templates and script templates, increase in a kind of hardwares and softwares can be readily dealt with.

The system in accordance with the second embodiment is designed to include the correspondence maker 20 and the node knowledge database 21. However, the system may be designed not to include the correspondence maker 20 and the node knowledge database 21, and to receive a function map made by an external system such as the system in accordance with the first embodiment, and carry out the step B300 and subsequent steps, based on the received function map. Specifically, the topology information and the function map are received through the input device 10, and thereafter, the parameter-extracting device 40 may carry out the step B300. As an alternative, a function map may be received not through a device such as a keyboard or a mouse, but through a communication network from an external system. When a function map is received through a communication network from an external system, the system is designed to include a network interface for receiving a function map.

Third Embodiment

Figure 40:
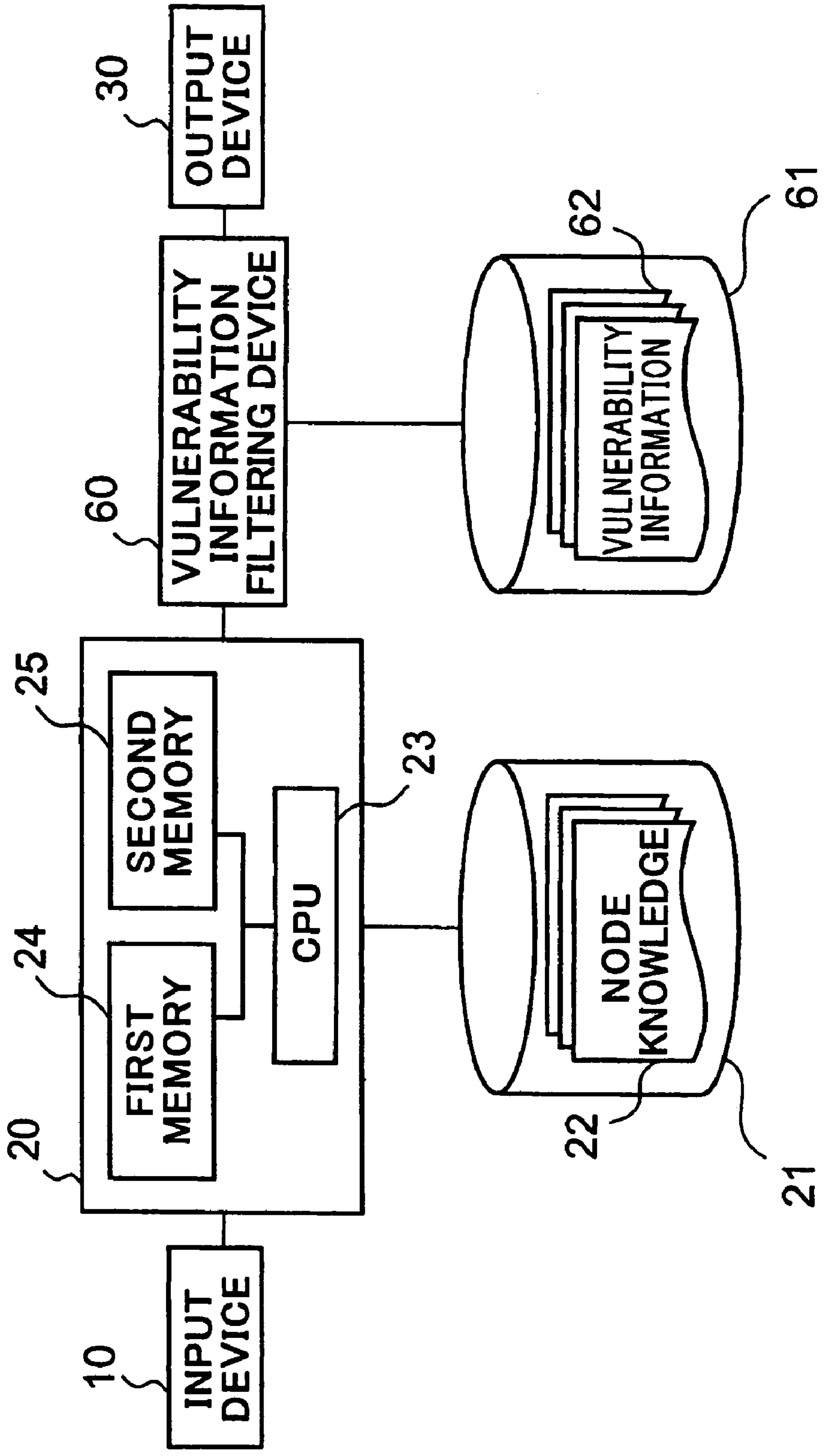
FIG. 40 is a block diagram of a system for supporting security administration, in accordance with the third embodiment of the present invention.

FIG. 40 is a block diagram of a system for supporting security administration, in accordance with the third embodiment of the present invention.

The system in accordance with the third embodiment is comprised of an input device 10, a correspondence maker or a function-mapping processor 20, a node-knowledge database 21 storing node knowledge therein, a vulnerability information filtering device 60, a vulnerability information database 61, and an output device 30.

Parts or elements that correspond to those of the system illustrated in FIG. 1 have been provided with the same reference numerals, and operate in the same manner as corresponding parts or elements in the first embodiment, unless explicitly explained.

As illustrated in FIG. 40, the correspondence maker 20 is comprised of a central processing unit 23, a first memory 24, and a second memory 25.

Each of the first and second memories 23 and 24 is comprised of a semiconductor memory such as a read only memory (ROM), a random access memory (RAM) or an IC memory card, or a storage device such as a flexible disc, a hard disc or an optic magnetic disc.

The first memory 23 stores therein a program for supporting security administration. The second memory 25 stores therein various data and parameters. The central processing unit 23 reads the program out of the first memory 24, and executes the program. Thus, the central processing unit 23 operates in accordance with the program stored in the first memory 24.

The vulnerability information database 61 stores vulnerability information 62. Herein, the vulnerability information 62 means information relating to vulnerability points in security in a hardware or software. Vulnerability information relating to newly found vulnerability points is made open to public. For instance, a system administrator arranges vulnerability information made open, in accordance with a predetermined format. The vulnerability information database 61 stores vulnerability information 62 arranged in accordance with the predetermined format.

The vulnerability information filtering device 60 (defined as "recommendation-degree judge" in claims) selects vulnerability information necessary to apply to a network system to be administrated, based on a function map output from the correspondence maker 20 and the vulnerability information 62 stored in the vulnerability information database 61, and makes a report with respect to the selected vulnerability information.

The vulnerability information filtering device 60 causes the output device 30 o output (display or print) the report.

In the third embodiment, the input device 10 receives not only the security policy 1 and the topology information 2, but also the vulnerability information 62.

As mentioned earlier, the correspondence maker 20 is accomplished by the central processing unit 23 operating in accordance with a program for supporting security administration. Similarly, the vulnerability information filtering device 60 may be accomplished by a central processing unit operating in accordance with a program for supporting security administration. The correspondence maker 20 and the vulnerability information filtering device 60 may be accomplished by separate central processing units, or may be accomplished by a common central processing unit. In the latter case, for instance, the correspondence maker 20 and the vulnerability information filtering device 60 may be accomplished commonly by the central processing unit 23, though the central processing unit 23 is illustrated as a part of the correspondence maker 20 in FIG. 40.

Figure 41:
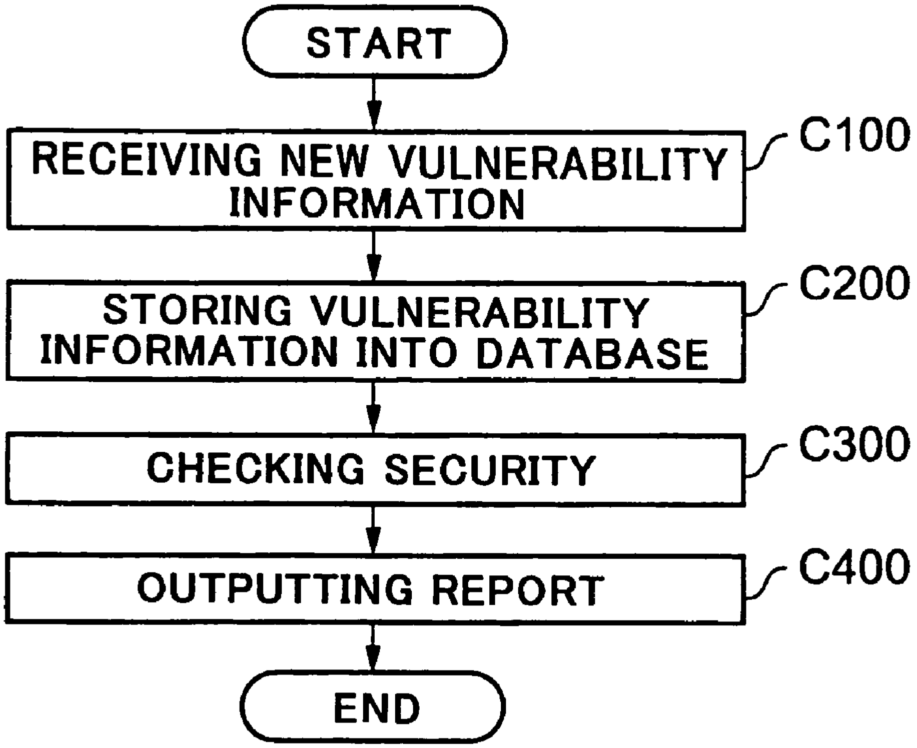
FIG. 41 is a flow-chart showing steps to be carried out by the system in accordance with the third embodiment of the present invention.

FIG. 41 is a flow-chart showing steps to be carried out in the system in accordance with the third embodiment.

Hereinbelow is explained an operation of the system in accordance with the third embodiment, with reference to FIG. 41. It is assumed hereinbelow that the input device 10 and the correspondence maker 20 have completed the steps A100 and A200 shown in the first embodiment, and thus, have already made the function map 3. It is further assumed that the correspondence maker 20 stores the function map 3 in the second memory 25.

First, a system administrator collects new vulnerability information made open to public, in step C100. A system administrator can collect vulnerability information from web pages and/or database made open to public. As a web page providing vulnerability information, there is a web page of JPCERT/CC (Japan Computer Emergency Response Team/Coordination Center). In addition, CVE (Common Vulnerabilities & Exposures) makes database of vulnerability information open. Furthermore, vendors provide vulnerability information through e-mail or a web page. A system administrator makes access to web pages and/or databases open to public to collect vulnerability information.

Then, a system administrator analyzes the collected vulnerability information, classifies the vulnerability information in accordance with a predetermined format, and stores the vulnerability information into the vulnerability information database 61. The system receives the vulnerability information 62 classified in accordance with a predetermined format, through the input device 10, and stores the thus received vulnerability information into the vulnerability information database 61, in step C200.

FIG. 42 illustrates an example of a format of the vulnerability information 62 stored in the vulnerability information database 61.

As illustrated in FIG. 42, the vulnerability information 62 is designed to have columns of ID, a title, specification, a target node/version, causes of vulnerability, and solution.

The "ID" column is an identifier for identifying only one vulnerability information stored in the vulnerability information database 61.

The "title" column indicates a title of vulnerability information.

The "specification" column provides information indicative of a detailed content of vulnerability points of security. For instance, in the "specification" column are described impact and urgency of security vulnerability points, technical information, and information about possible attacks.

The "solution" column provides information indicative of solutions for solving security vulnerability points. For instance, in the "solution" column are described solutions such as version-up, application of a security patch, and changing set files.

The "target node/version" column indicates a hardware or software to which the solutions indicated in the "solution" column are applied. In the "target node/version", a hardware or software is described through the use of a security class or "hardware-canonical-name", "hardware-canonical-version-name", "software-canonical-name" and "software-canonical-version-name" included in the node knowledge 22.

The "causes of vulnerability" column indicates causes by which vulnerability points occur. Specifically, a security function, a hardware or a software causing vulnerability points is described in the "causes of vulnerability" column.

For instance, it is assumed that a security problem would be caused if a hardware or software accomplishes a certain security function, but the security problem would not be caused if the hardware or software does not accomplish the security function. In the case, the security function is described as a cause of a vulnerability point in the "causes of vulnerability" column.

For instance, it is assumed that if a certain node A and a certain node B concurrently operates, a security problem would be caused in the node A, but the security problem would not be caused, if the node B does not operate. In the case, the node B is described as a cause of a vulnerability point in the "causes of vulnerability" column.

In the "target node/version" column, a security or a node causing a vulnerability point is described through the use of a security class or "hardware-canonical-name", "hardware-canonical-version-name", "software-canonical-name" and "software-canonical-version-name" included in the node knowledge 22.

A system administrator classifies newly received vulnerability information, into a format having the above-mentioned columns, and inputs the vulnerability information into the system for supporting security administration. A central processing unit (CPU) of the system additionally stores the vulnerability information into the vulnerability information database 61.

In the above-mentioned case, a system administrator receives and classifies vulnerability information. However, a central processing unit (CPU) of the system may be designed to do so in place of a system administrator.

Storage of vulnerability information is carried out as follows. A central processing unit (CPU) of the system periodically requests a server providing a web page on which vulnerability information is presented, to transmit the web page to the system, and receives information relating to the web page from the server. Then, the central processing unit extracts information to be described in the above-mentioned columns, out of the received web page, and stores the thus extracted information into the vulnerability information database 61. Information to be described in the above-mentioned columns may be extracted out of the web page by referring to a predetermined keyword, or based on a document structure of the web page.

After carrying out the step C200, the vulnerability information filtering device 60 judges a possibility at which security vulnerability points exist in a system to be administrated, based on the thus stored vulnerability information 62 and the function map of the system to be administrated, and then, determines a degree of recommendation of solutions to the security vulnerability points, in step C300.

Then, the vulnerability information filtering device 60 causes the output device 30 to output a report relating to the security vulnerability points, in step C400.

Figure 43:
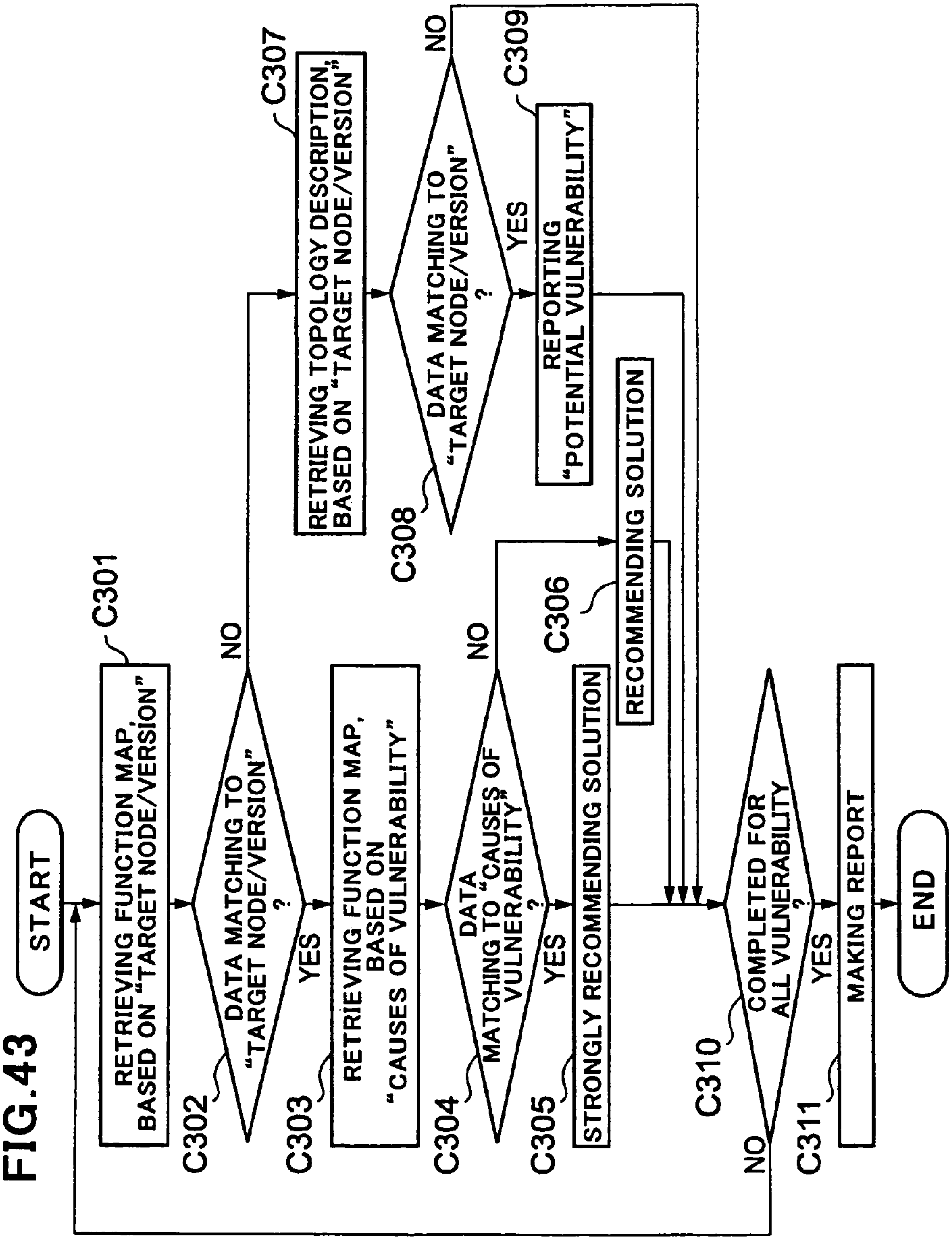
FIG. 43 is a flow-chart showing steps to be carried out when a recommendation degree is determined.

FIG. 43 is a flow-chart showing steps to be carried out in the step C300. Hereinbelow is explained the step C300 in detail with reference to FIG. 43.

The vulnerability information filtering device 60 retrieves a function map output from the correspondence maker 20, based on the "target node/version" column of the vulnerability information 62 stored in the vulnerability information database 61, in step C301. As mentioned earlier, a function map includes a sum of combinations of a rule, a security function and a node.

The vulnerability information filtering device 60 judges whether the function map includes a combination including a node matching to the "target node/version" column, in step C302.

If the vulnerability information filtering device 60 judges that the function map includes such a combination (YES in step C302), the vulnerability information filtering device 60 retrieves the function map, based on the "causes of vulnerability" column of the vulnerability information 62, in step C303.

Then, the vulnerability information filtering device 60 judges whether the function map includes a combination including a security function or a node matching to the "causes of vulnerability" column, in step C304.

If the vulnerability information filtering device 60 judges that the function map includes such a combination (YES in step C304), this means that there exists a target node to which a solution to a security vulnerability point is applied, and the network to be administrated uses the security function or node causing a vulnerability point. Accordingly, the vulnerability information filtering device 60 judges that it is necessary to "strongly" recommend a solution to the security vulnerability point, in step C305.

If the vulnerability information filtering device 60 judges that the function map does not include such a combination (NO in step C304), this means that there exists a target node to which a solution to a security vulnerability point is applied, but the network to be administrated does not use the security function or node causing a vulnerability point. Accordingly, the vulnerability information filtering device 60 judges that it is necessary to recommend a solution to the security vulnerability point, in step C306.

If the vulnerability information filtering device 60 judges that the function map does not include a combination including a node matching to the "target node/version" column (NO in step C302), the vulnerability information filtering device 60 retrieves topology description, based on the "target node/version" column, in step C307.

Then, the vulnerability information filtering device 60 judges whether the topology description includes a node matching to the "target node/version" column, in step C308.

If the vulnerability information filtering device 60 judges that the topology description includes a node matching to the "target node/version" column (YES in step C308), this means that the system to be administrated includes a target node which is not associated with a rule, but to which a solution to a security vulnerability point is to be applied.

Then, the vulnerability information filtering device 60 reports that there exists "a potential vulnerability point" in the system to be administrated, in step C309.

After carrying out the steps C305, C306 and C309, the vulnerability information filtering device 60 carries out the step C310.

If the vulnerability information filtering device 60 judges that the topology description does not include a node matching to the "target node/version" column (NO in step C308), the vulnerability information filtering device 60 carries out the step C310, because there are no matters to be reported to a system administrator.

The vulnerability information filtering device 60 judges whether the step C301 and the subsequent steps have been carried out for all of the newly recorded vulnerability information 62, in step C310. If the step C301 and the subsequent steps are not carried out for certain vulnerability information 62, the vulnerability information filtering device 60 carries out those steps for the certain vulnerability information 62.

If the step C301 and the subsequent steps have been carried out completely all of the newly recorded vulnerability information 62, the vulnerability information filtering device 60 makes a report, based on the results of the steps C305, C306 and C309, in step C311. For instance, the vulnerability information filtering device 60 makes a report indicative of the columns of the vulnerability information 62 and a degree of the recommendation.

Then, the vulnerability information filtering device 60 causes the output device 30 to output the thus made report, in step C400.

FIG. 44 illustrates an example of the report.

The report illustrated in FIG. 44 includes a message that a solution to vulnerability is strongly recommended, ID, specification, a target node/version, causes of vulnerability and a solution. The vulnerability information filtering device 60 may add a name of a node (name attribute of a node) indicated by a user into the "causes of vulnerability" column such that the report includes the name attribute. By adding name attribute of a node into the report, a system administrator can readily recognize a node to which a solution is to be applied.

FIG. 44 illustrates just an example of the report. A content of the report is not to be limited to the illustrated one.

The vulnerability information filtering device 60 may be designed to cause the output device 30 to automatically output the report including a message that a solution to vulnerability is "strongly" recommended, and cause the output device 30 to output the report including a message that a solution to vulnerability is recommended, on receipt of a request from a system administrator. For instance, when the vulnerability information filtering device 60 made the report including a message that a solution to vulnerability is recommended, the vulnerability information filtering device 60 may display GUI through which the vulnerability information filtering device 60 inquires a system administrator of whether the report is to be output, and may output the report only when instructed to do so. The vulnerability information filtering device 60 may be designed to store a report including a message that there exists potential vulnerability, into a memory (not illustrated), and, when instructed by a system administrator, read the report out of the memory and display the report. Since a report including a message that there exists potential vulnerability is considered to be made a lot, the report may be output only when instructed to do so by a system administrator.

A format of the vulnerability information 42 stored in the vulnerability information database 61 is not to be limited to the format illustrated in FIG. 42. The vulnerability information 42 may be described in any format, if it has a column for indicating a target node to which a solution is to be applied, and a column for showing causes of vulnerability points, in order to classify a degree of the recommendation of applying a solution, and further has a column showing a solution, in order to show a system administrator a detailed solution to vulnerability.

In the third embodiment, it is judged whether causes of vulnerability exist in a network system to be administrated, based on vulnerability information newly recorded into the vulnerability information database 61 every day, and a solution to vulnerability points is automatically reported. Hence, a system administrator can readily select vulnerability information relating to a system to be administrated, among a lot of vulnerability information.

In addition, in the third embodiment, it is judged not only whether a target node (a hardware or software) to which a solution to a vulnerability point is to be applied exists in the network to be administrated, but also whether a security function or a node causing the vulnerability point is used in the network system. In accordance with a combination of the judgment results, a degree of recommendation of applying a solution to a target node is determined. Accordingly, a system administrator can readily judge whether a solution is soon applied to a vulnerability point. In addition, a system administrator can judge that it is not urgently necessary to do so, in accordance with the indicated degree of the recommendation, for instance. Thus, it is possible for a system administrator to unnecessarily apply a solution to a target node.

The system in accordance with the third embodiment is designed to include the correspondence maker 20 and the node knowledge database 21. However, the system may be designed not to include the correspondence maker 20 and the node knowledge database 21, and to receive a function map made by an external system such as the system in accordance with the first embodiment, and carry out the steps, based on the received function map. Specifically, the topology information and the function map are received through the input device 10, and new vulnerability information is stored into the vulnerability information database 61, and thereafter, the vulnerability information filtering device 60 may start carrying out the step C300. As an alternative, a function map may be received not through a device such as a keyboard or a mouse, but through a communication network from an external system. When a function map is received through a communication network from an external system, the system is designed to include a network interface through a function map is received.

Similarly to the second embodiment, the system in accordance with the third embodiment may be designed to further include the parameter-extracting device 40, the parameter-extracting template database 41, the script maker 50 and the script template database 51 for carrying out the steps carried out by the second embodiment, as well as the above-mentioned steps.

Fourth Embodiment

Before explaining the system in accordance with the fourth embodiment, the system in accordance with the first embodiment is supplementally explained in order to clearly show a difference between the fourth and first embodiments.

In the first embodiment, a policy element identifies a parent policy element by virtue of the parent element 79 (see FIG. 5), and the priority element (see FIG. 5) indicates a priority of each of ruled (policy elements). The parent element 79 and the priority element 80 describes constraint defining a parent-child relation of rules and preference in priorities.

In addition, in the first embodiment, when subject elements are identical with one another, but action elements are different from one another in a plurality of rules associated with a common node, there occurs policy collision. This means that there is constraint that a plurality of rules associated with a common node is allowed to include subject elements identical with one another, but disallowed to include action elements different from one another.

Similarly, when a predetermined plurality of rules is associated with a node, it may be detected that there occurs policy collision. As the example thereof, the first embodiment indicated that if rules R1 and R2 are associated with a rule N1, there occurs policy collision. This means that there is constraint that a predetermined plurality of rules must not be associated with a node.

In addition, the first embodiment indicated that when predetermined particular rules are associated with nodes different from one another, it may be detected that there occurs policy collision. As the example thereof, the first embodiment indicated that if a rule R1 is associated with a rule N1 and a rule R3 is associated with a rule N2, there occurs policy collision. This means that there is constraint that predetermined particular rules must not be associated with nodes different from one another.

Those constraints are constraints defining a relation between a node and a rule.

In the first embodiment, when a node is not associated with any rule, there occurs underpolicy. This means that there is constraint that a node must be associated with a rule. This constraint is a constraint defining a relation between a node and a rule.

As mentioned above, a function map is made in the first embodiment, based on a constraint defining a parent-child relation of rules and preference in priorities and a constraint defining a relation between a node and a rule.

In contrast, in the fourth embodiment, information indicative of a constraint between security classes in a segment (each of portions of a communication network) is used, as well as the above-mentioned constraints. Herein, a "constraint between security classes" means a constraint between security functions expressed with "function-class". Hereinbelow, a constraint between security functions in a segment is referred to as "constraint knowledge".

Figure 45:
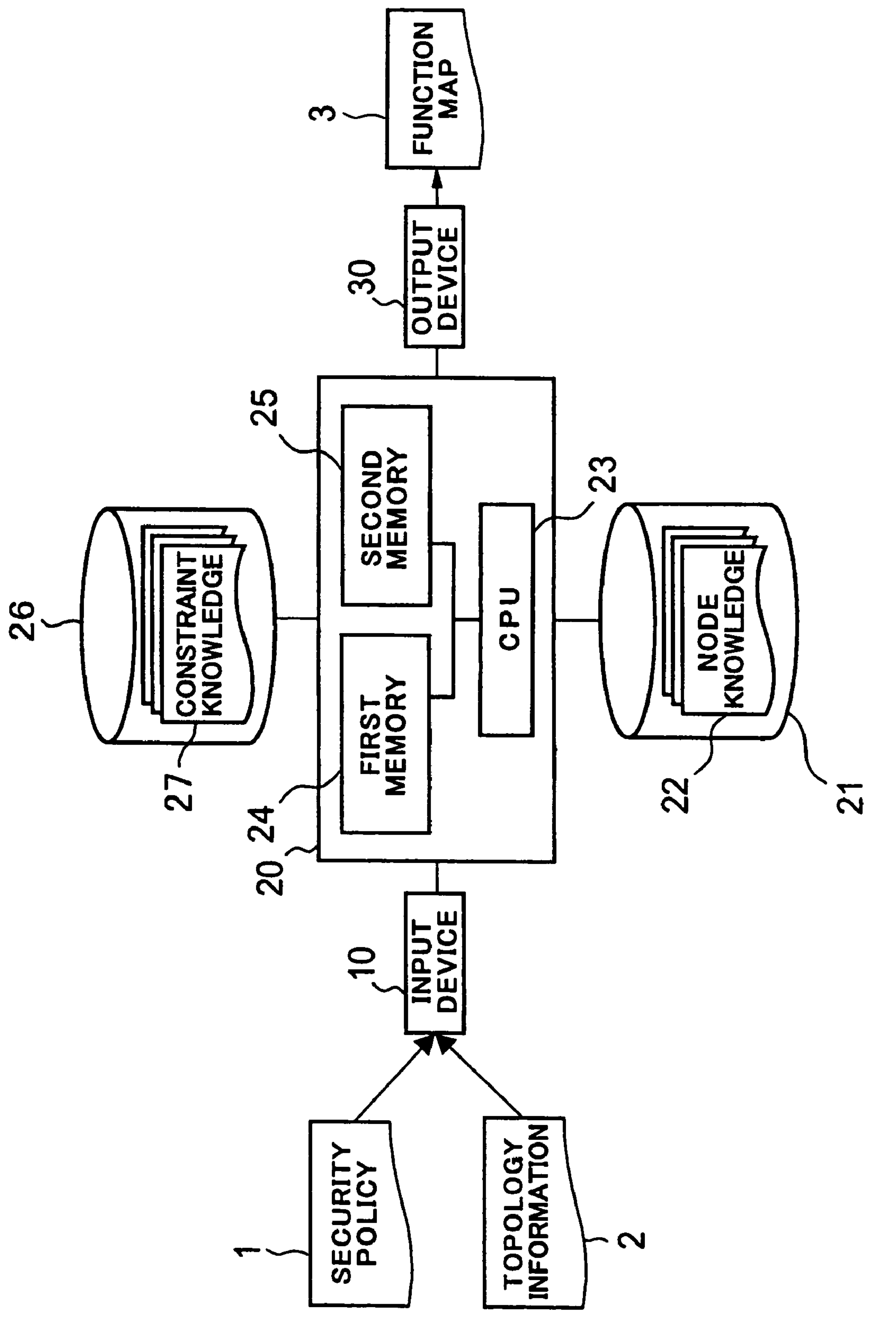
FIG. 45 is a block diagram of a system for supporting security administration, in accordance with the fourth embodiment of the present invention.

FIG. 45 is a block diagram of a system for supporting security administration, in accordance with the fourth embodiment of the present invention.

The system in accordance with the fourth embodiment is comprised of an input device 10, a correspondence maker or a function-mapping processor 20, a node-knowledge database 21 storing node knowledge 22 therein, a constraint knowledge database 26, and an output device 30.

Parts or elements that correspond to those of the system illustrated in FIG. 1 have been provided with the same reference numerals, and operate in the same manner as corresponding parts or elements in the first embodiment, unless explicitly explained.

The input device 10 receives security policy 1 and topology policy 2, similarly to the input device 10 in the first embodiment. Each of rules included in the security policy 1 is associated with security function information. The rules are classified to segments. Accordingly, a policy element transformed from each of the input rules includes a subject element 76, an action element 77, and a segment element 78. The topology information 2 indicates correspondence between each of segments in a communication network and a hardware which belongs to each of segments, and further indicates correspondence between a hardware and a software installed in the hardware.

As illustrated in FIG. 45, the correspondence maker 20 is comprised of a central processing unit 23, a first memory 24, and a second memory 25.

Each of the first and second memories 23 and 24 is comprised of a semiconductor memory such as a read only memory (ROM), a random access memory (RAM) or an IC memory card, or a storage device such as a flexible disc, a hard disc or an optic magnetic disc.

The first memory 23 stores therein a program for supporting security administration. The second memory 25 stores therein various data and parameters. The central processing unit 23 reads the program out of the first memory 24, and executes the program. Thus, the central processing unit 23 operates in accordance with the program stored in the first memory 24.

The correspondence maker 20 transforms the input security policy 1 into policy description. As a result, each of rules is expressed as a policy element. In addition, the correspondence maker 20 transforms the input topology information 2 to topology description. Then, the correspondence maker 20 makes a function map as a sum of information indicative of correspondence among a rule, a security function and a node.

The node knowledge database 21 sores the node knowledge 22 similar to the node knowledge 22 explained in the first embodiment.

The output device 30 has the same structure as that of the output device 30 in the first embodiment.

The constraint knowledge database 26 stores constraint knowledge 27 therein. For instance, the constraint knowledge 27 indicates a constraint such as "prohibited", "warning", "recommend" or "must (do)".

The constraint "prohibited" defines a combination of a plurality of security functions which must not be set in a common segment. A boundary between portions of a communication network such as a boundary between Internet and DMZ is also a segment.

The constraint "warning" defines a combination of a plurality of security functions to which a system administrator should pay attention when they are set in a common segment.

The constraint "recommend" defines a combination of a plurality of security functions which are preferably set in a common segment.

The constraint "must" defines a combination of a plurality of security functions which have to be set in a common segment.

The constraint knowledge 27 is described in a format readable by a computer, and is stored in the constraint knowledge database 26. Hereinbelow, constraint knowledge described in a format readable by a computer is referred to as constraint knowledge description. In the entire constraint knowledge description, a portion indicative of each of constraint knowledge is referred to as a constraint element.

FIG. 46 illustrates an example of constraint knowledge description.

An area 401 sandwiched between <constraints> indicates the entirety of constraint knowledge description. An area sandwiched between <constraint> indicates a constraint element. The example illustrated in FIG. 46 shows five constraint elements 402*a* to 402*e*. However, the number of constraint elements included in the entirety of constraint knowledge description is not to be limited to five.

Each of the constraint elements 402*a* to 402*e* includes a function element 407. The function element 407 indicates a security function. The function element 407 includes action attribute 408. The action attribute 408 indicates a setting of a security function as to whether a security function indicated by the function element 407 is accomplished or not. The action attribute 408 of each of the function elements 407 illustrated in FIG. 46 is described as "add", which means that a security function is to be accomplished.

Though the action attribute 408 shown in FIG. 46 is all described as "add", the action attribute 408 may be described not to accomplish a security function.

Each of the constraint elements 402*a* to 402*e* includes name attribute 403, logic attribute 404 and type attribute 405.

In the name attribute 403, names for identifying the constraint elements are described.

In the logic attribute 404, a logic expression to be applied to the function element 407 included in a constraint element is described. For instance, if "and" is described in the logic attribute 404, this means logical product, that is, description of a plurality of the function elements 407 included in a constraint element are concurrently true. A condition that a plurality of security functions indicated by the function element 407 exists in a function map in a segment may be described in the logic attribute 404. Hereinbelow, such a condition is referred to as "multiple". That is, if "multiple" is described in the logic attribute 404, this means that a plurality of security functions indicated by the function elements 407 exists in a function map in a segment.

In the type attribute 405, a kind of constraint indicated by a constraint element is described.

Each of the constraint elements 402*a* to 402*e* includes a comment element 406. The comment element 406 indicates a comment in which each of constraints is explained in natural language.

Each of the constraint elements 402*a* to 402*e* includes a segment element 409. The segment element 409 indicates a segment which has to follow a constraint indicated by a constraint element.

Hereinbelow is explained an example of a constraint element with reference to the five constraint elements 402*a* to 402*e* illustrated in FIG. 46.

In the name attribute of the constraint element 402*a*, a name "c001" is described. The constraint element 402*a* includes two function elements 407. Since the function element first appearing at line 4 in FIG. 46 has the action attribute 408 "add", the function element indicates a setting by which DNAT (Dynamic Network Address Translator) is carried out. Similarly, since the function element appearing at line 5 in FIG. 46 has the action attribute 408 "add", the function element indicates a setting by which SNAT (Static Network Address Translator) is carried out. A segment element 409 of the constraint element 402*a* indicates a segment of a boundary in a communication network. Logic attribute 404 indicates "and" (logical product). Type attribute 405 indicates "prohibited". Accordingly, the constraint element 402*a* indicates a constraint that DNAT and SNAT are not allowed to be concurrently carried out at a boundary segment in a communication network. Since DNAT and SNAT are contradictory to each other as a process of address transformation, there is set such a constraint.

In the name attribute of the constraint element 402*b*, a name "c002" is described. The constraint element 402*b* includes two function elements 407. Since the function element first appearing at line 11 in FIG. 46 has the action attribute 408 "add", the function element indicates a setting by which prevention of raising (function.service.integrity) is carried out. Similarly, since the function element appearing at line 12 in FIG. 46 has the action attribute 408 "add", the function element indicates a setting by which log acquisition is carried out. A segment element 409 of the constraint element 402*b* indicates a segment which does not indicate a boundary. Logic attribute 404 indicates "and" (logical product). Type attribute 405 indicates "warning". Accordingly, the constraint element 402*b* indicates a constraint that it is necessary to pay attention when prevention of raising and log acquisition are concurrently carried out in a segment which does not indicate a boundary. Such a constraint is set to give warning to a system administrator, because a step of writing a log into a file which step is carried out when a log is acquired is detected as raising.

In the name attribute of the constraint element 402*c*, a name "c003" is described. The constraint element 402*c* includes two function elements 407. Since the function element first appearing at line 18 in FIG. 46 has the action attribute 408 "add", the function element indicates a setting by which log acquisition is carried out. Similarly, since the function element appearing at line 19 in FIG. 46 has the action attribute 408 "add", the function element indicates a setting by which designation of time is carried out. A segment element 409 of the constraint element 402c indicates a segment which does not indicate a boundary. Logic attribute 404 indicates "and" (logical product). Type attribute 405 indicates "recommend". Accordingly, the constraint element 402*c* indicates a constraint that it is preferable to carry out log acquisition and designation of time in a segment which does not indicate a boundary. Whereas the constraint element 402*a* indicates that two security functions are not allowed to coexist and the constraint element 402*b* indicates warning to coexistence of two security functions, the constraint element 402*c* allows the two security functions to coexist.

In the name attribute of the constraint element 402*d*, a name "c004" is described. The constraint element 402*d* includes a single function element 407. Since the function element appearing at line 25 in FIG. 46 has the action attribute 408 "add", the function element indicates a setting by which network type detection of invasion (function.ids.network) is carried out. A segment element 409 of the constraint element 402*d* indicates a segment which does not indicate a boundary. Logic attribute 404 indicates "multiple". Type attribute 405 indicates "prohibited". Accordingly, the constraint element 402*d* indicates a constraint that network type detection of invasion must not be carried out at a plurality of sites in a segment which does not indicate a boundary.

In the name attribute of the constraint element 402*e*, a name "c005" is described. The constraint element 402*e* includes two function elements 407. Since the function element first appearing at line 31 in FIG. 46 has the action attribute 408 "add", the function element indicates a setting by which prevention of raising is carried out. Similarly, since the function element appearing at line 32 in FIG. 46 has the action attribute 408 "add", the function element indicates a setting by which virus-scanning (function.service.virusscan) is carried out. A segment element 409 of the constraint element 402*e* indicates a segment which does not indicate a boundary. Logic attribute 404 indicates "add". Type attribute 405 indicates "must". Accordingly, the constraint element 402*e* indicates a constraint that if prevention of raising is carried out in a segment which does not indicate a boundary, virus-scanning has to be carried out together.

As mentioned above, the constraint knowledge 27 indicates a constraint between security functions in a segment. Whereas the constraint shown in the first embodiment defines a relation between a node and a rule, the constraint knowledge 27 includes neither information relating to a node nor description relating to a parent-child relation and preference in priorities of the policy elements.

FIG. 46 illustrates just an example of the constraint knowledge description. The constraint knowledge description may be made in a format other than the format illustrated in FIG.

46. However, it is assumed in the explanation made hereinbelow that the constraint knowledge description illustrated in FIG. 46 is stored in the constraint knowledge database 26.

On receipt of the security policy 1 and the topology information 2, the correspondence maker 2 transforms the security policy 1 into policy description, and the topology information 2 into topology description. FIG. 47 illustrates an example of the policy description, and FIG. 48 illustrates an example of the topology description.

In the policy description illustrated in FIG. 47, policy elements 421*a* and 421*b* including "network.segment-boundary.int-dmz" as a segment element are described, and policy elements 421*c* to 421*e* including "network.segment.dmz" as a segment element are described. In the topology description illustrated in FIG. 48, nodes such as nodes 431*a* to 431*f* are described. A segment is described also in the topology description.

Steps to be carried out by the correspondence maker 20 to make a function map are identical with the steps illustrated in FIG. 14. After carrying out the steps A201 to A203, the correspondence maker 20 selects a segment, in step A204, and then, makes node knowledge view, in step A205. Then, the correspondence maker 20 makes correspondence between a rule and a node in the selected segment through a security function. By repeating making such correspondence, the correspondence maker 20 makes a sum of information indicative of correspondence among a rule, a security function and a node, in steps A206 to A208. Then, the correspondence maker 20 judges whether there occur overpolicy, policy collision and underpolicy, in steps A209, A211 and A213. If there is a segment not selected (NO in step A215), the correspondence maker 20 repeats the step A204 and the subsequent steps.

In the judgment of whether there occurs overpolicy (step A209), the correspondence maker 20 judges that there occurs overpolicy, if an associated node cannot be found for a rule. This step is identical with the step A209 in the first embodiment.

In the judgment of whether there occurs policy collision (step A211), the correspondence maker 20 judges that policy collision occurs if a plurality of rules associated with a common node has subject elements identical with one another, but has action elements different from one another. The correspondence maker 20 may judge that policy collision occurs if a predetermined plurality of rules is associated with a node. As an alternative, the correspondence maker 20 may judge that policy collision occurs if each of predetermined particular rules is associated with each of nodes different from one another.

The judgment carried out by the correspondence maker 20 is identical with the judgment carried out in the first embodiment. The correspondence maker 20 in the fourth embodiment carries out not only the above-mentioned judgment, but also the judgment as to whether policy collision occurs, based on the constraint knowledge 27.

When the correspondence maker 20 makes judgment as to whether policy collision occurs, based on the constraint knowledge 27, the correspondence maker 20 uses a constraint element including the type attribute 405 "prohibited" or "warning".

It is assumed that the segment "network.segment-boundary.int-dmz" (a boundary between Internet and DMZ) is selected in step A204, and each of the policy elements 421*a* and 421*b* illustrated in FIG. 47 is associated with a node in the selected segment.

As a result, a security function for carrying out DNAT and a security function for carrying out SNAT coexist in a function map at a boundary between Internet and DMZ. This condition does not accord to the constraint indicated by the constraint element 402*a*. Accordingly, the correspondence maker 20 judges that there occurs policy collision. Then, the correspondence maker 20 causes the output device 30 to output information indicating that there exists a combination of security functions (a combination of a security function for carrying out DNAT and a security function for carrying out SNAT) which must not be set in a common segment.

It is also assumed that the segment "network.segment.dmz (DMZ)" is selected in step A204, and each of the policy elements 421*c* to 421*e* illustrated in FIG. 47 is associated with a node in the selected segment.

As a result, a security function for preventing raising and a security function for acquiring log coexist in a function map in DMZ. This condition does not accord to the constraint indicated by the constraint element 402*b*. Accordingly, the correspondence maker 20 judges that there occurs policy collision. Then, the correspondence maker 20 causes the output device 30 to output warning to a system administrator, because there exists a combination of security functions (a combination of a security function for preventing raising and a security function for acquiring log) to which a system administrator should pay attention when set in a common segment.

The correspondence maker 20 may make judgment as to whether policy collision occurs, based on the constraint knowledge 27, without making judgment as to whether there occurs policy collision which judgment was made in the first embodiment.

In judgment as to whether there occurs underpolicy (step A213), the correspondence maker 20 judges that there occurs underpolicy, if there exists a node which is not associated with any rule. The judgment carried out by the correspondence maker 20 is identical with the judgment carried out in the first embodiment. The correspondence maker 20 in the fourth embodiment carries out not only the above-mentioned judgment, but also the judgment as to whether there occurs underpolicy, based on the constraint knowledge 27.

When the correspondence maker 20 makes judgment as to whether there occurs underpolicy, based on the constraint knowledge 27, the correspondence maker 20 uses a constraint element including the type attribute 405 "recommend" or "must".

It is assumed that the segment "network.segment.dmz (DMZ)" is selected in step A204, and each of the policy elements 421*c* to 421*e* illustrated in FIG. 47 is associated with a node in the selected segment.

As a result, a security function for acquiring log and a security function for designating time coexist in a function map in DMZ. This condition accords to the constraint indicated by the constraint element 402*c*. Accordingly, a combination of a security function for acquiring log and a security function for designating time does not cause underpolicy. If one of the security functions exists, the correspondence maker 20 causes the output device 30 to output information indicating that a combination of security functions which are preferable to be set in a common segment is not established.

The function map in DMZ includes a security function for preventing raising, but does not include a security function for scanning virus. That is, there exists only a part of a plurality of security functions indicated by the constraint element 402*e*. This state does not accord to the constraint indicated by the constraint element 402*e*. Accordingly, the correspondence maker 20 judges that there occurs underpolicy. The correspondence maker 20 causes the output device 30 to output information indicating that a combination of security functions (a combination of a security function for preventing raising and a security function for scanning virus) which have to be set in a common segment is not established.

Similarly to the correspondence maker 20 in the first embodiment, the correspondence maker 20 in the fourth embodiment makes correspondence between a rule and a node through a security function, and causes the output device 30 to output a report indicative of the correspondence. Hence, a system administrator can readily understand which node is associated with which rule, and what rule each of nodes accomplishes.

In addition, the correspondence maker 20 judges whether there occurs overpolicy, policy collision and underpolicy. Hence, the system in accordance with the fourth embodiment makes it possible to indicate that a security function cannot be accomplished, based on a rule set by a system administrator, in a network system identified by the input topology information. In addition, the system makes it possible to indicate occurrence of policy collision which does not accord to a constraint set between security functions in a common segment. Furthermore, the system makes it also possible to indicate occurrence of underpolicy which does not accord to a constraint set between security functions in a common segment. Thus, the system indicates inconsistency and shortage of settings of security functions, and hence, ensures enhancement in security in a system to be administrated, and reduction in burden of a system administrator.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 2003-120625 and 2003-371215 filed on Apr. 24, 2003 and Oct. 30, 2003, respectively, including specification, claims, drawings and summary is incorporated herein by reference in its entirety.

What is claimed is:

1. A system for supporting security administration in a network system, including:

a node-information memory storing node information indicative of security functions provided by hardware and software of said network system, for each of said hardware and each of said software;

an input device which receives a set of rules as guidance relating to security of said network system, and topology information indicative of hardware of said network system and software installed in each of said hardware; and a correspondence maker which, based on said node information, makes correspondence between each of said rules and each of said hardware or software indicated by said topology information, wherein when said correspondence maker judges there is a vacant rule in the set of rules which does not have correspondence to any hardware or software, among said set of rules, the correspondence maker makes correspondence between one of the hardware and software and the vacant rule, or, if impossible to make the correspondence, the correspondence maker outputs a message to a user that urges the user to conduct one of deleting the vacant rule, and adding hardware or software corresponding to the vacant rule, and when said correspondence maker judges there is a hardware or software which does not have correspondence to any rule in the set of rules, the correspondence maker outputs a message to a user that urges the user to add a rule to make correspondence between the hardware or software and the added rule, or delete the hardware or software.

2. The system as set forth in claim 1, wherein said input device receives a set of rules including infonnation about security functions which information corresponds to each of said rules, and said correspondence maker, based on said node information, identifies security function provided by each of said hardware or software indicated by said topology information, and makes correspondence among the identified security function, a rule corresponding to the identified security function, and said each of said hardware or software.

3. The system as set forth in claim 1, further comprising an output device which outputs information about correspondence made by said correspondence maker between each of said rules and each of said hardware or software.

4. The system as set forth in claim 3, wherein said correspondence maker judges there is inconsistency in said correspondence, when rules to which a hardware or software commonly corresponds are contradictory to one another, and causes said output device to output detection of said inconsistency.

5. The system as set forth in claim 3, further comprising a inconsistency-information memory which stores inconsistency in correspondence between a rule and a hardware or software, and wherein said correspondence maker judges there is inconsistency between a rule and a hardware or software, when correspondence between a rule and a hardware or software is coincident with said inconsistency, and causes said correspondence maker to output judgment result.

6. The system as set forth in claim 1, wherein if said rule exists, said correspondence maker causes said input device to output information indicating said rule exists.

7. The system as set forth in claim 3, wherein said correspondence maker judges whether there is a hardware or software which does not have correspondence to any rule, among said hardware or software indicated by said topology information, and if such a hardware or software exists, said correspondence maker causes said input device to output information indicating that such a hardware or software exists.

8. The system as set forth in claim 1, further comprising:

a parameter-information memory which stores parameter information including an instruction to extract a parameter to be applied to a hardware or software for causing said hardware or software to carry out its security functions, out of said topology information;

a parameter-extracting device which extracts said parameter information out of said parameter-information memory for each of said security functions to which a rule and a hardware or software corresponds, and extracts a parameter out of said topology information in accordance with an instruction included in the extracted parameter information;

an script-model memory which stores a model of a script including a command for determining a parameter on the assumption that a parameter is not determined; and a script maker which extracts said model out of said script-model memory, and makes said script, based on the extracted model and said parameter extracted by said parameter- extracting device.

9. The system as set forth in claim 8, wherein said parameter-information memory stores said parameter information for each of security functions which parameter information does not include description dependent on a hardware or software.

10. The system as set forth in claim 8, wherein said script maker stores a model of a script dependent on a hardware or software, for each of security functions of each of said hardware and each of said software, and extracts a model of a script identified by a combination of a security function and a hardware or software which combination corresponds to a rule, out of said script-model memory, to thereby make a script.

11. The system as set forth in claim 1, further comprising:

a vulnerability information input device which receives vulnerability information including at least first information indicative of a reason why a security vulnerability point is caused, second information indicative of an object to which a solution to said security vulnerability point is applied, and third information indicative of said solution, and an recommendation-degree judge which determines a degree at which said solution is recommended to carry out, based on a combination of a rule, a security function, and a hardware or software which combination was made by said correspondence maker.

12. The system as set forth in claim 11, wherein said recommendation-degree judge judges whether a hardware or software identified as said object has correspondence to a rule, and classifies said degree, based on the judgment result.

13. The system as set forth in claim 11, wherein said recommendation-degree judge judges whether said reason is included in said combination, and classifies said degree, based on the judgment result.

14. The system as set forth in claim 11, wherein said recommendation-degree judge judges whether a hardware or software identified as said object is includes in said topology information, and classifies said degree, based on the judgment result.

15. The system as set forth in claim 1, wherein said input device receives a set of rules classified for classes of a communication network, and topology information indicative of said class of said communication network and hard-wares belonging to each of said classes, and said correspondence maker makes correspondence between a rule and a hardware or software for each of classes of said communication network.

16. The system as set forth in claim 1, wherein said input device receives a set of rules which do not include description dependent on a particular hardware or software, and said node-information memory stores said node information storing security functions described without dependence on a particular hardware or software.

17. A system for supporting security administration in a network system, including:

an input device receiving topology information indicative of hardware of said network system and software installed in each of said hardware;

a function-map input device receiving a function map including a set of information indicative of correspondence among a rule as a guidance relating to security of said network system, a hardware or software of said network system, and a security function provided by said hardware or software to accomplish said rule;

a parameter-information memory stonng parameter information including an instruction to extract a parameter to be applied to a hardware or software for causing said hardware or software to carry out its security functions, out of said topology information;

a parameter-extracting device extracting said parameter information out of said parameter-information memory for each of said security functions to which a rule and a hardware or software corresponds, and extracting a parameter out of said topology information in accordance with an instruction included in the extracted parameter information, based on said function map;

a script-model memory storing a model of a script including a command for determining a parameter on the assumption that a parameter is not determined; and a script maker extracting said model out of said script-model memory, and making said script, based on the extracted model and said parameter extracted by said parameter-extracting device.

18. A system for supporting security administration in a network system, including:

a node-information memory storing node information indicative of security functions provided by hardware and software of said network system, for each of said hardware and each of said software;

an input device which receives a set of rules as guidance relating to security of said network system, and topology information indicative of classes of said communication network, hardware beloning to each of said classes, and software installed in each of said hardware, said rules being associated with information of a security function and being classified for each of said classes of said communication network;

a constraint-information memory which stores constraint information indicative of constraint to a security function in each of said classes of said communication network; and a correspondence maker which, based on said node information, identifies a security function provided by a hardware belonging to each of said classes of said communication network or by a software installed in said hardware for each of said classes of said communication network, and makes correspondence among a rule associated with the identified security function, said security function, and said hardware or software, wherein when said correspondence maker judges there is a vacant rule in the set of rules which does not have correspondence to any hardware or software, among said set of rules, the correspondence maker makes correspondence between one of the hardware and software and the vacant rule, or, if impossible to make the correspondence, the correspondence maker outputs a message to a user that urges the user to conduct one of deleting the vacant rule, and adding hardware or software corresponding to the vacant rule, and when said correspondence maker judges there is a hardware or software which does not have correspondence to any rule in the set of rules, the correspondence maker outputs a message to a user that urges the user to add a rule to make correspondence between the hardware or software and the added rule, or delete the hardware or software.

19. The system as set forth in claim 18, further comprising an output device which outputs information indicative of said rule, said security function and said hardware or software, and wherein said correspondence maker causes said output device to output said correspondence, and, if a security function associated with said rule and said hardware or software in a class does not accord with said constraint information, said correspondence maker causes said output device to output no accordance of said security function with said constraint information.

20. The system as set forth in claim 19, wherein said constraint-information memory stores combinations of a plurality of security functions which must not be included in a common class, as said constraint information, and said correspondence maker, if a combination coincident with said constraint information exists in said security functions associated with hardware belonging to a common class or software installed in said hardware, causes said output device to output that there is a combination of a plurality of security functions which must not be included in a common class.

21. The system as set forth in claim 19, wherein said constraint information memory stores a combination of a plurality of security functions about which an attention is to be paid to a system administrator when said security functions are includes in a common class, as said constraint information, and said correspondence maker, if a combination coincident with said constraint information exists in said security functions associated with hardware belonging to a common class or software installed in said hardware, causes said output device to output warning.

22. The system as set forth in claim 19, wherein said constraint information memory stores a combination of a plurality of security functions which are determined preferable to be included in a common class, and said correspondence maker, if only a part of said security functions indicated by said constraint information exists in said security functions associated with hardware belonging to a common class or software installed in said hardware, causes said output device to output that a combination of a plurality of security functions which are determined preferable to be included in a common class is not made.

23. The system as set forth in claim 19, wherein said constraint information memory stores a combination of a plurality of security functions which have to be included in a common class, and said correspondence maker, if only a part of said security functions indicated by said constraint information exists in said security functions associated with hardware belonging to a common class or software installed in said hardware, causes said output device to output that a combination of a plurality of security functions which have to be included in a common class is not made.

24. A method of supporting security administration in a network system, including:

storing node information indicative of security functions provided by hardware and software of said network system, for each of said hardware and each of said software;

receiving a set of rules as guidance relating to security of said network system, and topology information indicative of hardware of said network system and software installed in each of said hardware; and based on said node information, making correspondence between each of said rules and each of said hardware or software indicated by said topology information, said making correspondence performed by a correspondence maker wherein when said correspondence maker judges there is a vacant rule in said set of rules which does not have correspondence to any hardware or software, the correspondence maker performs one of making correspondence between one of the hardware or software and the vacant rule, and deleting the vacant rule, and when said correspondence maker judges there is a hardware or software which does not have correspondence to any rule in the set of rules, the correspondence maker performs one of adding a rule to make correspondence between the hardware or software and the added rule, and deleting the hardware or software.

25. A method of supporting security administration in a network system, including:

receiving topology information indicative of hardware of said network system and software installed in each of said hardware;

receiving a function map including a set of information indicative of correspondence among a rule as a guidance relating to security of said network system, a hardware or software of said network system, and a security function provided by said hardware or software to accomplish said rule;

storing parameter information including an instruction to extract a parameter to be applied to a hardware or software for causing said hardware or software to carry out its security functions, out of said topology information;

extracting said parameter information for each of said security functions to which a rule and a hardware or software corresponds, and extracting a parameter out of said topology information in accordance with an instruction included in the extracted parameter information, based on said function map;

storing a model of a script including a command for determining a parameter on the assumption that a parameter is not determined; and extracting said model out of said script-model memory, and making said script, based on the extracted model and said parameter.

26. A method of supporting security administration in a network system, including:

storing node information indicative of security functions provided by hardware and software of said network system, for each of said hardware and each of said software;

receiving a set of rules as guidance relating to security of said network system, and topology information indicative of classes of said communication network, hardware belonging to each of said classes, and software installed in each of said hardware, said rules being associated with information of a security function and being classified for each of said classes of said communication network;

storing constraint information indicative of constraint to a security function in each of said classes of said communication network; and based on said node information, identifying a security function provided by a hardware belonging to each of said classes of said communication network or by a software installed in said hardware for each of said classes of said communication network, and making correspondence among a rule associated with the identified security function, said security function, and said hardware or software, said making correspondence performed by a correspondence maker wherein when said correspondence maker judges there is a vacant rule in the set of rules which does not have correspondence to any hardware or software, the correspondence maker makes correspondence between one of the hardware and software and the vacant rule, or, if impossible to make the correspondence, the correspondence maker outputs a message to a user that urges the user to conduct one of deleting the vacant rule, and adding hardware or software corresponding to the vacant rule, and when said correspondence maker judges there is a hardware or software which does not have correspondence to any rule in the set of rules, the correspondence maker outputs a message to a user that urges the user to add a rule to make correspondence between the hardware or software and the added rule, or delete the hardware or software.

27. A tangible computer readable medium having computer readable program for operating on a computer for supporting security administration in a network system, said program comprising instructions that cause the computer to perform the steps of:

said computer including a node-information memory storing node information indicative of security functions provided by hardware and software of a network system, for each of said hardware and each of said software, said steps including:

receiving a set of rules as guidance relating to security of said network system, and topology information indicative of hardware of said network system and software installed in each of said hardware; and based on said node information, making correspondence between each of said rules and each of said hardware or software indicated by said topology information, said making correspondence performed by a correspondence maker, wherein when said correspondence maker judges there is a vacant rule in the set of rules which does not have correspondence to any hardware or software, the correspondence maker makes correspondence between one of the hardware and software and the vacant rule, or, if impossible to make the correspondence, the correspondence maker outputs a message to a user that urges the user to conduct one of deleting the vacant rule, and adding hardware or software corresponding to the vacant rule, and when said correspondence maker judges there is a hardware or software which does not have correspondence to any rule in the set of rules, the correspondence maker outputs a message to a user that urges the user to add a rule to make correspondence between the hardware or software and the added rule, or delete the hardware or software.

28. A tangible computer readable medium having computer readable program for operating on a computer for supporting security administration in a network system, said program comprising instructions that cause the computer to perform the steps of:

said computer including a parameter-information memory storing parameter information including an instruction to extract a parameter to be applied to a hardware or software for causing said hardware or software to carry out its security functions, out of topology information, and a script-model memory which stores a model of a script including a command for determining a parameter on the assumption that a parameter is not determined, said steps including:

receiving topology information indicative of hardware of a network system to be administrated and software installed in each of said hardware;

receiving a function map including a set of information indicative of correspondence among a rule as a guidance relating to security of said network system, a hardware or software of said network system, and a security function provided by said hardware or software to accomplish said rule;

extracting said parameter information for each of said security functions to which a rule and a hardware or software corresponds, and extracting a parameter out of said topology information in accordance with an instruction included in the extracted parameter information, based on said function map; and extracting said model out of said script-model memory, and making said script, based on the extracted model and said parameter.

29. A tangible computer readable medium having computer readable program for operating on a computer for supporting security administration in a network system, said program comprising instructions that cause the computer to perform the steps of:

said computer including a node-information memory storing node information indicative of security functions provided by hardware and software of a network system, for each of said hardware and each of said software, and a constraint-information memory which stores constraint information indicative of constraint to a security function in each of said classes of said communication network, said steps including:

receiving a set of rules as guidance relating to security of said network system, and topology information indicative of classes of said communication network, hardware belonging to each of said classes, and software installed in each of said hardware, said rules being associated with information of a security function and being classified for each of said classes of said communication network; and based on said node information, identifying a security function provided by a hardware belonging to each of said classes of said communication network or by a software installed in said hardware for each of said classes of said communication network, and making correspondence among a rule associated with the identified security function, said security function, and said hardware or software, said making correspondence performed by a correspondence maker, wherein when said correspondence maker judges there is a vacant rule in the set of rules which does not have correspondence to any hardware or software, the correspondence maker makes correspondence between one of the hardware and software and the vacant rule, or, if impossible to make the correspondence, the correspondence maker outputs a message to a user that urges the user to conduct one of deleting the vacant rule, and adding hardware or software corresponding to the vacant rule, and when said correspondence maker judges there is a hardware or software which does not have correspondence to any rule in the set of rules, the correspondence maker outputs a message to a user that urges the user to add a rule to make correspondence between the hardware or software and the added rule, or delete the hardware or software.

30. An information-display system to be applied to a system for supporting security administration which system makes correspondence between each of rules as guidance relating to security in a network system, and each of hardware of said network system and each of software installed in each of said hardware, said information-display system including:

a screen-information memory which stores information about a screen having a rule-display section for displaying each of rules, a node-display section for displaying each of hardware and each of software, and a correspondence-display section located between said rule-display section and said node-display section;

a screen-information maker which, based on said screen information stored in said screen-information memory, makes output information in accordance with which each of rules is displayed in said rule-display section, each of hardware and each of software are displayed in said node-display section, and a line connecting a rule to a hardware or software associated with said rule is displayed in said correspondence-display section; and an output device which displays said each of rules, said each of hardware and each of software, and said line in a screen in accordance with said output information, wherein when there is a vacant rule of said each of rules which does not have any hardware or software associated with said vacant rule, said output device displays information indicating the vacant rule exists and a correspondence maker makes correspondence between one of the hardware and software and the vacant rule, or, if impossible to make the correspondence, the output device displays a message to a user that urges the user to conduct one of deleting the vacant rule, and adding hardware or software corresponding to the vacant rule, and when said correspondence maker judges there is a hardware or software which does not have correspondence to any rule in the set of rules, the output device displays information indicating such a hardware or software exists and a message to a user that urges the user to add a rule to make correspondence between the hardware or software and the added rule, or delete the hardware or software.

31. The system as set forth in claim 30, wherein said screen-information maker makes screen information in accordance with which each of rules is displayed such that each of rules and said correspondence-display section are spaced away from each other by a distance determined in accordance with a hierarchy associated with said each of rules, and further in accordance with which a first rule located at a lower hierarchy relative to a second rule is displayed below said second rule.

32. The system as set forth in claim 30, wherein said screen-information maker makes screen information in accordance with which said each of hardware and each of software are displayed such that a distance between said each of hardware and each of software and said correspondence-display section is dependent on whether what is displayed is a hardware or software, and further in accordance with which a software installed in a hardware is displayed below said hardware.

33. An information-display system to be applied to a system for supporting security administration which system makes correspondence between each of rules as guidance relating to security in a network system, and each of hardware of said network system and each of software installed in each of said hardware, said information-display system including:

a screen-information memory which stores information about a screen having a section in which each of rules, each of hardware and each of software are displayed;

a screen-information maker which, based on said screen information stored in said screen-information memory, makes output information in accordance with which said hardware and said software are displayed in said section, said each of rules is displayed around an area in which said hardware and said software are displayed, and a line connecting a rule to a hardware or software associated with said rule; and an output device which displays said each of rules, said each of hardware and each of software, and said line in a screen in accordance with said output information, wherein when there is a vacant rule of said each of rules which does not have any hardware or software associated with said vacant rule, said output device displays information indicating the vacant rule exists and a correspondence maker makes correspondence between one of the hardware and software and the vacant rule, or, if impossible to make the correspondence, the output device displays a message to a user that urges the user to conduct one of deleting the vacant rule, and adding hardware or software corresponding to the vacant rule, and when said correspondence maker judges there is a hardware or software which does not have correspondence to any rule in the set of rules, the output device displays information indicating such a hardware or software exists and a message to a user that urges the user to add a rule to make correspondence between the hardware or software and the added rule, or delete the hardware or software.

34. The system as set forth in claim 33, wherein said screen-information maker makes screen information in accordance with which a first rule located at a lower hierarchy relative to a second rule is displayed adjacent to said second rule.

35. The system as set forth in claim 33, wherein said screen-information maker makes screen information in accordance with which a line connecting a software to a hardware in which said software is installed is displayed.

36. A method of displaying information to be applied to a system for supporting security administration which system makes correspondence between each of rules as guidance relating to security in a network system, and each of hardware of said network system and each of software installed in each of said hardware, said method including:

storing information about a screen having a rule-display section for displaying each of rules, a node-display section for displaying each of hardware and each of software, and a correspondence-display section located between said rule-display section and said node-display section;

based on said screen information, making output information in accordance with which each of rules is displayed in said rule-display section, each of hardware and each of software are displayed in said node-display section, and a line connecting a rule to a hardware or software associated with said rule is displayed in said correspondence-display section;

displaying said each of rules, said each of hardware and each of software, and said line in a screen in accordance with said output information; and judging whether there is a vacant rule of said each of rules which does not have any hardware or software associated with said vacant rule, wherein when said judging determines there is the vacant rule, making correspondence between one of the hardware or software and the vacant rule, or, if impossible to make the correspondence, outputting a message to a user that urges the user to conduct one of deleting the vacant rule, and adding hardware or software corresponding to the vacant rule, and when said judging determines there is a hardware or software which does not have correspondence to any rule in the set of rules, outputting a message to a user that urges the user to add a rule to make correspondence between the hardware or software and the added rule, or delete the hardware or software.

37. A method of displaying information to be applied to a system for supporting security administration which system makes correspondence between each of rules as guidance relating to security in a network system, and each of hardware of said network system and each of software installed in each of said hardware, said method including:

storing information about a screen having a section in which each of rules, each of hardware and each of software are displayed;

based on said screen information, making output information in accordance with which said hardware and said software are displayed in said section, said each of rules is displayed around an area in which said hardware and said software are displayed, and a line connecting a rule to a hardware or software associated with said rule; and displaying said each of rules, said each of hardware and each of software, and said line in a screen in accordance with said output information; and judging whether there is a vacant rule of said each of rules which does not have any hardware or software associated with said vacant rule, wherein when said judging determines there is the vacant rule, making correspondence between one of the hardware or software and the vacant rule, or, if impossible to make the correspondence, outputting a message to a user that urges the user to conduct one of deleting the vacant rule, and adding hardware or software corresponding to the vacant rule, and when said judging determines there is a hardware or software which does not have correspondence to any rule in the set of rules, outputting a message to a user that urges the user to add a rule to make correspondence between the hardware or software and the added rule, or delete the hardware or software.

* * * * *